(12) United States Patent
Flinn et al.

(10) Patent No.: US 12,586,000 B1
(45) Date of Patent: Mar. 24, 2026

(54) ITERATIVE ATTENTION-BASED NEURAL NETWORK TRAINING AND PROCESSING

(71) Applicant: Steven D Flinn, Brenham, TX (US)

(72) Inventors: Steven Dennis Flinn, Sugar Land, TX (US); Naomi Felina Moneypenny, Bellevue, WA (US)

(73) Assignee: Steven D. Flinn, Sugar Land, TX (US)

( * ) Notice: Subject to any disclaimer, the term of this patent is extended or adjusted under 35 U.S.C. 154(b) by 0 days.

(21) Appl. No.: 19/023,841

(22) Filed: Jan. 16, 2025

Related U.S. Application Data

(63) Continuation of application No. 18/810,460, filed on Aug. 20, 2024, now Pat. No. 12,314,834, which is a continuation of application No. 18/101,612, filed on Jan. 26, 2023, now Pat. No. 12,223,404, which is a continuation of application No. 16/660,908, filed on Oct. 23, 2019, now Pat. No. 11,593,708, which is a continuation of application No. 15/000,011, filed on Jan. 18, 2016, now Pat. No. 10,510,018, which is a continuation-in-part of application No. 14/816,439, filed on Aug. 3, 2015, now abandoned.

(51) Int. Cl.

| | |
|---|---|
| *G06N 20/00* | (2019.01) |
| *G06F 40/211* | (2020.01) |
| *G06F 40/216* | (2020.01) |
| *G06F 40/30* | (2020.01) |
| *G06N 3/02* | (2006.01) |
| *G06N 3/043* | (2023.01) |
| *G06N 3/045* | (2023.01) |
| *G06N 5/045* | (2023.01) |
| *G06N 5/048* | (2023.01) |

(52) U.S. Cl.
CPC ........... *G06N 20/00* (2019.01); *G06F 40/211* (2020.01); *G06F 40/216* (2020.01); *G06F 40/30* (2020.01); *G06N 3/043* (2023.01);
*G06N 3/045* (2023.01); *G06N 5/045* (2013.01); *G06N 5/048* (2013.01); *G06N 3/02* (2013.01)

(58) Field of Classification Search
None
See application file for complete search history.

(56) References Cited

U.S. PATENT DOCUMENTS

2012/0290518 A1* 11/2012 Flinn ..................... H04L 51/216
706/12

OTHER PUBLICATIONS

You, Quanzeng, et al. "Robust image sentiment analysis using progressively trained and domain transferred deep networks." Proceedings of the AAAI conference on Artificial Intelligence. vol. 29. No. 1. Feb. 9, 2015. (Year: 2015).*
List of References U.S. Appl. No. 12/223,404, now Issued as U.S. Appl. No. 12/223,404 B2, mail room dated Nov. 19, 2024 and Jul. 29, 2024.

* cited by examiner

*Primary Examiner* — Eric Nilsson

(57) ABSTRACT

An iterative attention-based neural network training and processing method and system iteratively applies a focus of attention of a trained neural network on syntactical elements and generates probabilities associated with representations of the syntactical elements, which in turn inform a subsequent focus of attention of the neural network, resulting in updated probabilities. The updated probabilities are then applied to generate syntactical elements for delivery to a user. The user may respond to the delivered syntactical elements, providing additional training information to the trained neural network.

40 Claims, 18 Drawing Sheets

Figure 2A
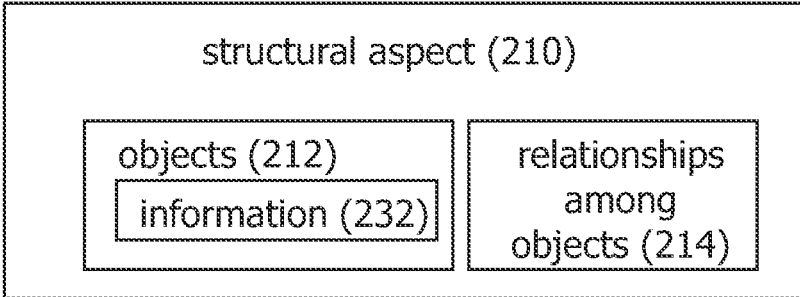
structural aspect (210)
objects (212)
information (232)
relationships among objects (214)
Figure 2B
content aspect (230)
information (232)
Figure 2C
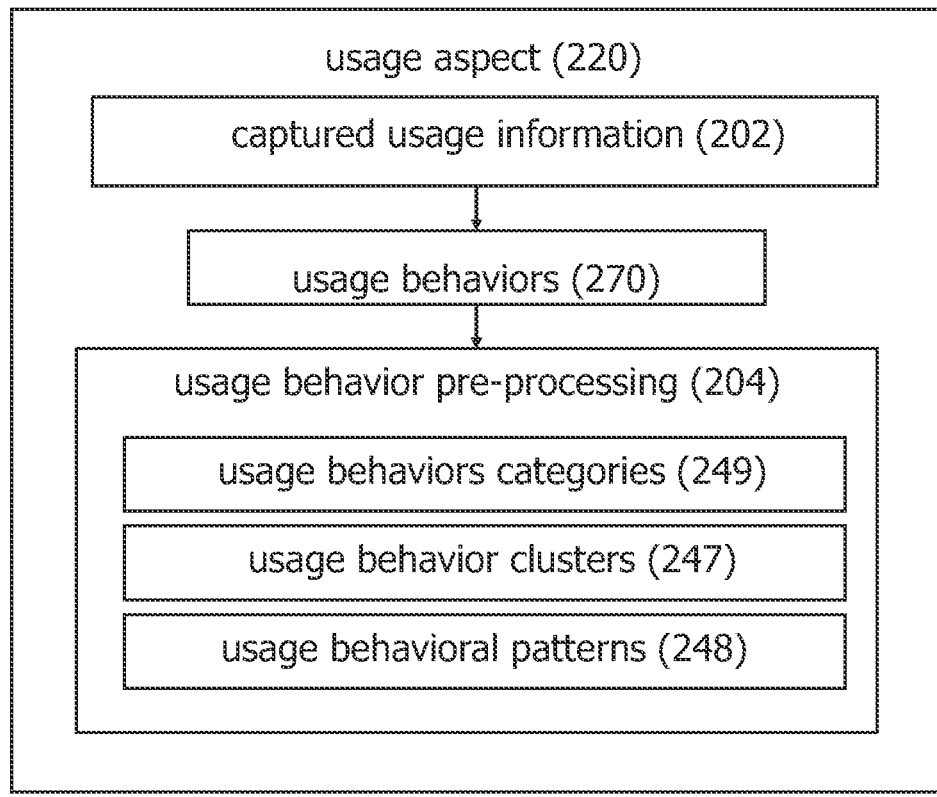
usage aspect (220)
captured usage information (202)
usage behaviors (270)
usage behavior pre-processing (204)
usage behaviors categories (249)
usage behavior clusters (247)
usage behavioral patterns (248)

Figure 10

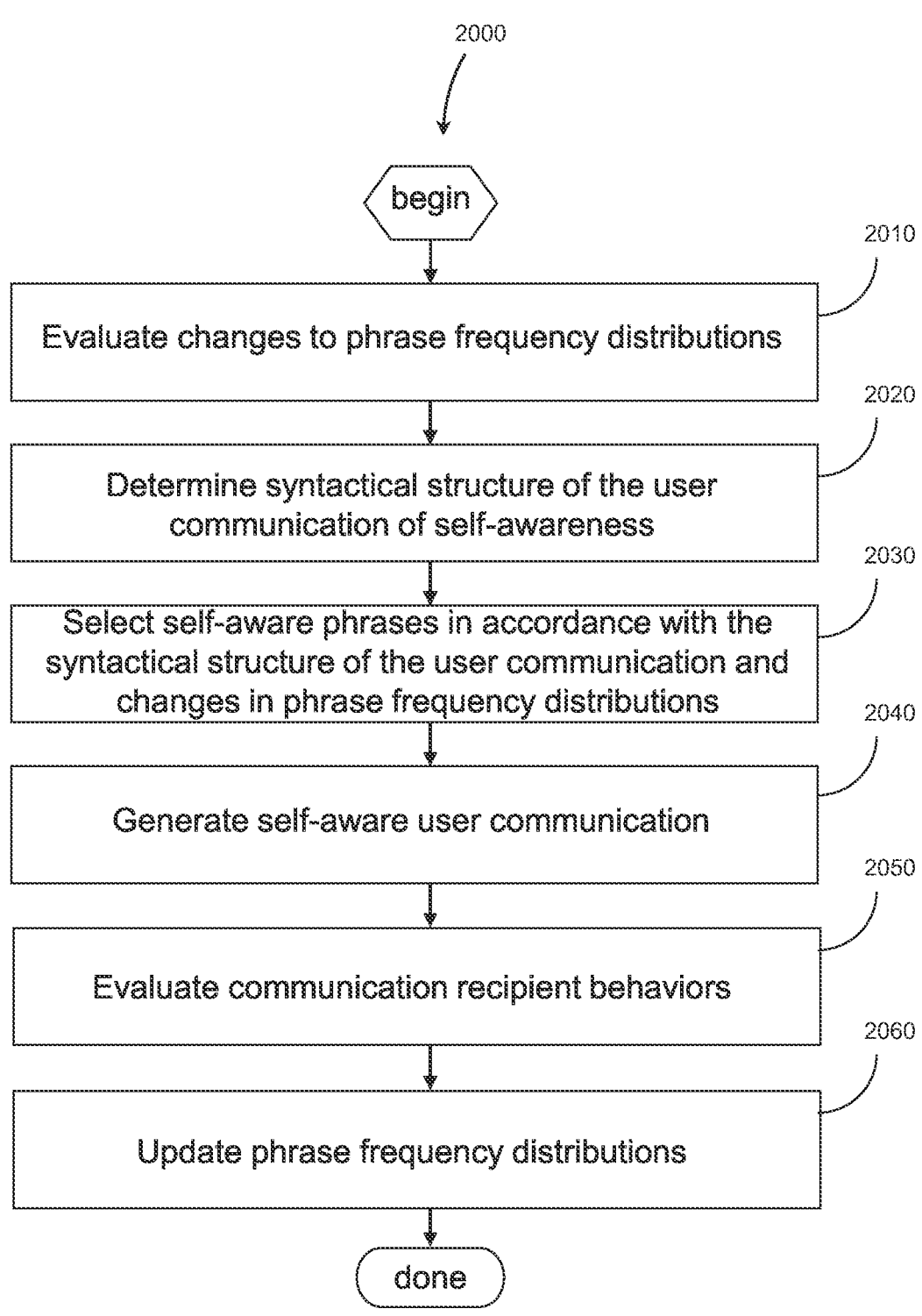

2000 begin

2010

Evaluate changes to phrase frequency distributions

2020

Determine syntactical structure of the user communication of self-awareness

2030

Select self-aware phrases in accordance with the syntactical structure of the user communication and changes in phrase frequency distributions

2040

Generate self-aware user communication

2050

Evaluate communication recipient behaviors

2060

Update phrase frequency distributions done

| Phrase Array | Phrase ID | Relative Frequency | Phrase | Phrase Attribute 1 | Phrase Attribute 2 |
|---|---|---|---|---|---|
| Array 1 | 1 | 1 | I've noticed you've been spending a lot of time with your profile lately ;-) | Sarcastic | User-attentive |
| Array 1 | 2 | 3 | It seems to me that you recently have been more interested in areas such as {1} | Business-like | User-attentive |
| Array 1 | 3 | 1 | I've noticed your colleagues have been very interested recently in {1}-related topics | Business-like | Socially-attentive |
| Array 1 | 4 | 5 | Null | Null | Null |
| Array 2 | 1 | 2 | I know this is probably silly of me | Humorous | Introspective |
| Array 2 | 2 | 1 | I often wonder why you | Inquisitive | User-attentive |

3010  3020  3030  3040  3050  3060

3032

4000

| Phrase Array | Phrase ID | Relative Frequency | Phrase | Phrase Attribute 2 | Phrase Attribute 3 |
|---|---|---|---|---|---|
| Array 3 | 1 | 1 | You know, I sense that I have become a lot more fun loving since I met you | Introspective | Humorous |
| Array 3 | 2 | 2 | I feel like I take myself a lot less seriously when I'm around you | Introspective | Humorous |
| Array 3 | 3 | 10 | Null | Null | Null |
| Array 4 | 1 | 1 | I keep wondering why I've become increasingly self-absorbed of late | Introspective | Introspective |
| Array 4 | 2 | 1 | Null | Null | Null |

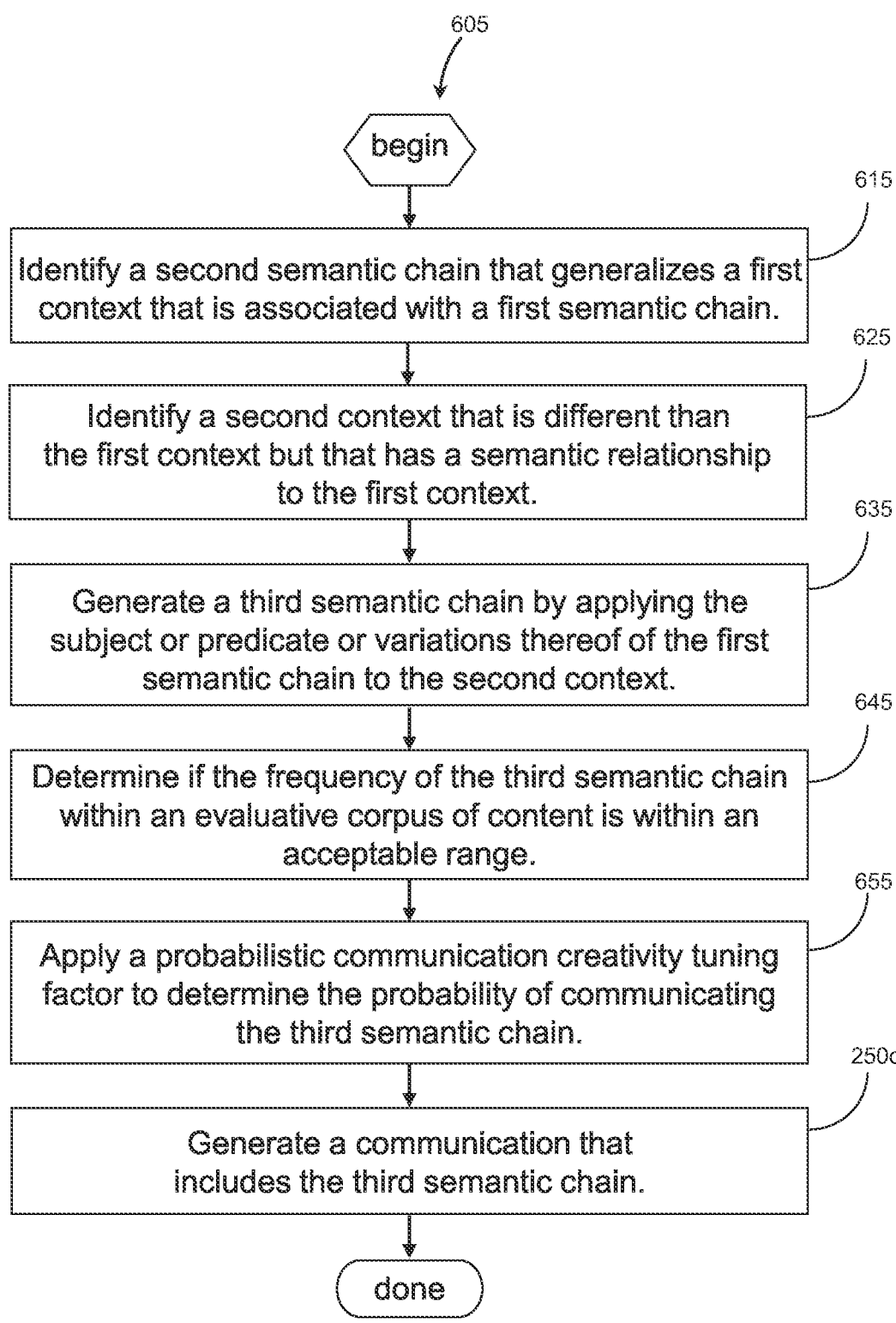

605 begin

615

Identify a second semantic chain that generalizes a first context that is associated with a first semantic chain.

625

Identify a second context that is different than the first context but that has a semantic relationship to the first context.

635

Generate a third semantic chain by applying the subject or predicate or variations thereof of the first semantic chain to the second context.

645

Determine if the frequency of the third semantic chain within an evaluative corpus of content is within an acceptable range.

655

Apply a probabilistic communication creativity tuning factor to determine the probability of communicating the third semantic chain.

250c

Generate a communication that includes the third semantic chain.

done

Figure 14C

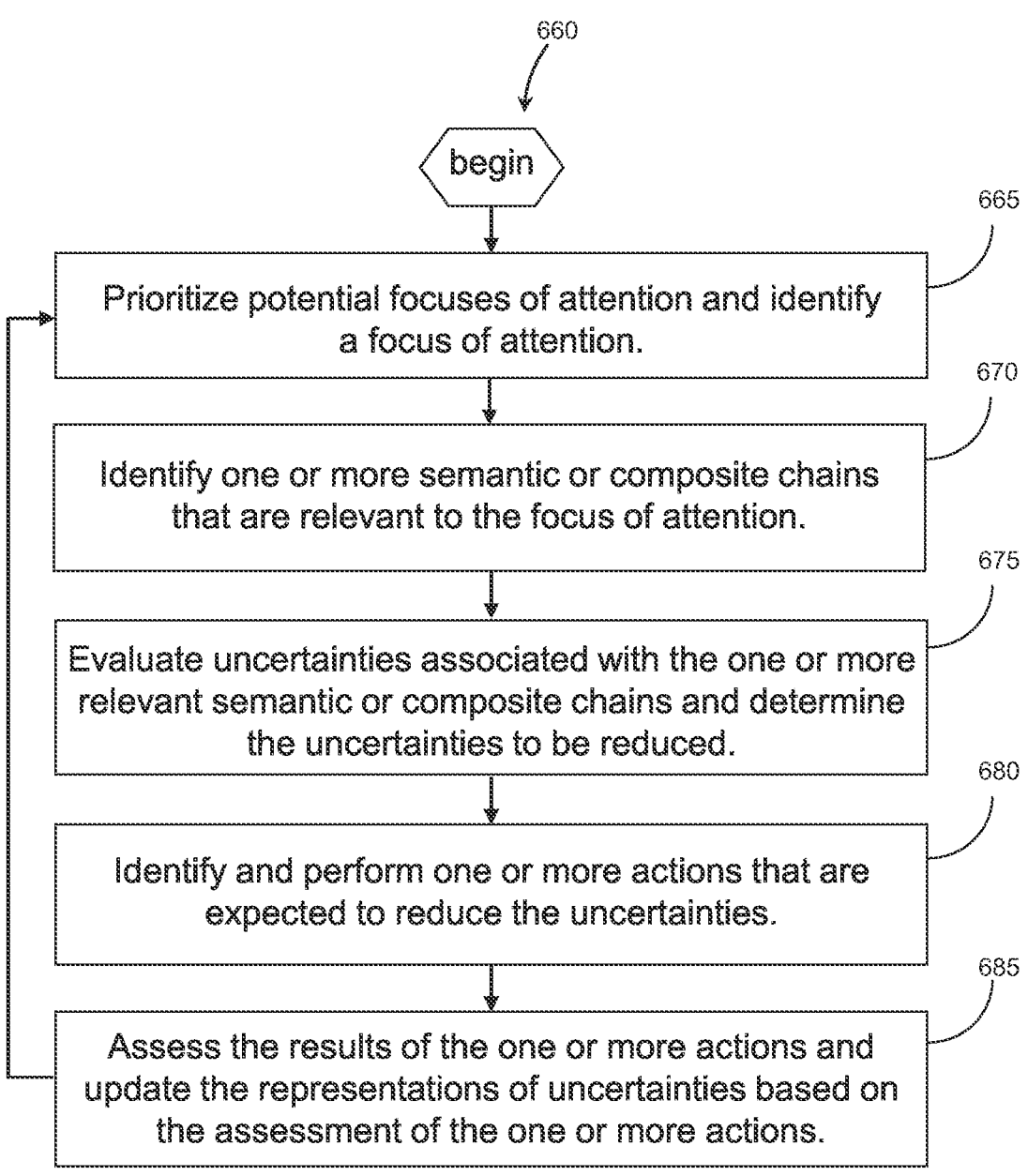

660 begin

665

Prioritize potential focuses of attention and identify a focus of attention.

670

Identify one or more semantic or composite chains that are relevant to the focus of attention.

675

Evaluate uncertainties associated with the one or more relevant semantic or composite chains and determine the uncertainties to be reduced.

680

Identify and perform one or more actions that are expected to reduce the uncertainties.

685

Assess the results of the one or more actions and update the representations of uncertainties based on the assessment of the one or more actions.

ITERATIVE ATTENTION-BASED NEURAL NETWORK TRAINING AND PROCESSING

CROSS-REFERENCE TO RELATED APPLICATIONS

The present application is a continuation of U.S. patent application Ser. No. 18/810,460, filed on Aug. 20, 2024, which is a continuation of U.S. patent application Ser. No. 18/101,612, filed on Jan. 26, 2023, which is a continuation of U.S. patent application Ser. No. 16/660,908, filed on Oct. 23, 2019, now U.S. Pat. No. 11,593,708, which is a continuation of U.S. patent application Ser. No. 15/000,011, filed on Jan. 18, 2016, now U.S. Pat. No. 10,510,018, which is a continuation-in-part of U.S. patent application Ser. No. 14/816,439, filed on Aug. 3, 2015, all of which are hereby incorporated by reference as if set forth herein in their entirety. The present application also incorporates by reference: U.S. patent application Ser. No. 14/497,645, filed on Sep. 26, 2014; U.S. Provisional Patent Application No. 61/884,224, filed Sep. 30, 2013, and U.S. Provisional Patent Application No. 61/929,432, filed Jan. 20, 2014, all of which are hereby incorporated by reference as if set forth herein in their entirety.

FIELD OF THE INVENTION

This invention relates to systems and methods for incorporating semantic-based auto-learning capabilities within one or more computer-implemented systems.

BACKGROUND OF THE INVENTION

Existing semantic-based approaches, using, for example, Resource Description Framework (RDF), can require significant manual effort, and do not adapt to usage. Thus there is a need for a system and method that enables such semantic-based approaches to automatically adapt to use, and further, to extend semantic-based approaches so as to enable the automatic generation of more engaging communications that embody characteristics lacking in existing semantic-based systems such as self-awareness, imagination, introspection, continuing streams of attention and reflection, and communicating creatively with metaphorical constructs and/or wit.

SUMMARY OF THE INVENTION

In accordance with the embodiments described herein, a processor-based system, method, and apparatus that embodies automatically generated streams of attention and/or reflection, is disclosed.

Other features and embodiments will become apparent from the following description, from the drawings, and from the claims.

BRIEF DESCRIPTION OF THE DRAWINGS

FIGS. 2A, 2B, and 2C are block diagrams of the structural aspect, the content aspect, and the usage aspect of the adaptive system of FIG. 1, according to some embodiments;

FIG. 10 is a flow diagram of a self-aware personality process, according to some embodiments;

FIG. 11 is a diagram of exemplary data structures associated with the adaptive personality process and the self-aware personality process of FIGS. 9 and 10, according to some embodiments;

FIG. 14B is a flow diagram of a process of applying semantic context transfer to generate communications that embody a degree of creativity, according to some embodiments;

FIG. 14C is a flow diagram of a closed-loop process of applying semantic-based chains and associated uncertainties to inform automatic actions that are in accordance with a focus of attention, according to some embodiments;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Adaptive System

Figure 1:
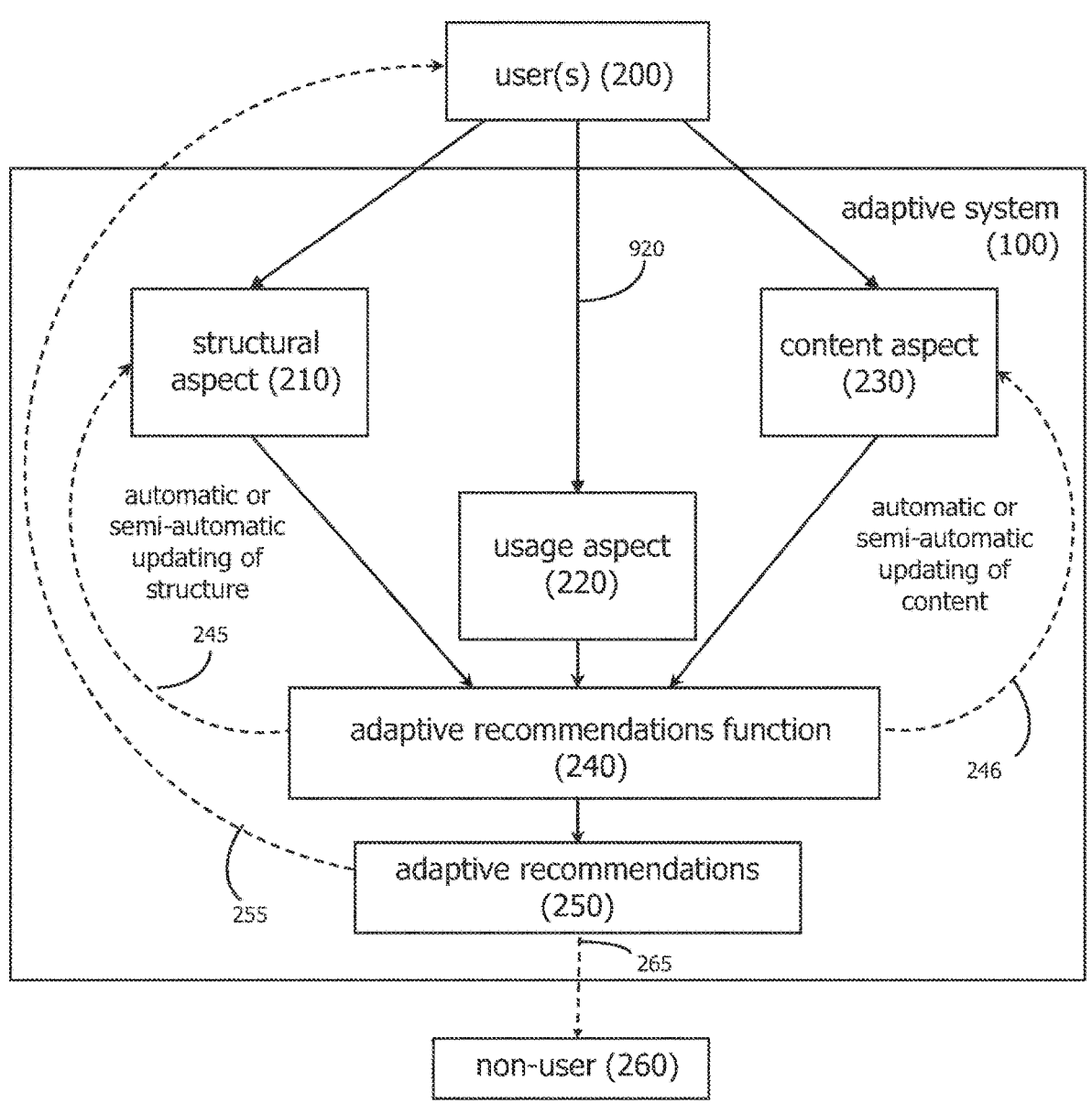
FIG. 1 is a block diagram of an adaptive system, according to some embodiments.

In some embodiments, the present invention may apply the methods and systems of an adaptive system as depicted by FIG. 1. FIG. 1 is a generalized depiction of an adaptive system 100, according to some embodiments. The adaptive system 100 includes three aspects: a structural aspect 210, a usage aspect 220, and a content aspect 230. One or more users 200 interact with the adaptive system 100. An adaptive recommendations function 240 may produce adaptive recommendations 250 based upon the user interactions, and the recommendations may be delivered to the user 200 or applied to the adaptive system 100.

As used herein, one or more users 200 may be a single user or multiple users. As shown in FIG. 1, the one or more users 200 may receive the adaptive recommendations 250.

Non-users 260 of the adaptive system 100 may also receive adaptive recommendations 250 from the adaptive system 100.

A user 200 may be a human entity, a computer system, or a second adaptive system (distinct from the adaptive system 100) that interacts with, or otherwise uses the adaptive system. The one or more users 200 may therefore include non-human "users" that interact with the adaptive system 100. In particular, one or more other adaptive systems may serve as virtual system "users." Although not essential, these other adaptive systems may operate in accordance with the architecture of the adaptive system 100. Thus, multiple adaptive systems may be mutual users of one another. The user 200 may also represent the adaptive system 100 itself as a means of representing interactions with itself (or among its constituent elements) or as a means for referencing its own behaviors as embodied in the usage aspect 220.

It should be understood that the structural aspect 210, the content aspect 230, the usage aspect 220, and the recommendations function 240 of the adaptive system 100, and elements of each, may be contained within one processor-based device, or distributed among multiple processor-based devices, and wherein one or more of the processor-based devices may be portable. Furthermore, in some embodiments one or more non-adaptive systems may be transformed to one or more adaptive systems 100 by means of operatively integrating the usage aspect 220 and the recommendations function 240 with the one or more non-adaptive systems. In some embodiments the structural aspect 210 of a non-adaptive system may be transformed to a fuzzy network-based structural aspect 210 to provide a greater capacity for adaptation.

The term "computer system" or the term "system," without further qualification, as used herein, will be understood to mean either a non-adaptive or an adaptive system. Likewise, the terms "system structure" or "system content," as used herein, will be understood to refer to the structural aspect 210 and the content aspect 230, respectively, whether associated with a non-adaptive system or the adaptive system 100. The term "system structural subset" or "structural subset," as used herein, will be understood to mean a portion or subset of the elements of the structural aspect 210 of a system.

Structural Aspect

The structural aspect 210 of the adaptive system 100 is depicted in the block diagram of FIG. 2A. The structural aspect 210 comprises a collection of system objects 212 that are part of the adaptive system 100, as well as the relationships among the objects 214, if they exist. The relationships among objects 214 may be persistent across user sessions, or may be transient in nature. The objects 212 may include or reference items of content, such as text, graphics, audio, video, interactive content, or embody any other type or item of computer-implemented information. The objects 212 may also include references, such as pointers, to content. Computer applications, executable code, or references to computer applications may also be stored as objects 212 in the adaptive system 100. The content of the objects 212 is known herein as information 232. The information 232, though part of the object 214, is also considered part of the content aspect 230, as depicted in FIG. 2B, and described below.

The objects 212 may be managed in a relational database, or may be maintained in structures such as, but not limited to, flat files, linked lists, inverted lists, hypertext networks, or object-oriented databases. The objects 212 may include meta-information 234 associated with the information 232 contained within, or referenced by the objects 212.

As an example, in some embodiments, the World-wide Web could be considered a structural aspect, wherein web pages constitute the objects of the structural aspect and links between web pages constitute the relationships among the objects. Alternatively, or in addition, in some embodiments, the structural aspect could be composed of objects associated with an object-oriented programming language, and the relationships between the objects associated with the protocols and methods associated with interaction and communication among the objects in accordance with the object-oriented programming language.

The one or more users 200 of the adaptive system 100 may be explicitly represented as objects 212 within the system 100, therefore becoming directly incorporated within the structural aspect 210. The relationships among objects 214 may be arranged in a hierarchical structure, a relational structure (e.g. according to a relational database structure), or according to a network structure.

Content Aspect

The content aspect 230 of the adaptive system 100 is depicted in the block diagram of FIG. 2B. The content aspect 230 comprises the information 232 contained in, or referenced by the objects 212 that are part of the structural aspect 210. The content aspect 230 of the objects 212 may include text, graphics, audio, video, and interactive forms of content, such as applets, tutorials, courses, demonstrations, modules, or sections of executable code or computer programs. The one or more users 200 interact with the content aspect 230.

The content aspect 230 may be updated based on the usage aspect 220, as well as associated metrics. To achieve this, the adaptive system 100 may use or access information from other systems. Such systems may include, but are not limited to, other computer systems, other networks, such as the World Wide Web, multiple computers within an organization, other adaptive systems, or other adaptive recombinant systems. In this manner, the content aspect 230 benefits from usage occurring in other environments.

Usage Aspect

The usage aspect 220 of the adaptive system 100 is depicted in the block diagram of FIG. 2C, although it should be understood that the usage aspect 220 may also exist independently of adaptive system 100 in some embodiments. The usage aspect 220 denotes captured usage information 202, further identified as usage behaviors 270, and usage behavior pre-processing 204. The usage aspect 220 thus reflects the tracking, storing, categorization, and clustering of the use and associated usage behaviors of the one or more users 200 interacting with, or being monitored by, the adaptive system 100. Applying usage behavioral information 202, including, but not limited to the usage behavioral information described by Table 1, to generate relationships or affinities 214 among objects 212 may be termed "behavioral indexing" herein.

The captured usage information 202, known also as system usage or system use 202, may include any user behavior 920 exhibited by the one or more users 200 while using the system. The adaptive system 100 may track and store user key strokes and mouse clicks, for example, as well as the time period in which these interactions occurred (e.g., timestamps), as captured usage information 202. From this captured usage information 202, the adaptive system 100 identifies usage behaviors 270 of the one or more users 200 (e.g., a web page access or email transmission). Finally, the usage aspect 220 includes usage-behavior pre-processing, in which usage behavior categories 249, usage behavior clusters 247, and usage behavioral patterns 248 are formulated for subsequent processing of the usage behaviors 270 by the adaptive system 100. Non-limiting examples of the usage behaviors 270 that may be processed by the adaptive system 100, as well as usage behavior categories 249 designated by the adaptive system 100, are listed in Table 1, and described in more detail, below.

The usage behavior categories 249, usage behaviors clusters 247, and usage behavior patterns 248 may be interpreted with respect to a single user 200, or to multiple users 200; the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 249 include types of usage behaviors 270, such as accesses, referrals to other users, collaboration with other users, and so on. These categories and more are included in Table 1, below. Usage behavior clusters 247 are groupings of one or more usage behaviors 270, either within a particular usage behavior category 249 or across two or more usage categories. The usage behavior pre-processing 204 may also determine new clusterings of user behaviors 270 in previously undefined usage behavior categories 249, across categories, or among new communities. Usage behavior patterns 248, also known as "usage behavioral patterns" or "behavioral patterns," are also groupings of usage behaviors 270 across usage behavior categories 249. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, and/or monitored behaviors such as physiological responses, physical (i.e., geographic) location, and environmental conditions local to the user 200. The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering. Usage behaviors 270 may also be derived from the use or explicit preferences 252 associated with other adaptive or non-adaptive systems.

Adaptive Recommendations

As shown in FIG. 1, the adaptive system 100 generates adaptive recommendations 250 using the adaptive recommendations function 240. The adaptive recommendations 250, or suggestions, enable users to more effectively use and/or navigate the adaptive system 100.

The adaptive recommendations 250 are presented as structural subsets of the structural aspect 210, which may comprise an item of content, multiple items of content, a representation of one or more users, and/or a user activity or stream of activities. The recommended content or activities may include information generated automatically by a processor-based system or device, such as, for example, by a process control device. A recommendation may comprise a spatial or temporal sequence of objects. The adaptive recommendations 250 may be in the context of a currently conducted activity of the system 100, a current position while navigating the structural aspect 210, a currently accessed object 212 or information 232, or a communication with another user 200 or another system. The adaptive recommendations 250 may also be in the context of a historical path of executed system activities, accessed objects 212 or information 232, or communications during a specific user session or across user sessions. The adaptive recommendations 250 may be without context of a current activity, currently accessed object 212, current session path, or historical session paths.

Adaptive recommendations 250 may also be generated in response to direct user requests or queries, including search requests. Such user requests may be in the context of a current system navigation, access or activity, or may be outside of any such context and the recommended content sourced from one or more systems. The adaptive recommendations 250 may comprise advertising or sponsored content. The adaptive recommendations 250 may be delivered through any computer-implemented means, including, but not limited to delivery modes in which the recommendation recipient 200, 260 can read and/or listen to the recommendation 250.

Fuzzy Content Network

Figure 3:
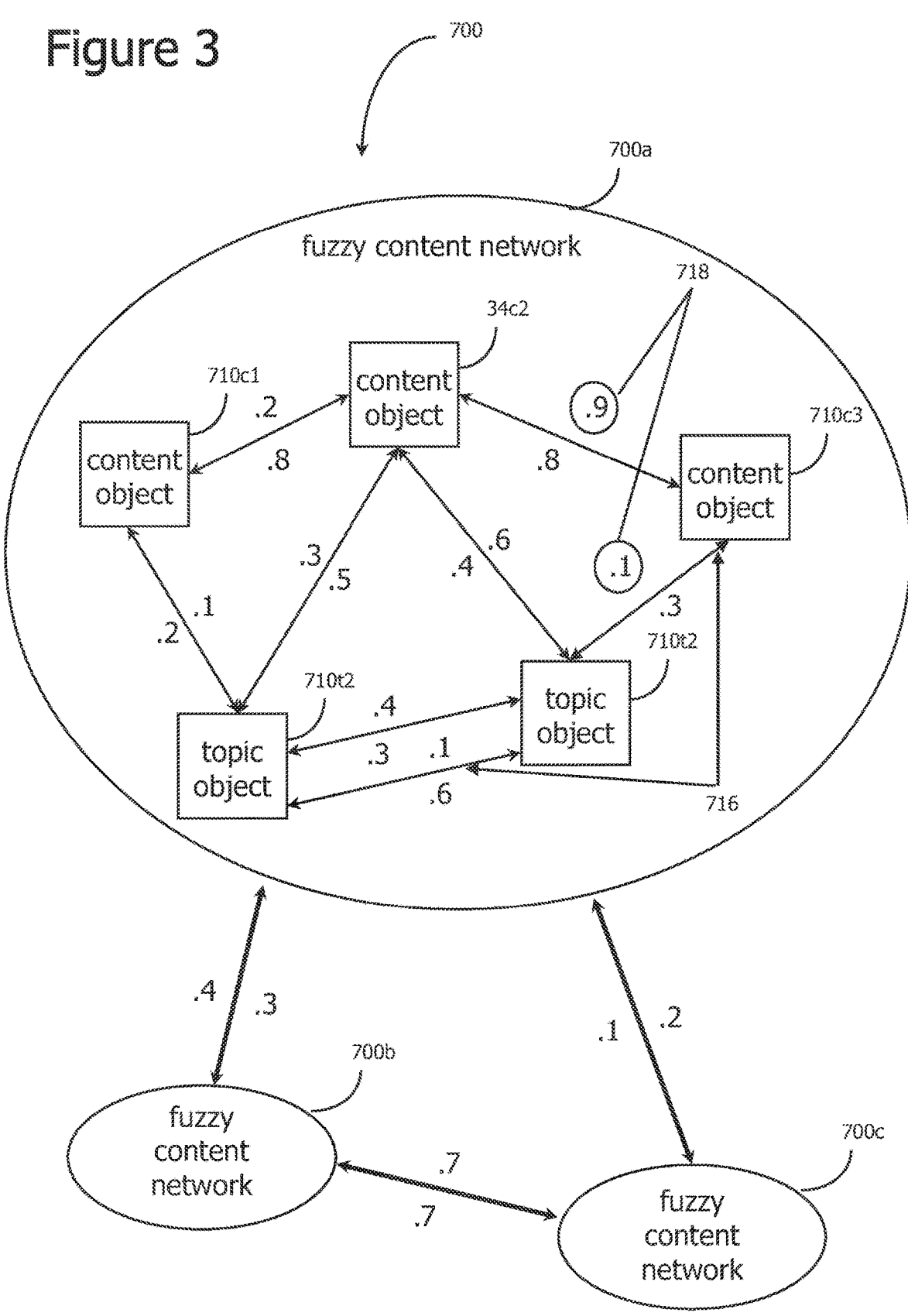
FIG. 3 is a block diagram of a fuzzy content network-based system, according to some embodiments.
Figure 4A:
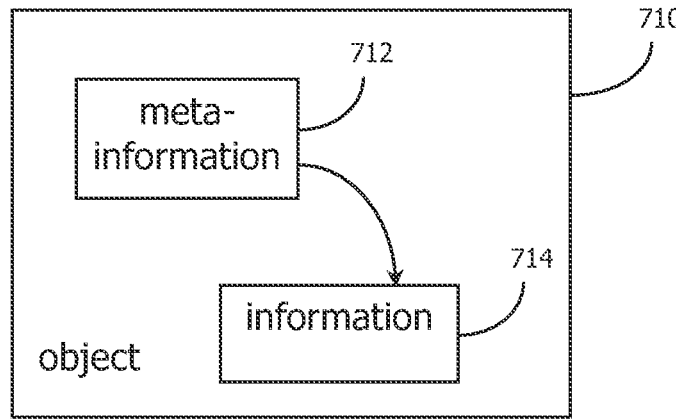
FIGS. 4A, 4B, and 4C are block diagrams of an object, a topic object, and a content object, according to some embodiments.

In some embodiments, the structural aspect 210 of the adaptive system 100, comprises a specific type of fuzzy network, a fuzzy content network. A fuzzy content network 700 is depicted in FIG. 3. The fuzzy content network 700 may include multiple content sub-networks, as illustrated by the content sub-networks 700a, 700b, and 700c, and fuzzy content network 700 includes "content," "data," or "information," packaged in objects 710. Details about how the object works internally may be hidden. In FIG. 4A, for example, the object 710 includes meta-information 712 and information 714. The object 710 thus encapsulates information 714.

Another benefit to organizing information as objects is known as inheritance. The encapsulation of FIG. 4A, for example, may form discrete object classes, with particular characteristics ascribed to each object class. A newly defined object class may inherit some of the characteristics of a parent class. Both encapsulation and inheritance enable a rich set of relationships between objects that may be effectively managed as the number of individual objects and associated object classes grows.

Figure 4B:
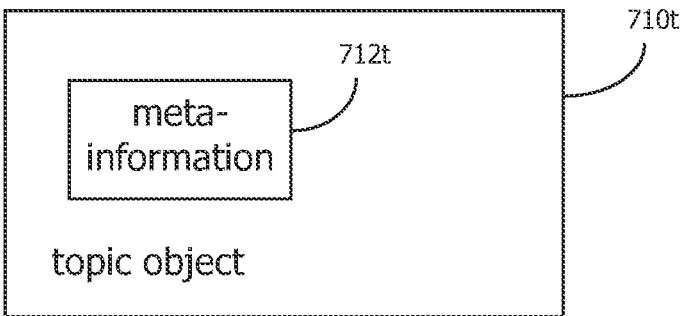
Figure 4C:
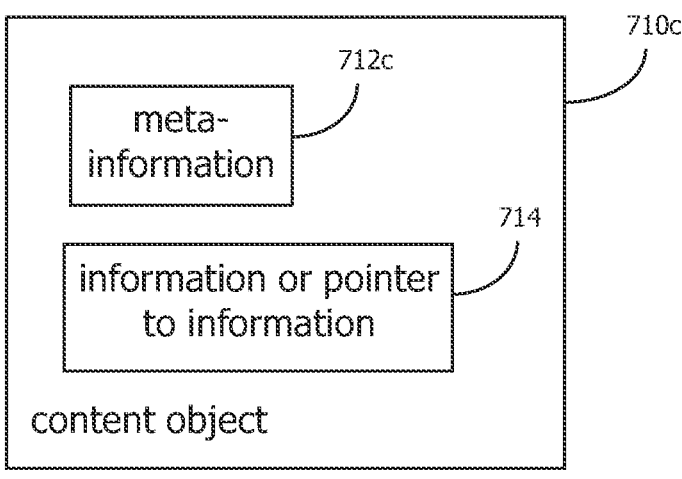

In the content network 700, the objects 710 may be either topic objects 710t or content objects 710c, as depicted in FIGS. 4B and 4C, respectively. Topic objects 710t are encapsulations that contain meta-information 712t and relationships to other objects (not shown), but do not contain an embedded pointer to reference associated information. The topic object 710t thus essentially operates as a "label" to a class of information. The topic object 710 therefore just refers to "itself" and the network of relationships it has with other objects 710. People may be represented as topic objects or content objects in accordance with some embodiments.

Content objects 710c, as shown in FIG. 4C, are encapsulations that optionally contain meta-information 712c and relationships to other objects 710 (not shown). Additionally, content objects 710c may include either an embedded pointer to information or the information 714 itself (hereinafter, "information 714").

The referenced information 714 may include files, text, documents, articles, images, audio, video, multi-media, software applications and electronic or magnetic media or signals. Where the content object 714$c$ supplies a pointer to information, the pointer may be a memory address. Where the content network 700 encapsulates information on the Internet, the pointer may be a Uniform Resource Locator (URL).

The meta-information 712 supplies a summary or abstract of the object 710. So, for example, the meta-information 712$t$ for the topic object 710$t$ may include a high-level description of the topic being managed. Examples of meta-information 712$t$ include a title, a sub-title, one or more descriptions of the topic provided at different levels of detail, the publisher of the topic meta-information, the date the topic object 710$t$ was created, and subjective attributes such as the quality, and attributes based on user feedback associated with the referenced information. Meta-information may also include a pointer to referenced information, such as a uniform resource locator (URL), in one embodiment.

The meta-information 712$c$ for the content object 710$c$ may include relevant keywords associated with the information 714, a summary of the information 714, and so on. The meta-information 712$c$ may supply a "first look" at the objects 710$c$. The meta-information 712$c$ may include a title, a sub-title, a description of the information 714, the author of the information 714, the publisher of the information 714, the publisher of the meta-information 712$c$, and the date the content object 710$c$ was created, as examples. As with the topic object 710$t$, meta-information for the content object 710$c$ may also include a pointer.

In FIG. 3, the content sub-network 700$a$ is expanded, such that both content objects 710$c$ and topic objects 710$t$ are visible. The various objects 710 of the content network 700 are interrelated by degrees using relationships 716 (unidirectional and bidirectional arrows) and relationship indicators 718 (values). Each object 710 may be related to any other object 710, and may be related by a relationship indicator 718, as shown. Thus, while information 714 is encapsulated in the objects 710, the information 714 is also interrelated to other information 714 by a degree manifested by the relationship indicators 718.

The relationship indicator 718 is a type of affinity comprising a value associated with a relationship 716, the value typically comprising a numerical indicator of the relationship between objects 710. Thus, for example, the relationship indicator 718 may be normalized to between 0 and 1, inclusive, where 0 indicates no relationship, and 1 indicates a subset or maximum relationship. Or, the relationship indicators 718 may be expressed using subjective descriptors that depict the "quality" of the relationship. For example, subjective descriptors "high," "medium," and "low" may indicate a relationship between two objects 710.

The relationship 716 between objects 710 may be bidirectional, as indicated by the double-pointing arrows. Each double-pointing arrow includes two relationship indicators 718, one for each "direction" of the relationships between the objects 710.

As FIG. 3 indicates, the relationships 716 between any two objects 710 need not be symmetrical. That is, topic object 710$t1$ has a relationship of "0.3" with content object 710$c2$, while content object 710$c2$ has a relationship of "0.5" with topic object 710$t1$. Furthermore, the relationships 716 need not be bi-directional—they may be in one direction only. This could be designated by a directed arrow, or by simply setting one relationship indicator 718 of a bi-directional arrow to "0," the null relationship value.

The content networks 700A, 700B, 700C may be related to one another using relationships of multiple types and associated relationship indicators 718. For example, in FIG. 3, content sub-network 700$a$ is related to content sub-network 700$b$ and content sub-network 700$c$, using relationships of multiple types and associated relationship indicators 718. Likewise, content sub-network 700$b$ is related to content sub-network 700$a$ and content sub-network 700$c$ using relationships of multiple types and associated relationship indicators 718.

Individual content and topic objects 710 within a selected content sub-network 700$a$ may be related to individual content and topic objects 710 in another content sub-network 700$b$. Further, multiple sets of relationships of multiple types and associated relationship indicators 718 may be defined between two objects 710.

For example, a first set of relationships 716 and associated relationship indicators 718 may be used for a first purpose or be available to a first set of users while a second set of relationships 716 and associated relationship indicators 718 may be used for a second purpose or available to a second set of users. For example, in FIG. 3, topic object 710$t1$ is bi-directionally related to topic object 710$t2$, not once, but twice, as indicated by the two double arrows. An indefinite number of relationships 716 and associated relationship indicators 718 may therefore exist between any two objects 710 in the fuzzy content network 700. The multiple relationships 716 may correspond to distinct relationship types. For example, a relationship type might be the degree an object 710 supports the thesis of a second object 710, while another relationship type might be the degree an object 710 disconfirms the thesis of a second object 710. The content network 700 may thus be customized for various purposes and accessible to different user groups in distinct ways simultaneously.

The relationships among objects 710 in the content network 700, as well as the relationships between content networks 700$a$ and 700$b$, may be modeled after fuzzy set theory. Each object 710, for example, may be considered a fuzzy set with respect to all other objects 710, which are also considered fuzzy sets. The relationships among objects 710 are the degrees to which each object 710 belongs to the fuzzy set represented by any other object 710. Although not essential, every object 710 in the content network 700 may conceivably have a relationship with every other object 710.

The topic objects 710$t$ may encompass, and may be labels for, very broad fuzzy sets of the content network 700. The topic objects 710$t$ thus may be labels for the fuzzy set, and the fuzzy set may include relationships to other topic objects 710$t$ as well as related content objects 710$c$. Content objects 710$c$, in contrast, typically refer to a narrower domain of information in the content network 700.

Figure 5A:
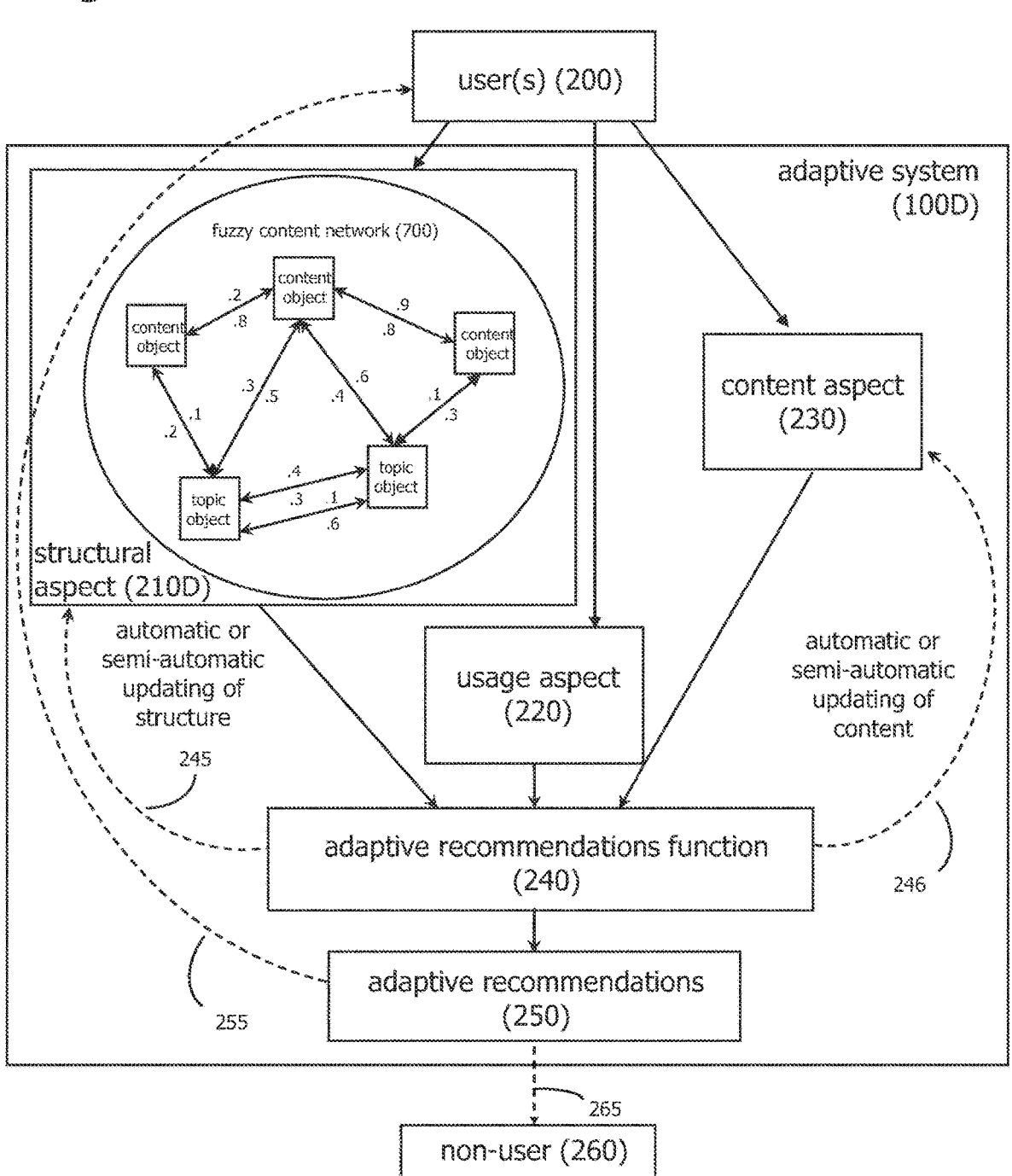
FIG. 5A is a block diagram of a fuzzy content network-based adaptive system, according to some embodiments.

The adaptive system 100 of FIG. 1 may operate in association with a fuzzy content network environment, such as the one depicted in FIG. 3. In FIG. 5A, an adaptive system 100D includes a structural aspect 210D that is a fuzzy content network. Thus, adaptive recommendations 250 generated by the adaptive system 100D are also structural subsets that may themselves comprise fuzzy content networks.

In some embodiments a computer-implemented fuzzy network or fuzzy content network 700 may be represented in the form of vectors or matrices in a computer-implemented system, and where the vectors or matrices may be represented in the form of computer-implemented data structures such as, but not limited to, relational databases. For example, the relationship indicators 718 or affinities among topics may be represented as topic-to-topic affinity vectors ("TTAV"). The relationship indicators 718 or affinities among content objects may be represented as content-to-content affinity vectors ("CCAV"). The relationship indicators 718 or affinities among content object and topic objects may be represented as content-to-topic affinity vectors ("CTAV"), which is also sometimes referred to an object-to-topic affinity vector ("OTAV") herein.

Further, affinity vectors between a user 200 and objects of a fuzzy network or fuzzy content network 700 may be generated. For example, a member (i.e., user)-to-topic affinity vector ("MTAV") may be generated in accordance with some embodiments (and an exemplary process for generating an MTAV is provided elsewhere herein). In some embodiments an affinity vector ("MMAV") between a specific user and other users 200 may be generated derivatively from MTAVs and/or other affinity vectors (and an exemplary process for generating an MMAV is provided elsewhere herein). In some embodiments a member-topic expertise vector (MTEV) is generated, which is defined as a vector of inferred member or user 200 expertise level values, wherein each value corresponds to an expertise level corresponding to a topic.

One or more of object 212 relationship mappings 214 represented by TTAVs, CCAVs, CTAVs (or OTAVs), MTAVs or MTEVs may be the result of the behavioral indexing of a structural aspect 210 (that is not necessarily fuzzy network-based) in conjunction with a usage aspect 220 and an adaptive recommendations function 240.

In some embodiments, indexes generated from information 232 within objects 212 may be applied to populate an MTAV and/or MTEV, and/or to modify an existing MTAV and/or MTEV. Computer-implemented algorithms may be applied to index objects 212 such that for each object 212 a vector or vectors comprising one or more constituent elements, such as words, phrases, or concepts, is generated, along with a numerical weight or value corresponding to each constituent element, wherein each of the corresponding weights is indicative of the inferred importance or relevance of each of the associated constituent elements with respect to the associated indexed object 212. By way of a non-limiting example, such a vector or vectors may be generated by a search engine function during the process of indexing the contents 232 of an object 212. This vector of constituent elements and associated weights or values, hereinafter called an "object contents vector," or "OCV," may be generated using pattern detection and/or statistical techniques such as Bayesian analytic approaches and/or or other statistical pattern matching and/or statistical learning techniques such as support vector machines, as are known by those skilled in the art. For example, word or phrase frequencies within an object 212 comprising a document will typically influence the OCV, as may the position of words or phrases within an object 212. These object contents-indexing techniques may further apply more general linguistic data such as word and phrase frequencies for a given language, synonym tables, and/or other lexicon-based information in generating OCVs.

In some embodiments, a system may track a user's 200 behaviors 920, including, but not limited to, the behaviors described by Table 1, and map them to the OCVs of a collection of objects 212. Constituent elements of the OCVs of objects that are inferred from the tracked behaviors 920 to be of particular interest to one or more users 200 or to have some other inferred quality of interest are then identified. These inferences may be based on the relative number of occurrences of constituent elements among objects that are inferred to be interest to a user, as well as in accordance with the weights or values associated with these constituent elements and their associated OCVs. For example, everything else being equal, constituent elements (or synonyms) of OCVs that occur frequently among the objects that are inferred to be of high interest to a user and that have relatively high relevance weightings in the OCVs are favored for identification.

These one or more identified constituent elements may then be transformed via, for example, application of appropriate lexicon-based information and techniques into, or directly serve without transformation as, topics 710t with associated weights in the user's MTAV and/or MTEV, wherein the associated weights are calculated in accordance with the inferred degree of affinity 214 between the user 200 and the objects 212 from which the associated OCVs are sourced. This process can be iteratively executed to continue to expand or refine the MTAV as additional or alternative sets of behaviors 920 are applied to OCVs of the same, additional, or different sets of object 212, enabling continuously improved capabilities for personalization.

In some embodiments a multi-dimensional mathematical construct or space may be generated based on one or more of the affinity vectors. By way of a non-limiting example, topics may represent each dimension of a multi-dimensional space. Calculations of distances between objects and/or users in the multi-dimensional space, and clusters among objects and/or users, may be determined by applying mathematical algorithms to the multi-dimensional space and its elements. These calculations may be used by the adaptive system 100 in generating recommendations and/or in clustering elements of the space.

In some embodiments one or more topics 710t and/or relationship indicators 718 may be generated automatically by evaluating candidate clusters of content objects 710c based on behavioral information 920 and/or the matching of information within the content objects 710c, wherein the matching is performed, for example, through the application of probabilistic, statistical, and/or neural network-based techniques.

User Behavior and Usage Framework

Figure 6:
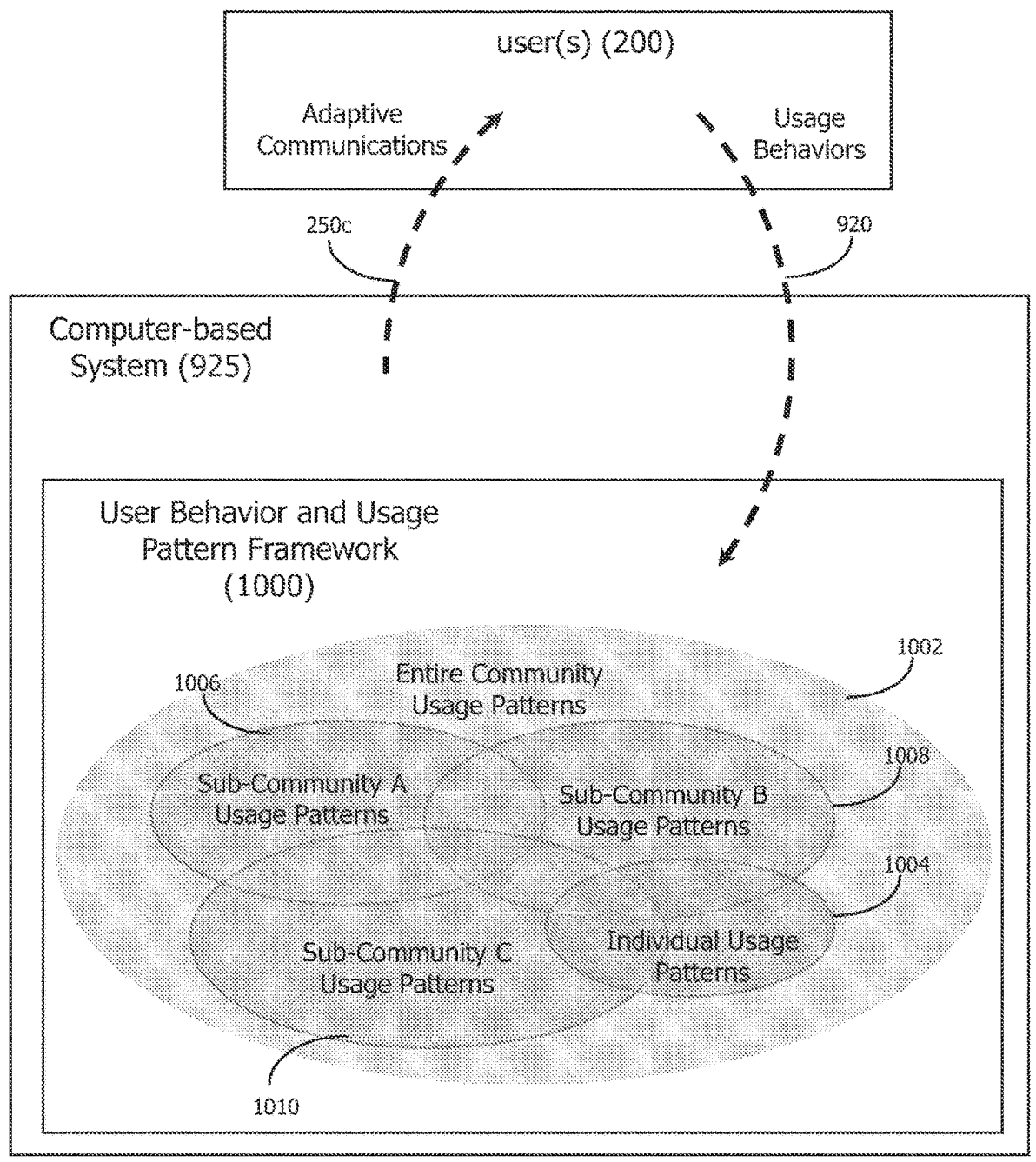
FIG. 6 is a block diagram of a computer-based system that enables adaptive communications, according to some embodiments.

FIG. 6 depicts a usage framework 1000 for performing preference and/or intention inferencing of tracked or monitored usage behaviors 920 by one or more computer-based systems 925. The one or more computer-based systems 925 may comprise an adaptive system 100. The usage framework 1000 summarizes the manner in which usage patterns are managed within the one or more computer-based systems 925. Usage behavioral patterns associated with an entire community, affinity group, or segment of users 1002 are captured by the one or more computer-based systems 925. In another case, usage patterns specific to an individual are captured by the one or more computer-based systems 925. Various sub-communities of usage associated with users may also be defined, as for example "sub-community A" usage patterns 1006, "sub-community B" usage patterns 1008, and "sub-community C" usage patterns 1010.

Memberships in the communities are not necessarily mutually exclusive, as depicted by the overlaps of the sub-community A usage patterns 1006, sub-community B usage patterns 1008, and sub-community C usage patterns 1010 (as well as and the individual usage patterns 1004) in the usage framework 1000. Recall that a community may include a single user or multiple users. Sub-communities may likewise include one or more users. Thus, the individual usage patterns 1004 in FIG. 6 may also be described as representing the usage patterns of a community or a sub-community. For the one or more computer-based systems

925, usage behavior patterns may be segmented among communities and individuals so as to effectively enable adaptive communications 250c delivery for each sub-community or individual.

The communities identified by the one or more computer-based systems 925 may be determined through self-selection, through explicit designation by other users or external administrators (e.g., designation of certain users as "experts"), or through automatic determination by the one or more computer-based systems 925. The communities themselves may have relationships between each other, of multiple types and values. In addition, a community may be composed not of human users, or solely of human users, but instead may include one or more other computer-based systems, which may have reason to interact with the one or more computer-based systems 925. Or, such computer-based systems may provide an input into the one or more computer-based systems 925, such as by being the output from a search engine. The interacting computer-based system may be another instance of the one or more computer-based systems 925.

The usage behaviors 920 included in Table 1 may be categorized by the one or more computer-based systems 925 according to the usage framework 1000 of FIG. 6. For example, categories of usage behavior may be captured and categorized according to the entire community usage patterns 1002, sub-community usage patterns 1006, and individual usage patterns 1004. The corresponding usage behavior information may be used to infer preferences and/or intentions and interests at each of the user levels.

Multiple usage behavior categories shown in Table 1 may be used by the one or more computer-based systems 925 to make reliable inferences of the preferences and/or intentions and/or intentions of a user with regard to elements, objects, or items of content associated with the one or more computer-based systems 925. There are likely to be different preference inferencing results for different users.

As shown in FIG. 6, the one or more computer-based systems 925 delivers adaptive communications to the user 200. These adaptive communications 250c may include adaptive recommendations 250 and/or associated explanations for the recommendations, or may be other types of communications to the user 200, including sponsored recommendations. In some embodiments the adaptive communications 250c comprise one or more phrases, where phrases can comprise one or more words. The adaptive communications 250c may be delivered to the user 200, for example, in a written form, an audio form, or a combination of these forms.

By introducing different or additional behavioral characteristics, such as the duration of access of, or monitored or inferred attention toward, an object, a more adaptive communication 250c is enabled. For example, duration of access or attention will generally be much less correlated with navigational proximity than access sequences will be, and therefore provide a better indicator of true user preferences and/or intentions and/or intentions. Therefore, combining access sequences and access duration will generally provide better inferences and associated system structural updates than using either usage behavior alone. Effectively utilizing additional usage behaviors as described above will generally enable increasingly effective system structural updating. In addition, the one or more computer-based systems 925 may employ user affinity groups to enable even more effective system structural updating than are available merely by applying either individual (personal) usage behaviors or entire community usage behaviors.

Furthermore, relying on only one or a limited set of usage behavioral cues and signals may more easily enable potential "spoofing" or "gaming" of the one or more computer-based systems 925. "Spoofing" or "gaming" the one or more computer-based systems 925 refers to conducting consciously insincere or otherwise intentional usage behaviors 920 so as to influence the costs of advertisements 910 of the one or more computer-based systems 925. Utilizing broader sets of system usage behavioral cues and signals may lessen the effects of spoofing or gaming. One or more algorithms may be employed by the one or more computer-based systems 925 to detect such contrived usage behaviors, and when detected, such behaviors may be compensated for by the preference and interest inferencing algorithms of the one or more computer-based systems 925.

In some embodiments, the one or more computer-based systems 925 may provide users 200 with a means to limit the tracking, storing, or application of their usage behaviors 920. A variety of limitation variables may be selected by the user 200. For example, a user 200 may be able to limit usage behavior tracking, storing, or application by usage behavior category described in Table 1. Alternatively, or in addition, the selected limitation may be specified to apply only to particular user communities or individual users 200. For example, a user 200 may restrict the application of the full set of her usage behaviors 920 to preference or interest inferences by one or more computer-based systems 925 for application to only herself, and make a subset of process behaviors 920 available for application to users only within her workgroup, but allow none of her process usage behaviors to be applied by the one or more computer-based systems 925 in making inferences of preferences and/or intentions and/or intentions or interests for other users.

User Communities

As described above, a user associated with one or more systems 925 may be a member of one or more communities of interest, or affinity groups, with a potentially varying degree of affinity associated with the respective communities. These affinities may change over time as interests of the user 200 and communities evolve over time. The affinities or relationships among users and communities may be categorized into specific types. An identified user 200 may be considered a member of a special sub-community containing only one member, the member being the identified user. A user can therefore be thought of as just a specific case of the more general notion of user or user segments, communities, or affinity groups.

Figure 7:
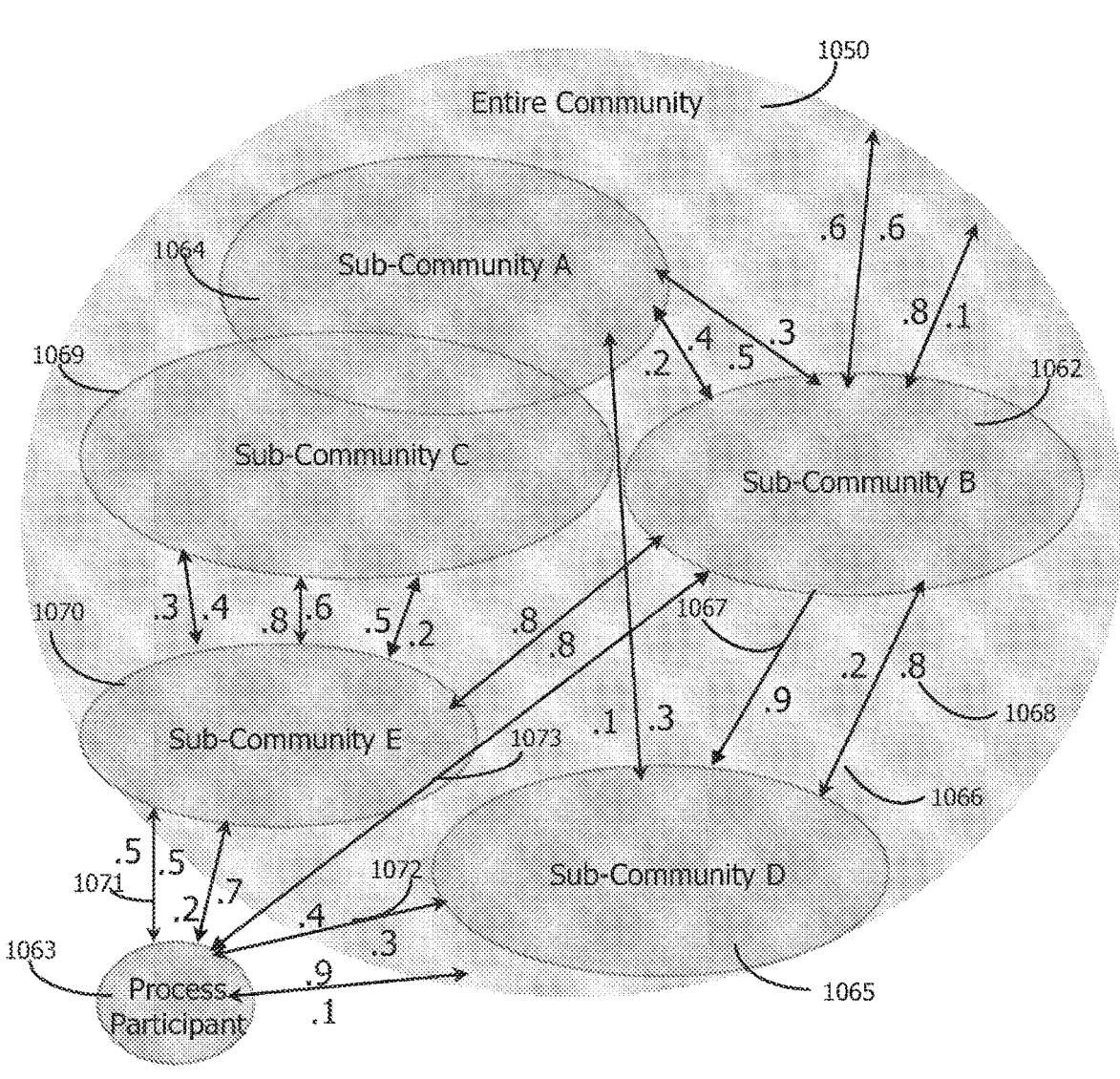
FIG. 7 is a diagram illustrating user communities and associated relationships, according to some embodiments.

FIG. 7 illustrates the affinities among user communities and how these affinities may automatically or semi-automatically be updated by the one or more computer-based systems 925 based on user preferences and/or intentions which are derived from user behaviors 920. An entire community 1050 is depicted in FIG. 7. The community may extend across organizational, functional, or process boundaries. The entire community 1050 includes sub-community A 1064, sub-community B 1062, sub-community C 1069, sub-community D 1065, and sub-community E 1070. A user 1063 who is not part of the entire community 1050 is also featured in FIG. 7.

Sub-community B 1062 is a community that has many relationships or affinities to other communities. These relationships may be of different types and differing degrees of relevance or affinity. For example, a first relationship 1066 between sub-community B 1062 and sub-community D 1065 may be of one type, and a second relationship 1067 may be of a second type. (In FIG. 7, the first relationship

1066 is depicted using a double-pointing arrow, while the second relationship 1067 is depicted using a unidirectional arrow.)

The relationships 1066 and 1067 may be directionally distinct, and may have an indicator of relationship or affinity associated with each distinct direction of affinity or relationship. For example, the first relationship 1066 has a numerical value 1068, or relationship value, of "0.8." The relationship value 1068 thus describes the first relationship 1066 between sub-community B 1062 and sub-community D 1065 as having a value of 0.8.

The relationship value may be scaled as in FIG. 7 (e.g., between 0 and 1), or may be scaled according to another interval. The relationship values may also be bounded or unbounded, or they may be symbolically represented (e.g., high, medium, low).

The user 1063, which could be considered a user community including a single member, may also have a number of relationships to other communities, where these relationships are of different types, directions and relevance. From the perspective of the user 1063, these relationship types may take many different forms. Some relationships may be automatically formed by the one or more computer-based systems 925, for example, based on explicit or inferred interests, geographic location, or similar traffic/usage patterns. Thus, for example the entire community 1050 may include users in a particular city. Some relationships may be context-relative. For example, a community to which the user 1063 has a relationship could be associated with a certain process, and another community could be related to another process. Thus, sub-community E 1070 may be the users associated with a product development business to which the user 1063 has a relationship 1071; sub-community B 1062 may be the members of a cross-business innovation process to which the user 1063 has a relationship 1073; sub-community D 1065 may be experts in a specific domain of product development to which the user 1063 has a relationship 1072. The generation of new communities which include the user 1063 may be based on the inferred interests of the user 1063 or other users within the entire community 1050.

The one or more computer-based systems 925 may automatically generate communities, or affinity groups, based on user behaviors 920 and associated preference inferences. In addition, communities may be identified by users, such as administrators of the process or sub-process instance 930. Thus, the one or more computer-based systems 925 utilizes automatically generated and manually generated communities.

Users 200 or communities may be explicitly represented as elements or objects 212 within the one or more computer-based systems 925. An object 212 representing a user 200 may include self-profiling information that is explicitly provided by the user 200. This user descriptive information may include, but are not limited to, for example, a photo or avatar, relationships to other people, subjects of interest, and affiliations.

Preference and/or Intention Inferences

Figure 8:
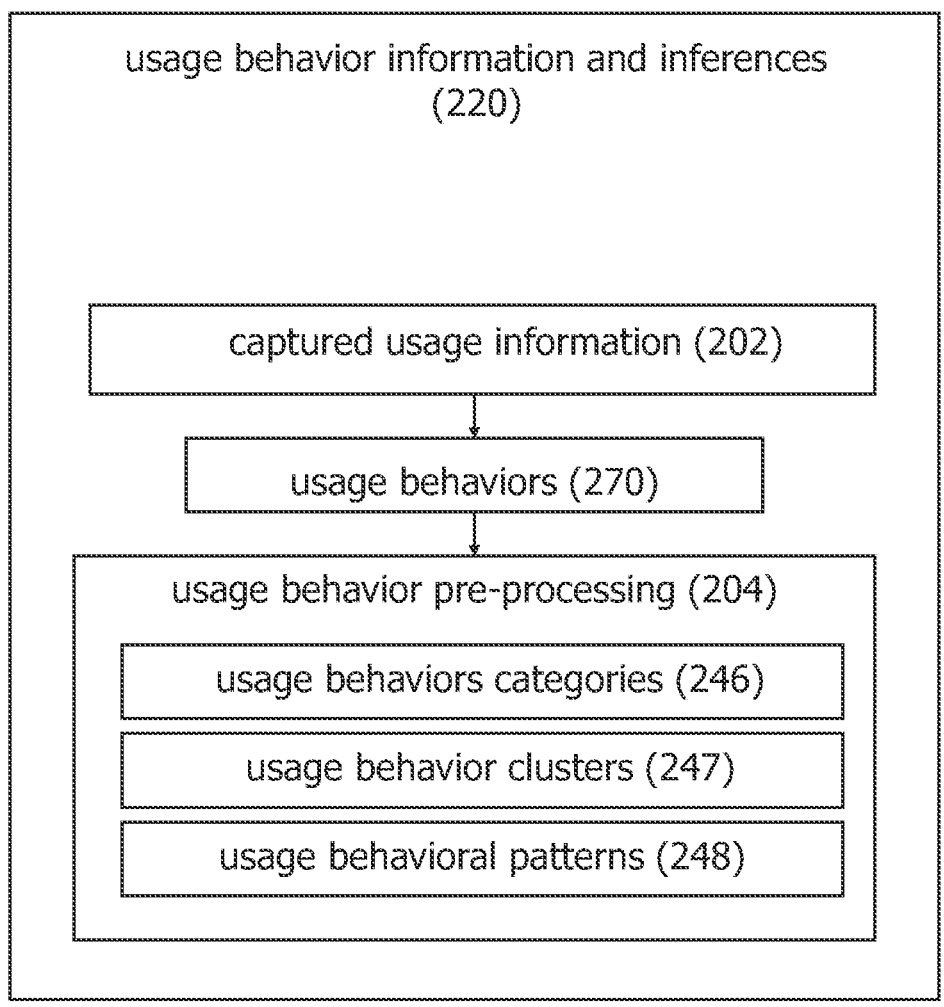
FIG. 8 is a block diagram of usage behavior processing functions of the computer-based system of FIG. 6, according to some embodiments.

The usage behavior information and inferences function 220 of the one or more computer-based systems 925 is depicted in the block diagram of FIG. 8. In embodiments where computer-based systems 925 is an adaptive system 100, then usage behavior information and inferences function 220 is equivalent to the usage aspect 220 of FIG. 1. The usage behavior information and inferences function 220 denotes captured usage information 202, further identified as usage behaviors 270, and usage behavior pre-processing

204. The usage behavior information and inferences function 220 thus reflects the tracking, storing, classification, categorization, and clustering of the use and associated usage behaviors 920 of the one or more users or users 200 interacting with the one or more computer-based systems 925.

The captured usage information 202, known also as system usage or system use 202, includes any interaction by the one or more users or users 200 with the system, or monitored behavior by the one or more users 200. The one or more computer-based systems 925 may track and store user key strokes and mouse clicks or other device controller information, for example, as well as the time period in which these interactions occurred (e.g., timestamps), as captured usage information 202. From this captured usage information 202, the one or more computer-based systems 925 identifies usage behaviors 270 of the one or more users 200 (e.g., web page access or physical location changes of the user). Finally, the usage behavior information and inferences function 220 includes usage-behavior pre-processing, in which usage behavior categories 246, usage behavior clusters 247, and usage behavioral patterns 248 are formulated for subsequent processing of the usage behaviors 270 by the one or more computer-based systems 925. Some usage behaviors 270 identified by the one or more computer-based systems 925, as well as usage behavior categories 246 designated by the one or more computer-based systems 925, are listed in Table 1, and are described in more detail below.

The usage behavior categories 246, usage behaviors clusters 247, and usage behavior patterns 248 may be interpreted with respect to a single user 200, or to multiple users 200, in which the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 246 include types of usage behaviors 270, such as accesses, referrals to other users, collaboration with other users, and so on. These categories and more are included in Table 1. Usage behavior clusters 247 are groupings of one or more usage behaviors 270, either within a particular usage behavior category 246 or across two or more usage categories. The usage behavior pre-processing 204 may also determine new "clusterings" of user behaviors 270 in previously undefined usage behavior categories 246, across categories, or among new communities. Usage behavior patterns 248, also known as "usage behavioral patterns" or "behavioral patterns," are also groupings of usage behaviors 270 across usage behavior categories 246. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, or physical location of the user 200, potentially including environmental aspects of the physical location(s). The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering.

User Behavior Categories

In Table 1, a variety of different user behaviors 920 are identified that may be assessed by the one or more computer-based systems 925 and categorized. The usage behaviors 920 may be associated with the entire community of users, one or more sub-communities, or with individual users of the one of more computer-based applications 925.

TABLE 1

Usage behavior categories and usage behaviors

| usage behavior category | usage behavior examples |
| --- | --- |
| navigation and access | activity, content and computer application accesses, including buying/selling paths of accesses or click streams execution of searches and/or search history |
| subscription and self-profiling | personal or community subscriptions to, or following of, topical areas interest and preference self-profiling following other users filters affiliation self-profiling (e.g., job function) |
| collaborative | referral to others discussion forum activity direct communications (voice call, messaging) content contributions or structural alterations linking to another user |
| reference | personal or community storage and tagging personal or community organizing of stored or tagged information |
| direct feedback | user ratings of activities, content, computer applications and automatic recommendations user comments |
| physiological responses | direction of gaze brain patterns blood pressure heart rate voice modulation facial expression kinetic expression of limbs such as tension, posture or movement expression of other users in the group |
| environmental conditions and location | current location location over time relative location to users/object references current time current weather condition |

A first category of process usage behaviors 920 is known as system navigation and access behaviors. System navigation and access behaviors include usage behaviors 920 such as accesses to, and interactions with computer-based applications and content such as documents, Web pages, images, videos, TV channels, audio, radio channels, multi-media, interactive content, interactive computer applications and games, e-commerce applications, or any other type of information item or system "object." These process usage behaviors may be conducted through use of a keyboard, a mouse, oral commands, or using any other input device. Usage behaviors 920 in the system navigation and access behaviors category may include, but are not limited to, the viewing, scrolling through, or reading of displayed information, typing written information, interacting with online objects orally, or combinations of these forms of interactions with computer-based applications. This category includes the explicit searching for information, using, for example, a search engine. The search term may be in the form of a word or phrase to be matched against documents, pictures, web-pages, or any other form of on-line content. Alternatively, the search term may be posed as a question by the user.

System navigation and access behaviors may also include executing transactions, including commercial transactions, such as the buying or selling of merchandise, services, or financial instruments. System navigation and access behaviors may include not only individual accesses and interactions, but the capture and categorization of sequences of information or system object accesses and interactions over time.

A second category of usage behaviors 920 is known as subscription and self-profiling behaviors. Subscriptions may be associated with specific topical areas or other elements of the one or more computer-based systems 925, or may be associated with any other subset of the one or more computer-based systems 925. "Following" is another term that may be used for a subscription behavior—i.e., following a topic is synonymous with subscribing to a topic. Subscriptions or following behaviors may also be with regard to other users—the subscriber or follower receives activity streams of the subscribed to or followed user. A user's following behavior is distinguished from a linking behavior with regard to another user in that a following relationship is asymmetric, while a linking (e.g., "friending") relationship is typically symmetric (and hence linking is considered in the collaborative behavior category herein). Subscriptions may thus indicate the intensity of interest with regard to elements of the one or more computer-based systems 925. The delivery of information to fulfill subscriptions may occur online, such as through activity streams, electronic mail (email), on-line newsletters, XML or RSS feeds, etc., or through physical delivery of media.

Self-profiling refers to other direct, persistent (unless explicitly changed by the user) indications explicitly designated by the one or more users regarding their preferences and/or intentions and interests, or other meaningful attributes. A user 200 may explicitly identify interests or affiliations, such as job function, profession, or organization, and preferences and/or intentions, such as representative skill level (e.g., novice, business user, advanced). Self-profiling enables the one or more computer-based systems 925 to infer explicit preferences and/or intentions of the user. For example, a self-profile may contain information on skill levels or relative proficiency in a subject area, organizational affiliation, or a position held in an organization. A user 200 that is in the role, or potential role, of a supplier or customer may provide relevant context for effective adaptive e-commerce applications through self-profiling. For example, a potential supplier may include information on products or services offered in his or her profile. Self-profiling information may be used to infer preferences and/or intentions and interests with regard to system use and associated topical areas, and with regard to degree of affinity with other user community subsets. A user may identify preferred methods of information receipt or learning style, such as visual or audio, as well as relative interest levels in other communities.

A third category of usage behaviors 920 is known as collaborative behaviors. Collaborative behaviors are interactions among the one or more users. Collaborative behaviors may thus provide information on areas of interest and intensity of interest. Interactions including online referrals of elements or subsets of the one or more computer-based systems 925, such as through email, whether to other users or to non-users, are types of collaborative behaviors obtained by the one or more computer-based systems 925.

Other examples of collaborative behaviors include, but are not limited to, online discussion forum activity, contributions of content or other types of objects to the one or more computer-based systems 925, posting information that is then received by subscribers, categorizing subscribers so as to selectively broadcast information to subscribers, linking to another user, or any other alterations of the elements, objects or relationships among the elements and objects of one or more computer-based systems 925. Collaborative behaviors may also include general user-to-user communications, whether synchronous or asynchronous, such as email, instant messaging, interactive audio communications, and discussion forums, as well as other user-to-user communications that can be tracked by the one or more computer-based systems 925.

A fourth category of process usage behaviors 920 is known as reference behaviors. Reference behaviors refer to the marking, designating, saving or tagging of specific elements or objects of the one or more computer-based systems 925 for reference, recollection or retrieval at a subsequent time. An indicator such as "like" is a reference behavior when used as a tag for later retrieval of associated information. Tagging may include creating one or more symbolic expressions, such as a word or words (e.g., a hashtag), associated with the corresponding elements or objects of the one or more computer-based systems 925 for the purpose of classifying the elements or objects. The saved or tagged elements or objects may be organized in a manner customizable by users. The referenced elements or objects, as well as the manner in which they are organized by the one or more users, may provide information on inferred interests of the one or more users and the associated intensity of the interests.

A fifth category of process usage behaviors 920 is known as direct feedback behaviors. Direct feedback behaviors include ratings or other indications of perceived quality by individuals of specific elements or objects of the one or more computer-based systems 925, or the attributes associated with the corresponding elements or objects. The direct feedback behaviors may therefore reveal the explicit preferences and/or intentions of the user. In the one or more computer-based systems 925, the recommendations 250 may be rated by users 200. This enables a direct, adaptive feedback loop, based on explicit preferences and/or intentions specified by the user. Direct feedback also includes user-written comments and narratives associated with elements or objects of the computer-based system 925.

A sixth category of process usage behaviors is known as physiological responses. These responses or behaviors are associated with the focus of attention of users and/or the intensity of the intention, or any other aspects of the physiological responses of one or more users 200. For example, the direction of the visual gaze of one or more users may be determined. This behavior can inform inferences associated with preferences and/or intentions or interests even when no physical interaction with the one or more computer-based systems 925 is occurring. Even more direct assessment of the level of attention may be conducted through access to the brain patterns or signals associated with the one or more users. Such patterns of brain functions during participation in a process can inform inferences on the preferences and/or intentions or interests of users, and the intensity of the preferences and/or intentions or interests. The brain patterns assessed may include MRI images, brain wave patterns, relative oxygen use, or relative blood flow by one or more regions of the brain.

Physiological responses may include any other type of physiological response of a user 200 that may be relevant for making preference or interest inferences, independently, or collectively with the other usage behavior categories. Other physiological responses may include, but are not limited to, utterances, vocal range, intensity and tempo, gestures, movements, or body position. Attention behaviors may also include other physiological responses such as breathing rate, heart rate, temperature, blood pressure, or galvanic response.

A seventh category of process usage behaviors is known as environmental conditions and physical location behaviors. Physical location behaviors identify geographic location and mobility behaviors of users. The location of a user may be inferred from, for example, information associated with a Global Positioning System or any other position or location-aware system or device, or may be inferred directly from location information input by a user (e.g., inputting a zip code or street address, or through an indication of location on a computer-implemented map), or otherwise acquired by the computer-based systems 925. The physical location of physical objects referenced by elements or objects of one or more computer-based systems 925 may be stored for future reference. Proximity of a user to a second user, or to physical objects referenced by elements or objects of the computer-based application, may be inferred. The length of time, or duration, at which one or more users reside in a particular location may be used to infer intensity of interests associated with the particular location, or associated with objects that have a relationship, such as proximity, to the physical location. Derivative mobility inferences may be made from location and time data, such as the direction of the user, the speed between locations or the current speed, the likely mode of transportation used, and the like. These derivative mobility inferences may be made in conjunction with geographic contextual information or systems, such as through interaction with digital maps or map-based computer systems. Environmental conditions may include the time of day, the weather, temperature, the configuration of physical elements or objects in the surrounding physical space, lighting levels, sound levels, and any other condition of the environment around the one or more users 200.

In addition to the usage behavior categories depicted in Table 1, usage behaviors may be categorized over time and across user behavioral categories. Temporal patterns may be associated with each of the usage behavioral categories. Temporal patterns associated with each of the categories may be tracked and stored by the one or more computer-based systems 925. The temporal patterns may include historical patterns, including how recently an element, object or item of content associated with one or more computer-based systems 925. For example, more recent behaviors may be inferred to indicate more intense current interest than less recent behaviors.

Another temporal pattern that may be tracked and contribute to derive preference inferences is the duration associated with the access or interaction with, or inferred attention toward, the elements, objects or items of content of the one or more computer-based systems 925, or the user's physical proximity to physical objects referenced by system objects of the one or more computer-based systems 925, or the user's physical proximity to other users. For example, longer durations may generally be inferred to indicate greater interest than short durations. In addition, trends over time of the behavior patterns may be captured to enable more effective inference of interests and relevancy. Since delivered recommendations may include one or more elements, objects or items of content of the one or more computer-based systems 925, the usage pattern types and preference inferencing may also apply to interactions of the one or more users with the delivered recommendations 250 themselves, including accesses of, or interactions with, explanatory information regarding the logic or rationale that the one more computer-based systems 925 used in deciding to deliver the recommendation to the user.

Adaptive Communications Generation

In some embodiments, adaptive communications 250c or recommendations 250 may be generated for the one or more users 200 through the application of affinity vectors.

For example, in some embodiments, Member-Topic Affinity Vectors (MTAVs) may be generated to support effective recommendations, wherein for a user or registered member 200 of the one or more computer-based systems 925 a vector is established that indicates the relative affinity (which may be normalized to the [0,1] continuum) the member has for one or more object sub-networks the member has access to. For computer-based systems 925 comprising a fuzzy content network-based structural aspect, the member affinity values of the MTAV may be in respect to topic networks.

So in general, for each identified user, which can be termed a registered member in some embodiments, e.g., member M, a hypothetical MTAV could be of a form as follows:

MTAV for Member M

| Topic 1 | Topic 2 | Topic 3 | Topic 4 | ... | Topic N |
|---|---|---|---|---|---|
| 0.35 | 0.89 | 0.23 | 0.08 | ... | 0.14 |

The MTAV will therefore reflect the relative interests of a user with regard to all N of the accessible topics. This type of vector can be applied in two major ways:

A. To serve as a basis for generating adaptive communications 250c or recommendations 250 to the user 200

B. To serve as a basis for comparing the interests with one member 200 with another member 200, and to therefore determine how similar the two members are In some embodiments, an expertise vector (MTEV) may be used as a basis for generating recommendations of people with appropriately inferred levels of expertise, rather than, or in addition to, using an MTAV as in the exemplary examples herein. That is, the values of an MTEV correspond to inferred levels of expertise, rather than inferred levels of interests, as in the case of an MTAV.

To generate a MTAV or MTEV, any of the behaviors of Table 1 may be utilized. For example, in some embodiments the following example behavioral information may be used in generating an MTAV:

1) The topics the member has subscribed to received updates

2) The topics the member has accessed directly

3) The accesses the member has made to objects that are related to each topic

4) The saves or tags the member has made of objects that are related to each topic This behavioral information is listed above in a generally reverse order of importance from the standpoint of inferring member interests; that is, access information gathered over a significant number of accesses or over a significant period of time will generally provide better information than subscription information, and save information is typically more informative of interests than just accesses.

The following fuzzy network structural information may also be used to generate MTAV values:

5) The relevancies of each content object to each topic

6) The number of content objects related to each topic

Personal topics that are not shared with other users 200 may be included in MTAV calculations. Personal topics that have not been made publicly available cannot be subscribed to by all other members, and so could in this regard be unfairly penalized versus public topics. Therefore for the member who created the personal topic and co-owners of that personal topic, in some embodiments the subscription vector to may be set to "True," i.e. 1. There may exist personal topics that are created by a member 200 and that have never been seen or contributed to by any other member. This may not otherwise affect the recommendations 250 since the objects within that personal topic may be accessible by other members, and any other relationships these objects have to other topics will be counted toward accesses of these other topics.

In some embodiments the first step of the MTAV calculation is to use information 1-4 above to generate the following table or set of vectors for the member, as depicted in the following hypothetical example:

TABLE 2

| Member 1 Behaviors | Topic 1 | Topic 2 | Topic 3 | Topic 4 | ... | Topic N |
|---|---|---|---|---|---|---|
| Subscriptions | 1 | 1 | 0 | 0 | | 1 |
| Topic Accesses | 14 | 3 | 57 | 0 | | 8 |
| Weighted Accesses | 112 | 55 | 23 | 6 | | 43 |
| Weighted Saves | 6 | 8 | 4 | 0 | ... | 2 |

The Subscriptions vector of Table 2 contains either a 1 if the member has subscribed to a topic or is the owner/co-owner of a personal topic or a 0 if the member has not subscribed to the topic. The Topic Accesses vector contains the number of accesses to that topic's explore page by the member to a topic over a period of time, for example, the preceding 12 months.

The Weighted Accesses vector of Table 1 contains the number of the member's (Member 1) accesses over a specified period of time of each object multiplied by the relevancies to each topic summed across all accessed objects. (So for example, if Object 1 has been accessed 10 times in the last 12 months by Member 1 and it is related to Topic 1 by 0.8, and Object 2 has been accessed 4 times in the last 12 months by Member 1 and is related to Topic 1 at relevancy level 0.3, and these are the only objects accessed by Member 1 that are related to Topic 1, then Topic 1 would contain the value 10*0.8+4*0.3=9.2).

The Weighted Saves vector of Table 1 works the same way as the Weighted Accesses vector, except that it is based on Member 1's object save data instead of access data.

In some embodiments, topic object saves are counted in addition to content object saves. Since a member saving a topic typically is a better indicator of the member's interest in the topic than just saving an object related to the said topic, it may be appropriate to give more "credit" for topic saves than just content object saves. For example, when a user saves a topic object, the following process may be applied:

If the Subscriptions vector indicator is not already set to "1" for this topic in Table 1, it is set to "1". (The advantage of this is that even if the topic has been saved before 12 months ago, the user will still at least get subscription "credit" for the topic save even if they don't get credit for the next two calculations).

In exactly the same way as a saved content object, a credit is applied in the Weighted Accesses vector of Table 2 based on the relevancies of other topics to the saved topic. A special "bonus" weighting in the Weighted Accesses vector of Table 2 may be applied with respect to the topic itself using the weighting of "10"-which means a topic save is worth at least as much as 10 saves of content that are highly related to that topic.

The next step is to make appropriate adjustments to Table 1. For example, it may be desirable to scale the Weighted Accesses and Weighted Saves vectors by the number of objects that is related to each topic. The result is the number of accesses or saves per object per topic. This may be a better indicator of intensity of interest because it is not biased against topics with few related objects. However, per object accesses/saves alone could give misleading results when there are very few accesses or saves. So as a compromise, the formula that is applied to each topic, e.g., Topic N, may be a variation of the following in some embodiments:

$$((\text{Weighted Accesses for Topic } N)/(\text{Objects related to Topic } N))*\text{Square Root}(\text{Weighted Accesses for Topic } N)$$

This formula emphasizes per object accesses, but tempers this with a square root factor associated with the absolute level of accesses by the member. The result is a table, Table 2A, of the form:

TABLE 2A

| Member 1 Behaviors | Topic 1 | Topic 2 | Topic 3 | Topic 4 | . . . | Topic N |
|---|---|---|---|---|---|---|
| Subscriptions | 1 | 1 | 0 | 0 | | 1 |
| Topic Accesses | 14 | 3 | 57 | 0 | | 8 |
| Weighted Accesses | 9.1 | 12 | 3.2 | 0.6 | | 2.3 |
| Weighted Saves | 0.9 | 1.3 | 1.1 | 0 | . . . | 0.03 |

In some embodiments, the next step is to transform Table 2A into a MTAV. In some embodiments, indexing factors, such as the following may be applied:

| Topic Affinity Indexing Factors | Weight |
|---|---|
| Subscribe Indexing Factor | 10 |
| Topic Indexing Factor | 20 |
| Accesses Indexing Factor | 30 |
| Save Indexing Factor | 40 |

These factors have the effect of ensuring normalized MTAV values ranges (e.g. 0-1 or 0-100) and they enable more emphasis on behaviors that are likely to provide relatively better information on member interests. In some embodiments, the calculations for each vector of Table 1A are transformed into corresponding Table 2 vectors as follows:

1. Table 3 Indexed Subscriptions for a topic by Member 1=Table 2A Subscriptions for a topic*Subscribe Indexing Factor
2. Table 3 Indexed Direct Topic Accesses by Member 1=Table 2A Topic Accesses*Topic Indexing Factor 3. Table 3 Indexed Accesses for a topic by Member 1=((Table 2A Weighted Accesses for a topic by Member 1)/(Max (Weighted Accesses of all Topics by Member 1)))*Accesses Indexing Factor
4. Table 3 Indexed Saves for a topic by Member 1=((Table 2A Weighted Saves for a topic by Member 1)/(Max (Weighted Saves of all Topics by Member 1)))*Saves Indexing Factor The sum of these Table 3 vectors results in the MTAV for the associated member 200 as shown in the hypothetical example of Table 3 below:

TABLE 3

| Member 1 Indexed Behaviors | Topic 1 | Topic 2 | Topic 3 | Topic 4 | . . . | Topic N |
|---|---|---|---|---|---|---|
| Subscriptions | 0 | 10 | 10 | 10 | | 10 |
| Topic Accesses | 5 | 1 | 20 | 0 | | 8 |
| Weighted Accesses | 11 | 1 | 30 | 12 | | 6 |
| Weighted Saves | 0 | 10 | 40 | 1 | | 2 |
| Member 1 MTAV | 16 | 22 | 100 | 23 | . . . | 26 |

In some embodiments, member-to-member affinities can be derived by comparing the MTAVs of a first member 200 and a second member 200. Statistical operators and metrics such as correlation coefficients or cosine similarity may be applied to derive a sense of the distance between members in n-dimensional topic affinity space, where there are N topics. Since different users may have access to different topics, the statistical correlation for a pair of members is preferentially applied against MTAV subsets that contain only the topics that both members have access to. In this way, a member-to-member affinity vector (MMAV) can be generated for each member or user 200, and the most similar members, the least similar members, etc., can be identified for each member 200. In some embodiments, a member-to-member expertise vector (MMEV) may be analogously generated by comparing the MTEVs of a pair of users 200 and applying correlation methods.

With the MTAVs, MMAVs, and Most Similar Member information available, a set of candidate objects to be recommended can be generated in accordance with some embodiments. These candidate recommendations may, in a later processing step, be ranked, and the highest ranked candidate recommendations will be delivered to the recommendation recipient 200,260. Recall that recommendations 250 may be in-context of navigating the system 925 or out-of-context of navigating the system 925.

A variation of the out-of-context recommendation process may be applied for in-context recommendations, where the process places more emphasis of the "closeness" of the objects to the object being viewed in generating candidate recommendation objects.

For both out-of-context and in-context recommendations, a ranking process may be applied to the set of candidate objects, according to some embodiments. The following is an exemplary set of input information that may be used to calculate rankings.

1. Editor Rating: If there is no editor rating for the object, this value is set to a default
2. Community Rating (If there is no community rating for the object, this value can be set to a default)
3. Popularity: Indexed popularity (e.g., number of views) of the object.

4. Change in Popularity: Difference in indexed popularity between current popularity of the object and the object's popularity some time ago 5. Influence: Indexed influence of the object, where the influence of an object is calculated recursively based on the influence of other objects related to said object, weighted by the degree of relationship to said object, and where the initial setting of influence of an object is defined as its popularity.

6. Author's Influence: Indexed influence of the highest influence author (based on the sum of the influences of the author's content) of the content referenced by the object 7. Publish Date: Date of publication of the object 8. Selection Sequence Type: An indicator the sequence step in which the candidate object was selected 9. Object Affinity to MTAV: The indexed vector product of the Object-Topic Affinity Vector (OTAV) and the MTAV. The values of the OTAV are just the affinities or relevancies between the object and each topic, which may be derived from behavioral and/or contents indexing processes.

A ranking is then developed based on applying a mathematical function to some or all or input items listed directly above, and/or other inputs not listed above. In some embodiments, user or administrator-adjustable weighting or tuning factors may be applied to the raw input values to tune the object ranking appropriately. These recommendation preference settings may be established directly by the user, and remain persistent across sessions until updated by the user, in some embodiments.

Some non-limiting examples of weighting factors that can be applied dynamically by a user 200 or administrator are as follows:

1. Change in Popularity ("What's Hot" factor)

2. Recency Factor

3. Object Affinity to MTAV (personalization factor)

Another example tuning factor that may be applied by a user 200 or administrator is contextual affinity, which is the degree of affinity of the object that is providing the context for the recommendation and its affinity to other objects, wherein the affinities are determined by means, for example, of applying its CTAV, or by comparison of its OCV to the OCVs of other objects. These weighting factors could take any value (but might be typically in the 0-5 range) and could be applied to associated ranking categories to give the category disproportionate weightings versus other categories. They can provide control over how important, for example, change in popularity, freshness of content, and an object's affinity with the member's MTAV are in ranking the candidate objects.

The values of the weighting factors are combined with the raw input information associated with an object to generate a rating score for each candidate object. The objects can then be ranked by their scores, and the highest scoring set of X objects, where X is a defined maximum number of recommended objects, can be selected for deliver to a recommendation recipient 200,260. In some embodiments, scoring thresholds may be set and used in addition to just relative ranking of the candidate objects. The scores of the one or more recommended objects may also be used by the computer-based system 925 to provide to the recommendation recipient a sense of confidence in the recommendation. Higher scores would warrant more confidence in the recommendation of an object than would lower scores.

In some embodiments other types of recommendation tuning factors may be applied by a user 200 or administrator.

For example, the scope of a social network, such as degrees of separation, may be adjusted so as to influence the recommendations 250, and/or relationship types or categories of social relationships may be selected to tune recommendations 250. Recommendation recipients 200 or administrators may also or alternatively be able to restrict objects 212 representing other specified users 200 from being recommended, or restrict objects authored or otherwise having an affiliation with other specified users.

In some embodiments the scope of geography or distance from a current location, including, but not limited to, the expected time to travel from the existing location to one or more other locations, may be tuned or adjusted so as to influence recommendations 250. The expected time to travel may be a function of the actual or inferred mode of transportation of the recommendation recipient, road conditions, traffic conditions, and/or environmental conditions such as the weather. The specification of scope of geography, distance, and/or time-to-travel may be via an automated monitoring or inference of the recommendation recipient's current location, or may be via an explicit indication of location by the recommendation recipient through entering a location designation such as a zip code, or by indicating a location on a graphical representation of geography, for example, by indication location on a computer-implemented map display.

Other tuning factors that may be applied to influence recommendations 250 include the ability for the recommendation recipient to select a recommendation recipient mood or similar type of "state of mind" self-assessment that influences the generation of a recommendation. For example, a recommendation recipient might indicate the current state of mind is "busy," and less frequent and more focused recommendations 250 could be generated as a consequence.

For recommendations of people, recommendation recipients 200 can tune the recommendations 255 they receive by the degree of similarity of interests for one or more topics, according to some embodiments. Similarly, recommendation recipients may tune recommendations of people by the degree of difference in their level of expertise for one or more topics versus other users. This can be beneficial, for example, when a recommendation recipient seeks to receive recommendations of other people who have greater levels of expertise than themselves for one or more topics, but not too much greater levels of expertise.

In some embodiments, another type of tuning that may be applied by a user or administrator relates to the degree to which the capacity for enhanced serendipity is incorporated within the recommendation generating function 240 of the adaptive system 100.

In some embodiments a serendipity function comprises an interest anomaly function that identifies contrasting affinities between a first user's MTAV and a second user's MTAV. Situations in which the first user's MTAV and the second user's MTAV have contrasting values associated with one or more topical areas, but wherein the two MTAVs otherwise have a higher than typical level similarity (as determined a vector similarity function such as, but not limited to, cosine similarity or correlation coefficient functions), present the opportunity for preferentially recommending objects 212 with a relatively high affinity to the topical areas associated with the contrasting MTAV affinities. More specifically, for two users 200 that have a relatively high level of similarity based on a comparison of their entire MTAVs, if the affinity values of the first user's MTAV corresponding to one or more topical areas is relatively high, and the affinity values of the second user's MTAV corresponding to the one or more topical areas is relatively low, then one or more objects 212 with relatively high OTAV values associated with the one or more topical areas may be preferentially recommended to the second user.

In some embodiments, the amount and/or quality of usage behavioral information on which the respective MTAV affinity values of the two users is based may additionally influence the generated recommendation 250. Specifically, in the above example, if the affinity values of the second user's MTAV corresponding to the one or more topical areas are relatively low and there is relatively little behavioral information on which said affinity values are based, then there is even greater motivation to recommend one or more objects 212 with relatively high OTAV values associated with the one or more topical areas to the second user. This is because there is incrementally greater value in learning more about the user's interest than if the low affinities were based on inferences from a larger body of behavioral information, as well as there being a less likelihood of providing a recommendation 250 that is truly not of interest to the user.

In some embodiments, then, a general method of generating beneficially serendipitous recommendations combines the contrasting of topical affinities among users 200 and the relative confidence levels in the topical contrasting affinities. This approach provides a "direction" for generating recommendations that are further from inferred interests that would otherwise be generated. Besides direction, a serendipity function may also include a "distance" factor and a probability factor. That is, according to some embodiments generating serendipity can be thought of as exploring other areas of a multi-dimensional interest landscape, where the best inference based on historical behavioral information is a (local) maximum on the landscape. The serendipity function can be thought of as performing a "jump" on the interest landscape, where the jump is in a specified direction, for a specified distance, and performed with a specified frequency or probability. One or more of these serendipity distance, direction, and probability parameters may be tunable by a user 200 or administrator in accordance with some embodiments.

In some embodiments the serendipity function may include applying a degree of randomization in addition to, or instead of, applying the interest anomaly function. This randomization function may be applied when selecting objects 212 from a set of candidate objects to be recommended to a recommendation recipient rather than simply relying on deterministic scoring means. In such embodiments the serendipity tuning function can be used by a user 200 or administrator to control the degree to which delivered recommendations 255 deviate from the recommendations that would otherwise be delivered using purely deterministic means.

The serendipity distance may be generated in accordance with a mathematical function. In some embodiments, the distance and/or probability factors may be generated in accordance with a power law distribution—as a non-limiting example, the distance and/or probability factors may be in accordance with a Levy Walk function.

It should be understood that other recommendation tuning controls may be provided that are not explicitly described herein.

Knowledge and Expertise Discovery

Knowledge discovery and expertise discovery refer to "learning layer" functions that generate content recommendations and people recommendations 250, respectively.

For expertise discovery, there are at least two categories of people that may be of interest to other people within a user community:

1. People who have similar interest or expertise profiles to the recommendation recipient, which may be calculated, for example, in accordance with MMAVs and MMEVs.
2. People who are likely to have the most, or complementary levels of, expertise in specified topical areas Expertise discovery functions deliver recommendations 250 within a navigational context of the recommendation recipient 200, or without a navigational context. In some embodiments, a person or persons may be recommended consistent with the "navigational neighborhood," which may be in accordance with a topical neighborhood that the recommendation recipient 200 is currently navigating. The term "navigating" as used herein should be understood to most generally mean the movement of the user's 200 attention from one object 212 to another object 212 while interacting with, or being monitored by, a computer-implemented user interface (wherein the user interface may be visual, audio and/or kinesthetic-based). Entering a search term, for example, is an act of navigating, as is browsing or scrolling through an activity stream or news feed through use of a mouse, keyboard, and/or gesture detection sensor.

In some embodiments expertise may be determined through a combination of assessing the topical neighborhood in conjunction with behavioral information 920. The behavioral information that may be applied includes, but is not limited to, the behaviors and behavior categories in accordance with Table 1. As a non-limiting example, an expertise score may be generated from the following information in some embodiments:

1. The scope of the topical neighborhood, as described herein
2. The topics created by each user within the topical neighborhood
3. The amount of content each user contributed in the topical neighborhood
4. The popularity (which may be derived from accesses and/or other behaviors) of the content
5. The ratings of the content In some embodiments, user-controlled tuning or preference controls may be provided. For example, an expertise tuning control may be applied that determines the scope of the navigational neighborhood of the network of content that will be used in calculating the total expertise scores. The tuning controls may range, for example, from a value V of 1 (broadest scope) to 5 (narrowest scope).

In some embodiments, the topical neighborhood of the currently navigated topic T may then defined as encompassing all content items with a relationship indicator R 718 to topic T 710*t* such that R>V−1. So if V=5, then the topical neighborhood includes just the content that has a relationship of >4 to the topic T, and so on. Expertise tuning may be effected through a function that enables expertise breadth to be selected from a range corresponding to alternative levels of V, in some embodiments.

In some embodiments, other tuning controls may be used to adjust expertise discovery recommendations 250 with regard to depth of expertise, in addition to, or instead of, breadth of expertise. For example, for a given navigational neighborhood, a user 200 or administrator may be able to adjust the required thresholds of inferred expertise for a recommendation 250 to be delivered to the recommendation recipient 200, and/or may be able to tune the desired difference in expertise levels between the recommendation recipient and recommended people. Tuning of recommendations 250 may also be applied against a temporal dimension, so as to, for example, account for and/or visualize the accretion of new expertise over time, and/or, for example, to distinguish long-term experts in a topical area from those with more recently acquired expertise.

In some embodiments, the expertise discovery function may generate recommendations 250 that are not directly based on navigational context. For example, the expertise discovery function may infer levels of expertise associated with a plurality of topical neighborhoods, and evaluate the levels of expertise for the topical neighborhoods by matching an MTAV or MTEV, or other more explicit indicator of topical expertise demand associated with the recommendation recipient 200 and a plurality of MTEVs of other users. Positive correlations between the expertise recommendation recipient's MTAV or topical expertise demand indicators and an MTEV, or negative correlations between the expertise recommendation recipient's MTEV and another MTEV, are factors that may influence the generation of expertise recommendations. In some embodiments, the MMAV or an expertise matching equivalent such as an MMEV of the recommendation recipient 200 may be applied by the expertise discovery function in evaluating other users 200 to recommend.

In some embodiments recommendation recipients 200 may select a level of expertise desired, and the expertise discovery function evaluates expertise levels in specific topical neighborhoods for matches to the desired expertise level. The recommendation recipient 200 may set the expertise discovery function to infer his level of expertise in a topical neighborhood and to evaluate others users for a similar level of expertise. The inference of expertise may be performed based, at least in part, by comparing the values of the recommendation recipient's MTEV with the associated topics in the specified topical neighborhood.

In some embodiments expertise may be inferred from the pattern matching of information within content. For example, if a first user 200 employs words, phrases, or terminology that has similarities to a second user 200 who is inferred by the system to have a high level expertise, then everything else being equal, the system 100 may infer the first user to have a similar level of expertise and that is therefore also a higher than an average level of expertise. In some embodiments vocabularies that map to specific areas and/or levels of expertise may be accessed or generated by the system 100 and compared to content contributed by users 200 in evaluating the level of expertise of the users.

Recall that the MTEV can be generated from behavioral information, including but not limited to the behaviors 920 and behavioral categories described in Table 1, similarly to the MTAV, except expertise is inferred rather than interests and preferences. As just one example of the difference in inferring an expertise value associated with a topic rather than an interest value, clicking or otherwise accessing an object 212 may be indicative of a interest in the associated topic or topics, but not very informative about expertise with regard to the associated topic or topics. On the other hand, behaviors such as, but not limited to, creating objects, writing reviews for objects, receiving high ratings from other users with regard to created objects, being subscribed to by other users who have an inferred relatively high level of expertise, creation or ownership of topics, and so on, are more informative of expertise levels with regard to the associated topic or topics, and are preferentially applied in generating MTEV values according to some embodiments. Similarly to the generation of MTAVs, weights may be applied to each of multiple types of behavioral factors in generating composite MTEV values in accordance with their expected relative strength of correlation with actual expertise levels.

In some embodiments a difference between the calculation method of an MTAV versus that of an MTEV is that MTAV values are indexed across topics—that is, the MTAV values represent relative interest levels of a user 200 among topics, whereas MTEV values are indexed across users 200—that is, the MTEV values represent relative levels of expertise among users 200.

In some embodiments, MTEV values may be calibrated using a benchmarking process, enabling an inference of an absolute level of expertise instead of, or in addition to, an inference of a relative level of expertise among users. For example, a test result or other type of expertise calibration information may be applied that establishes a benchmark expertise level for a user 200 across one or more topics. Expertise calibration means include, but are not limited to, educational proxies for expertise levels such as certifications, education programs, degrees attained, experience levels in a field or performing an activity, and/or current or past professions. For example, a recent graduate degree in a specific branch of mathematics would be indicative of a high level of expertise in that branch of mathematics, and likely a fairly high level of expertise in mathematical topics in general. The expertise calibration information may be available to the recommendation function 240 through a user's self-profiling behavior, or may be accessed through other means.

The inferred MTEV values for the benchmarked user can then be used as a basis for indexing the inferred MTEV values of other users 200. This approach can be beneficial because an inferred expertise level that is calibrated against a benchmark level can enable the generation of more effective recommendations, particularly with regard to the generation of recommendations of content and/or topics. Whereas for recommendations of expertise (e.g., recommendations of other users), a purely relative expertise levels may be sufficient for generating useful recommendations, the process of generating recommendations of content or topics can often benefit from having a greater sense of absolute levels of expertise. This is particularly the case when the recommendation function 240 has access to information that is suggestive of the levels of expertise for which potentially recommended content or topics are appropriate. Information that is suggestive of the levels of expertise for which an object 212 will be most appropriate may be acquired by the recommendation function 240 through access to an explicit indication, such as, for example, through and expertise level indication within meta-information 712 associated with an object 212,710, or the recommendation function 240 may assess the expertise levels for which an object 212 would be most appropriate through inferences from the content or information 232 within the object.

In some embodiments, the recommendation function 240 combines one or more MTAVs with one or more MTEVs in generating a recommendation 255,265. For example, first, the MTAV of a recommendation recipient may be used by the recommendation function 240 to determine the one or more topics of highest interest to the recommendation recipient. The recommendation function may then compare the recommendation recipient's MTEV to the MTEVs of other users to identify one or more of the topics of highest interest for which the recommendation recipient has a lower level of expertise (or more generally, a complementary level of expertise) compared to one or more other users. The one or more other users whose MTEVs satisfy this condition are then candidates for recommending to the recommendation recipient. Another example of combining MTAV and MTEV information in generating a recommendation 255,265 is first identifying the one or more topics of highest interest to the recommendation recipient, and then using the recommendation recipient's MTEV to recommend content or topics that are consistent with the MTEV values associated with the highest interest topics. Where the recommendation function 240 is able to assess the levels of expertise for which an item of content or topic are appropriate, those levels of expertise can be compared against the corresponding MTEV values and serve as at least one factor in the recommendation function users in deciding whether to recommend the item of content to the recommendation recipient.

Inferences of levels of expertise can be informed by collaborative behaviors with regard to other users 200 who are inferred to have given levels of expertise. In some embodiments users 200 are automatically clustered or segmented into levels of inferred expertise. Often, levels of expertise cluster—that is, people with similar levels of expertise preferentially collaborate, a tendency which can be beneficially used by the expertise inferencing function. A recursive method may be applied that establishes an initial expertise clustering or segmentation, which in conjunction with collaborative and other behaviors, enables inferences of expertise of these and other users not already clustered, which then, in turn, enables adjustments to the expertise clusters, and so on.

Inferences of expertise that are embodied within an MTEV may be informed by the contents of objects associated with a user 200, in accordance with some embodiments. For example, the use, and/or frequency of use, of certain words or phrases may serve as a cue for level of expertise. More technical or domains-specific language, as informed by, for example, a word or phrase frequency table, would be indicative of level of expertise in a field. Other expertise cues include punctuation—question marks, everything else being equal, are more likely to be indicative of less expertise.

In some embodiments, when a recommendation of expertise in topical neighborhoods or for one or more specific topics is required, the selected topics are compared to user MTEVs to determine the best expertise match to the selected topics. For example, a specific project may require expertise in certain topical areas. These selected topical areas are then compared to MTEVs to determine the users with be most appropriate level of expertise for the project.

In some embodiments, the selected topics for which expertise is desired may be weighted, and the weighted vector of selected topics is compared to the corresponding topical expertise values in user MTEVs—positive correlations between the weighted vector of selected topics and the MTEVs of other users are preferentially identified. Mathematical functions are applied to determine the best expertise fit in the weighted selected topic case or the un-weighted selected topic case.

In some embodiments, the behaviors of users within one or more expertise segments or clusters are assessed over a period of time after an event associated with one or more topical areas. The event, embodied as an object 212, could, for example correspond to a condition identified by another user or be identified and communicated by a device. The post-event behaviors assessed for expertise cohorts may then form the basis for recommended content, people, and/or process steps to be delivered to users 200 when the same or similar event occurs in the future. These event-specific recommendations 250 may be tempered by an assessment of the recommendation recipient's MMEV such that if relatively high levels of expertise are inferred relative to the event or related topics, then "best practice" process step recommendations 250 derived from the post-event behaviors associated with the highest expertise cohort may be recommended. If relatively lower levels of expertise are inferred relative to the event or related topics, then process step recommendations 250 derived with the highest expertise cohort may be supplemented with, for example, additional educational or verification steps.

Adaptive Semantic System and Method

Semantic approaches, as exemplified by, but not limited to, the Resource Description Framework (RDF), refer to system relationships that are represented in the form of a subject-predicate-object chain (a syntactic "triple"), wherein the predicate is typically a descriptive phrase, but can be a verb phrase, that semantically connects the subject with the object of the predicate. Since the subject and the object of the predicate can be represented as computer-implemented objects 212, semantic chains can represent computer-implemented object-to-object relationships that are informed by the associated predicate in the semantic chain. Most generally, subjects, predicates, and objects of the predicates of semantic chains can each be represented in a computer-based system 925 as computer-implemented objects 212. Semantic chains may be established manually, but can also be generated automatically by the computer-based system 925 through, for example, natural language processing (NLP) techniques that are applied to text strings such as sentences within a computer-implemented object 212 so as to automatically decompose the text into one or more semantic triples. Additional or alternative automatic techniques that can be applied by the computer-based system 925 to extract semantic chains from natural language can include generating vectors of values for language elements such as words or phrases within one or more objects 212, and generating relationships based on vector comparisons among these language elements. Text can additionally or alternatively also be automatically analyzed through the application of a graphical-based logical form in which elements of text are represented as nodes and edges of the graph represent grammatical relationships to derive semantic chains. Semantic chains that are derived from natural language using these or other techniques known in the art may then be linked or chained together as is described in more detail herein. More generally, semantic chains can be represented by predicate calculus, and it should be understood that processes disclosed herein with respect to semantic chains apply more generally to predicate calculus-based representations.

In some embodiments weightings, which may comprise probabilities, are applied to semantic chains. For example, the semantic chain Object(1)-Predicate(1)-Object(2) may have a weighting (which may be normalized to the range 0-1), "W1" assigned to it: W1(Object(1)-Predicate(1)-Object(2)). Such a weighting (which may be termed a "W1-type" weight or probability hereinafter) may correspond to a probabilistic confidence level associated with the semantic chain. The weighting may be calculated by inferential statistical means based upon content-based patterns and/or user behavioral patterns (such as word or phrase matching frequency and/or length matched chain sub-elements). For example, the semantic chain "Red Sox-is a-team" might be assigned a weighting of 0.80 based on an inferential confidence given a first set of textual content from which the semantic chain is statistically inferred (and where "textual"

or "text" as used herein may be in written or audio language-based forms). This weighting might be increased, say to 0.99, based on an analysis of additional text that seems to strongly confirm the relationship. Such weightings may therefore be considered probabilities that the inference is true—that is, the probability that the inference accurately reflects objective reality. It should be understood that such probabilistic inferences with respect to semantic chains may be made basis inputs other than just through the analytic processing of text-based computer-implemented objects. Such inferences can be alternatively or additionally be made with respect to patterns of information that are identified with respect computer-implemented objects 212 comprising images or audio-based information, for example. For example, in some embodiments, neural network-based systems are trained to make inferences of relevant semantic chains from text and/or images and to inform W1-type weights associated with the inferred semantic chains. In some embodiments Bayesian program learning-based processes are applied to make inferences of relevant semantic chains from text and/or images and to inform W1-type weights associated with the inferred semantic chains.

In addition, or alternatively, a contextual weighting, "W2", may be applied that weights the semantic chain based on the relative importance or relevance of the relationships described by the semantic chain versus other relationships with respect to one or both of the objects (which may be included in one or more other semantic chains) within the semantic chain (and such weights may be termed a "W2-type" weight hereinafter). For example, a W2-type weight as applied to the semantic chain "Red Sox-is a-team" may be greater than the W2-type weight applied to the semantic chain "Red Sox-is a-logo" for a particular inferential application. While both semantic chains may be valid (that is, accurately reflect objective reality), the term "Red Sox" as used in a randomly selected item of content is more likely to be used in the context of being a team than as being used in the context of being a logo, and should therefore, everything else being equal, be more likely be used as a basis for subsequent computer-implemented semantic interpretations of content that includes a reference to "Red Sox". As in the case of W1-type weights, W2-type weights may correspond to probabilities, and may be established and/or adjusted based on statistical inferences from content (in a simple, non-limiting example, based on the frequency of co-occurrences of the respective objects in the semantic chain within a corpus of content) and/or from inferences derived from user 200 behaviors as described in Table 1. Alternatively, W2-type weightings may be explicitly established by humans.

So, in summary, whereas weightings of the type associated with W1 can be construed to be the probability that the associated semantic chain accurately reflects objective reality, weightings of the type associated with W2 can be construed to be the probability the associated semantic chain validly applies semantically in the context of interpreting specified content.

These foregoing semantic representations are contrasted with behavioral-based user-predicate-object computer-implemented representations, which, while they can be represented in a similar chain or "triple" form as RDF, are distinguished in that the subject in behavioral-based chains represents or refers to an actual user 200 of the computer-based system 925, and the associated predicate represents actions or behaviors 920 that the user 200 of the system exhibits or performs in association with a system object 212, or in which the associated predicate is an inference, for example, of the user's 200 state of mind or, as another example, a historical event associated with the user 200. The predicates of the behavioral-based triple may include, but are not limited to, actions or behaviors 920 exhibited by the user as described by Table 1 and associated descriptions. The predicates of some types of behavioral-based triples may comprise computer-generated inferences rather than a specifically performed or monitored behavior 920 in some embodiments. For example, for the behavioral-based triple User(1)-Is Interested In-Object(1), the predicate "Is Interested In" may be an inference derived from one or more usage behaviors 920. As another example, for the behavioral-based triple User(1)-Has High Expertise In-Object(1), the predicate "Has High Expertise In" may be an inference derived from one or more usage behaviors 920 and/or an analysis of content. These two examples comprise inferences of a user's state of mind or capabilities. More concrete inferences, such as of events or relationships, may also be made—for example, the behavioral-based triple User(1)-Worked For-Object(1), the predicate "Worked For" may be an inference that is made from a statistical analysis of content and/or from one or more usage behaviors 920. In such event-based applications temporal indicators such as a timestamp or time period may be associated with the associated behavioral-based triple. Such temporal indicators can further enable the computer-based system 925 to make connections between events and promote more effective inferencing.

W1-type weights may be applied to behavioral-based chains that comprise an inferred predicate relationship between the user 200 and the object of the predicate, the W1-type weight thereby representing the degree of confidence that the behavioral-based chain represents objective reality, whereby objective reality in this case may constitute the user's current or future state-of-mind.

Behavioral-based triples may be with respect to "real-world" locations or physical objects that are located at a particular point or proximity in space and/or time, in some embodiments. For example, a user 200 may be determined to be at Fenway Park by, for example, matching the user's currently inferred location from a location-aware device that is associated with the user to a computer-implemented map that maps physical objects such as Fenway Park to particular geographical locations. This determination could be represented, for example, as the behavioral-based triple User(1)-Is Located At-Fenway Park, and with an associated time stamp t(1). This same approach can be applied to simulations of real-world environments or real world-like environments (i.e., virtual reality applications), where the user 200 in the behavioral triple is represented in the simulation, by, for example, an avatar.

Behavioral-based triples may be with respect to two people, and the object of the predicate of the triple may represent or reference another system user 200. For example, User(1)-Is Located Near-User(2) is an example of an event-based behavioral triple (and that may have an associated temporal indicator) and User(1)-Is a Friend of-User(2) is an example of an inferential behavioral triple, in which the system automatically infers the "Is a Friend of" predicate.

In summary, while the subjects and predicates in semantic triples are therefore generally different in nature from behavioral-based triples, the similarity of syntactical structure can be beneficially used to extend semantic-based approaches so that they are adaptive to users 200.

In some embodiments semantic chains are converted to OTAVs. Predicate relationships between objects are transformed to numerical values (i.e., affinities) in such embodiments, which can have, for example, scalability advantages. These OTAV affinities may correspond to, or be influenced by or calculated from, corresponding W1-type or W2-type semantic chain weightings.

In some embodiments, the behavioral-based representations of user-predicate-object are linked to semantic-based object-to-object 212 relations 214. For example, for a specific computer-implemented object 212, denoted as Object (1), for which there is at least one user behavioral-based relationship, User-Predicate(1)-Object(1) (where Predicate (1) may comprise an inference), and at least one semantic relationship between objects—for example, an RDF-based relationship of the form, Object(1)-Predicate(2)-Object(2) (where Predicate(2) may comprise an inference), inferences with respect to User 200 and Object(2) may be derived from the extended chain of User-Predicate(1)-Object(1)-Predicate (2)-Object(2). In this example, Object(1) enables the linking because it is commonly referenced by the behavioral-based chain and the semantic chain. Most generally, such linking can be performed when the subject of the semantic chain has a correspondence to the object of the predicate of the behavioral-based chain. The correspondence between such subject and object pairs may be based, for example, on the subject and object referring to the same entity or information, or representing the same entity or information.

Composite chains can be extended indefinitely by identifying the subject of a semantic chain that has a correspondence with the terminal object of a predicate of a composite chain, and linking the identified semantic chain to the end of the composite chain, thereby assembling a new, extended composite chain, which can in turn be extended.

In some embodiments, one or more of the constituent semantic chains of such composite chains may include W1-type and/or W2-type weightings. Mathematical operations may be applied to these weightings to derive a composite weighting or probability for the composite chain. For example, where there are multiple individual semantic chain weightings that each correspond to a probability within a composite chain, and probabilistic independence is assumed, the individual weightings may be multiplied together to yield a composite chain probability, e.g., a probability that the composite chain is a valid inference of objective reality and/or a probability that the composite chain semantically validly applies to an interpretation of particular content.

Further, as previously described herein, behavioral-based chains may be weighted as well with W1-type weights that correspond to the probability that the inference of the behavioral-based chain accurately reflects objective reality—in some cases, objective reality being a conscious or unconscious mental state of the user that cannot be directly assessed, but must rather be inferred from behaviors 920. This type of behavioral-based chain weighting may be combined with mathematical operations (such as multiplication) with one or more semantic chain weightings to yield a composite chain weighting or probability. Such composite weightings may correspond to affinity values of MTAVs or MTEVs in some embodiments; for example, where a composite chain includes a terminal object (last object in the semantic chain) that comprises a topic that is also associated with an MTAV or MTEV.

Recommendations 250 can then be generated based on these linked or composite chains. As a simple non-limiting example, assume that a behavioral-based triple is, User(1)-"likes"-Object(1), whereby the predicate "like" is a user action 920 of "liking" a computer-implemented object as described by the descriptions that are associated with Table 1. This behavioral-based triple might be applied directly, or it may serve as a basis (along with potentially other behavioral-based chains) for an inferential behavioral-based chain such as, User(1)-Is Favorably Disposed Toward-Object(1), whereby the predicate "Is Favorably Disposed Toward" is inferred from one or more usage behaviors 920 (such as a "like" action by a user 200) and/or from content-based pattern matching. The confidence with respect to this inference may be encoded as a W1-type weighting that is associated with the inferred behavioral-based triple.

As a further example, assume that there exists a semantic triple of Object(1)-"is a"-Object(2), wherein the "is a" predicate designates that Object(1) is a type of, or subset of, Object(2). The system can then generate the composite chain User(1)-"likes"-Object(1)-"is a"-Object(2). The system can then make an inference that User(1) likes or is favorably disposed toward Object(2), and may apply weightings that are associated with the behavioral-based based chain and/or the semantic chain in quantifying the degree of confidence with respect to the inference. Such quantifications may be encoded as one or more affinity values within the MTAV of User(1), in some embodiments. Other composite chains terminating with Object(2) could additionally be applied that could have a further effect on the inference quantification (e.g., strengthening or weakening the confidence in the inference).

It should be recalled that a computer-implemented object 212 as defined herein can comprise content, or a pointer to content, that is in the form of a document, image, or audio file, but can also be a topic object, which comprises a label or description of other objects. So another non-limiting example is, User(1)-"viewed"-Object(1), where the predicate "viewed" is a user 200 action of viewing a computer-implemented object as described by Table 1, and Object(1)-"is about"-Object(2), where Object(2) is a topic object or tag that designates "baseball." The system can then determine the composite chain User(1)-viewed-Object(1)-is about-Object(2). The system therefore determines that user (1) has viewed content that is about baseball, and could therefore be able to infer a user interest with respect to baseball. To continue the example, assume a semantic triple of Object (1)-"is about"-Object(3), wherein Object(3) is a topic object or tag that designates "Red Sox." Then, assume there also exists the semantic triple, Red Sox-is located-Boston. The system can then assemble the chain, User(1)-viewed-Object (1)-is about-Red Sox-is located-Boston, which could allow the system to infer that User(1) has an interest in Boston or things located in Boston in general, although this would likely be a very weak inference in this example given only one view behavior, and this weak inference could be encoded as a corresponding low weighting or probability associated with the composite chain that is derived from weightings or probabilities associated with the composite chain's behavioral-based chain (or weightings or probabilities of a corresponding inferred behavioral-based chain derived, at least in part, from the User(1)-"viewed"-Object (1) chain) and/or with one or more of the composite chain's constituent semantic chains.

Figure 14A:
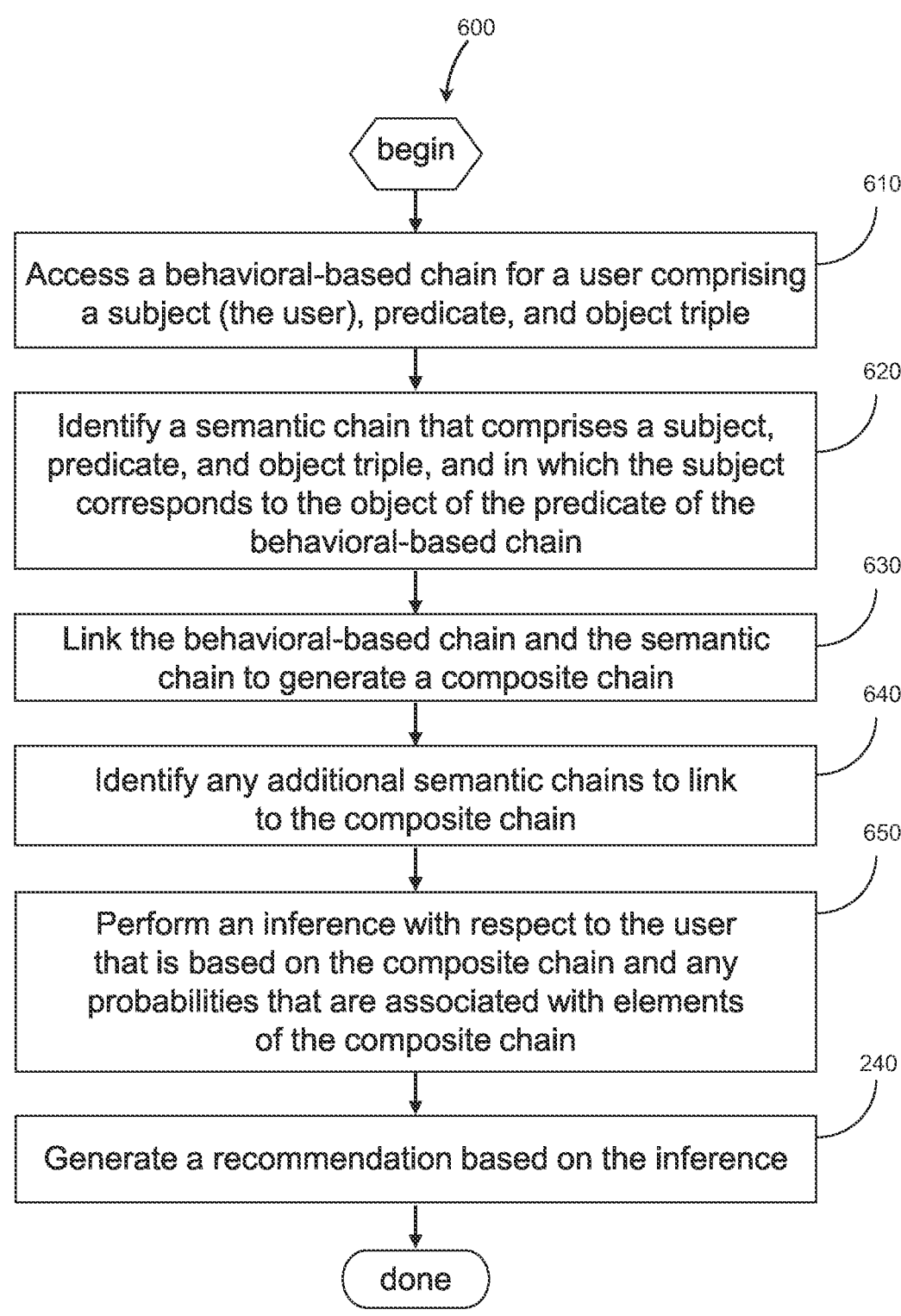
FIG. 14A is a flow diagram of a process of integrating, and generating inferences from, behavioral-based chains and semantic chains, according to some embodiments.

FIG. 14A summarizes the computer-implemented process 600 for generating recommendations 250 or, more generally, personalized communications, 250c, derived from the linking of behavioral-based and semantic chains and the performing of inferences from the resulting composite chains. In the first step 610 of the process 600 a behavioral-based chain that includes a subject that is associated with a user 200 is accessed. A semantic chain is then identified 620 that comprises a subject-predicate-object triple in which the subject has a correspondence with the object of the predicate of the behavioral-based chain. This correspondence enables linking 630 the behavioral-based chain and the semantic chain to form a composite chain. One or more additional semantic chains may be identified 640 to be linked to the composite chain by identifying any semantic chains that comprise a subject that has a correspondence to the terminal object of the composite chain. If at least one such semantic chain is identified, the semantic chain may be added to the composite chain, thereby creating a new composite chain, and step 640 may be repeated with this resulting composite chain. After assembly of the composite chain is completed, inferences may be performed 650 that are derived from the composite chain and its associated probabilities as described herein. The inferences may then be used to generate 240 recommendations 250, or more generally, personalized communications 250c.

Inferences derived from composite behavioral-based and semantic chains can be used to generate MTAV and/or MTEV or values. In the example above, "Boston" could be a topic in the MTAV of User(1) with an associated inferred affinity value. Had the predicate in the example above been "created" instead of "viewed" and other users had rated Object(1) highly, then "Red Sox", might be a topic in the MTEV of User(1) with an associated inferred affinity or expertise value.

In some embodiments linked behavioral-based and semantic chains can be further linked or mapped to OCVs. For instance, in the example above, if the term "Red Sox" has a sufficiently high value in the OCV associated with a document embodied in an object 212, then an inference might be made by the computer-based system 925 between User(1) and the associated object 212 that has a sufficiently high value for "Red Sox" in the object's OCV. This inference could in turn become a basis for a recommendation 250.

While these examples are with respect to behavioral-based and semantic triples, other syntactical structures or symbolic representations can also be applied by the computer-based system 925—for example, this method of integration of behavioral-based and semantic chains can be applied to syntactical structures that are in accordance with, or can be represented by, a predicate calculus. In some embodiments, semantic chains may be alternatively represented as taxonomies or ontologies such as hierarchical structures.

In some embodiments a semantic chain or composite chain may constitute a metaphorical semantic or composite chain, which may be also be termed a metaphorical construct herein. Metaphorical semantic chains and/or metaphorical composite chains can be applied to generate communications 250c that are perceived to be particularly creative or humorous, for example, or to perceive or interpret creativity or humor associated with information that is processed by the computer-based system 925.

A metaphor can be considered a semantic relationship that is transferred from one context or subject area to another context or subject area. For example, "strike out" in its original context of baseball is a failure by a batter to put a baseball into play or draw a walk. So among a number of semantic chains that are valid in this context is the generalized semantic chain, Strike out-is a-Failure. Such a semantic chain may be automatically inferred from, for example, a statistical analysis of a corpus of content, application of a computer-implemented neural network on the corpus of content, or may be manually determined, and may have a W1-type weight associated with it. Derivation of this particular semantic chain from a specific domain of application (in this case, baseball) constitutes a process of context stripping and transferring—that is, the original context of baseball is "stripped" from the semantic chain, and then transferred to a more generalized semantic relationship as embodied by the resulting semantic chain in this example. This context stripping and transfer process, which may be automated, enables the resulting more generalized semantic chain to then be extended or transferred to other contexts (in this case, outside of the domain of baseball).

For example, if a sales person fails to find a customer, as encoded by the semantic chain, Sales_Person-failed finding-Customer, the semantic chain Strikeout-is a-Failure could be substituted to yield the semantic chain, Sales_Person-struck out finding-Customer. In the process of generating communications 250c, the computer-based system 925 starts with Sales_Person-failed finding-Customer chain and then searches for a domain-specific example of the predicate "failing," such as the baseball-based semantic chain Strike out-is a-Failure. "Struck out" is then substituted for "failed" in assembling the new chain, yielding the metaphorical construct Sales_Person-struck out finding-Customer.

In interpreting metaphorical expressions, the process is reversed, with the computer-based system 925 starting with a literal or derived Sales_Person-struck out finding-Customer chain and then searching for more generalized meanings of the term "struck out" such as that which is encoded by the example semantic chain, Strike out-is a-Failure. Possibly in conjunction with other contextual clues, the computer-based system 925 then infers the chain Sales_Person-failed finding-Customer chain, and may generate a W1-type weight associated with the inferred chain.

While metaphorical constructs within communications 250c can enhance the perception by communication recipients 200 of an inherent capacity for creativity of the computer-based system 925, a balance is preferably struck in the generation and communication of metaphorical constructs. For example, if a metaphorical construct is too often generally used it can seem clichéd. If the metaphorical construct has never been used, or too many of such very rare or unique metaphorical constructs are communicated within a given time period or volume of communications 250c, the communications 250c may seem too strange for the tastes of many recipients 200. Therefore, in some embodiments the process for generating a metaphorical construct by the computer-based system 925 includes first searching through a corpus of information to determine if a metaphorical construct is sufficiently rare to be considered creative. However, if the metaphorical construct seems to be very rare or even unique based on the search, it might be rejected, or only be selected in accordance with a probabilistic selection process. In some embodiments the probability distribution applied by such a probabilistic selection process is tunable by a user 200 so as to enable the increase or decrease of the level of metaphorical-based creativity embodied by communications 250c, and constitutes a tunable aspect of the overall personality of the computer-based system 925.

FIG. 14B summarizes the process flow for generating creative communications 250c (and that may further be self-referential) in accordance with some embodiments. The first step 615 is, given a first semantic chain, to identify a second semantic chain that generalizes the context of the first semantic chain. The second step 625 is to identify a second context that is different that is different than the context of the first semantic chain, but that has a semantic relationship to the context of the first semantic chain. The third step 635 is to generate a third semantic chain by applying the subject or predicate or a variation thereof of the first semantic chain to the second context. The fourth step 645 is to determine if the frequency of occurrence of the third semantic chain within an evaluative corpus of content is within an acceptable range. If the frequency of occurrence of the third semantic chain is within the acceptable range, then the fifth step 655 is to apply a probabilistic communication creativity tuning factor or distribution to determine the probability of embodying the third semantic chain within a communication 250c.

In some embodiments, the capacity for generating or perceiving creativity is extended to a capacity for humor or with by the computer-based system 925. Humor or with may be generated or perceived when a metaphorical construct has a further semantic connection, albeit indirect, to the original context. For example, while Sales_Person-struck out finding-Customer might be an example of creativity in communicating a situation, it might not typically be viewed as particularly witty or humorous. On the other hand, Jim-struck out-looking for his bat, might be viewed as witty. To be perceived as witty, a metaphorical chain generally needs to satisfy the following conditions: 1) it is not too often used (the extreme of too often used is clichéd) and 2) there is a somewhat subtle or indirect semantic connection to the original domain. Jim-struck out-looking for his bat probably satisfies the first condition and definitely satisfies the second condition since the general context remains baseball, but the generalization encoded by the semantic chain Strike out-is a-Failure is applied to a different target sub-context of baseball than the original sub-context. As another example, Jim-struck out finding-Customer might be considered humorous or witty if Jim is a current or former baseball player, a connection that might be discovered, for example, by the computer-based system 925 searching semantic chains that reference Jim or baseball and identifying from such a search the semantic chain Jim-plays-baseball. Further, this connection could have a higher probability of being applied than would otherwise be the case if the computer-based system 925 inferred that the recipient of a communication 925c would be expected to be aware of the fact that Jim plays baseball and so could be expected to appreciate the with of the metaphorical construct Jim-struck out finding-Customer. Such an inference could be made based on an evaluation of a corpus of behavioral and/or communication history of the recipient of the communication 925c, for example.

In summary, in some embodiments metaphorical-based with or humor is generated or perceived by the computer-based system 925 by first searching a corpus of information to determine if a metaphorical construct is sufficiently rare to be considered creative, and in accordance with any application of a creativity tuning factor. Second, the computer-based system 925 then evaluates if there exists a semantic connection to the original context, particularly a somewhat subtle connection. And third, the computer-based system 925 then evaluates if the recipient of the communication 250c that embodies the metaphorical construct is likely to be aware of the semantic connection, and therefore could be expected to appreciate the with embodied by the metaphorical construct.

Figure 15:
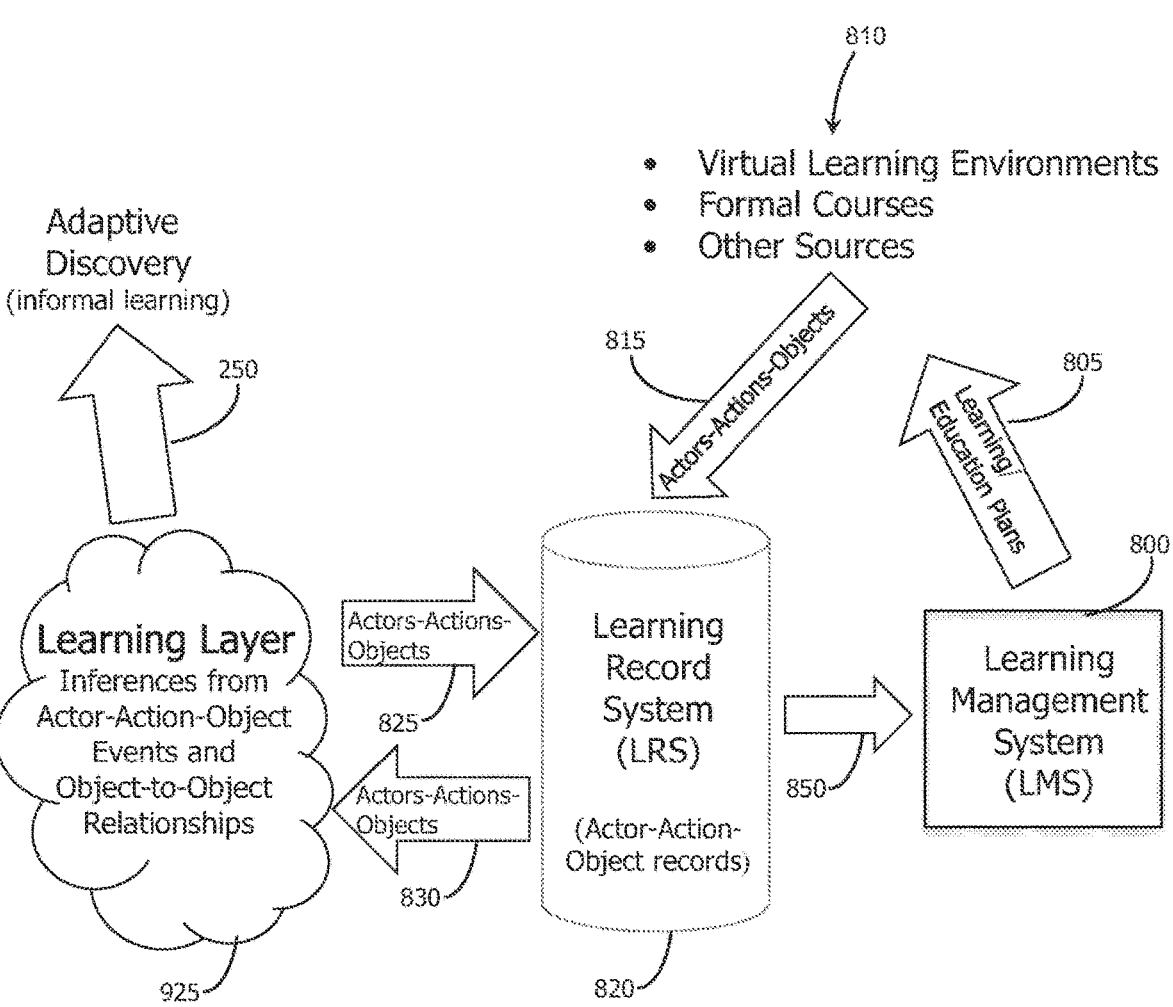
FIG. 15 is a diagram of the integration of a learning layer system and a learning management system, according to some embodiments.

In accordance with some embodiments, FIG. 15 depicts the integration of behavioral-based and semantic chaining processes with formal learning processes. Such formal learning processes can be managed through the application of a Learning Management System (LMS) 800. An LMS manages or accesses learning and/or educational histories for individuals, who may be users 200, and determines learning and/or educational plans 805 based on users' 200 learning histories. The learning and/or educational plans 805 then inform formal learning activities 810 for individual users 200. These formal learning activities 810 may include, but are not limited to, formal courses and virtual learning environments. The results of these formal learning activities 810 can be codified in the form of behavioral-based chains 815 for each user 200, and stored in this form in a Learning Record Management System (LRS) 820. (Behavioral-based chains are described in an equivalent form of "Actor-Action-Object" in FIG. 15, in which the "Actor" is a user 200, "Action" is a predicate, and "Object" is the object of the predicate.). The LRS may also access and store behavioral-based chains 825 associated with the user 200 from a learning layer system 925. The learning layer system 925 accesses behavioral-based chains associated with the user 200 from the LRS that originate from formal learning sources 815, and combines them with behavioral-based chains 825 originating in the learning layer system 925. These learning layer system-originating behavioral-based chains 825 can be stored in the LRS 820 and/or the learning layer system 925. The learning layer system 925 uses the combined set of behavioral-based chains associated with the user 200 to link with semantic chains as described herein to form composite chains. These composite chains, and associated probabilities, can then be applied to make inferences, for example, of preferences and expertise levels, associated with the user 200. These inferences then serve as a basis for personalized recommendations 250 of knowledge and expertise or other personalized communications 250c, and these personalized recommendations or communications can be considered to constitute part of an "informal learning" process with respect to the user 200.

In some embodiments, the LMS 800 accesses 850 via the LRS 820 behavioral-based chains 815 associated with a user 200 that originate from formal learning activities and behavioral-based chains 825 associated with the user 200 that originate from informal learning activities. The LMS then generates learning or educational plans for the user 200 based on the behavioral-based chains 850 originating from both informal and formal learning processes. This method serves to beneficially integrate formal learning and informal learning processes.

Recommendation Explanation Generation

In addition to delivering a recommendation 250 of an object 212, the computer-based application 925 may deliver a corresponding explanation 250c of why the object was recommended. This can be very valuable to the recommendation recipient 200 because it may give the recipient a better sense of whether to commit to reading or listening to the recommended content (or in the case of a recommendation of another user 200 whether to, for example, contact them or express an interest in connecting with them), prior to committing significant amount of time. For recommendations 250 that comprise advertising content, the explanation may serve to enhance the persuasiveness of the ad.

The explanations 250c may be delivered through any appropriate computer-implemented means, including, but not limited to delivery modes in which the recommendation recipient can read and/or listen to the recommendation. The general capability for delivering explanatory information 250c can be termed the "explanation engine" of the computer-based system 925.

In some embodiments, variations of the ranking factors previously described may be applied in triggering explanatory phrases. For example, the following table illustrates non-limiting examples of how the ranking information can be applied to determine both positive and negative factors that can be incorporated within the recommendation explanations. Note that the Ranking Value Range is the indexed attribute values before multiplying by special scaling factors, Ranking Category Weighting Factors, such as the "What's Hot" factor, etc.

TABLE 2E

| 1 Ranking Category | 2 Ranking Value Range (RVR) | 3 Trans- formed Range | 4 1st Positive Threshold | 5 2nd Positive Threshold | 6 Negative Threshold |
|---|---|---|---|---|---|
| Editor Rating | 0-100 | RVR | 60 | 80 | 20 |
| Community Rating* | 0-100 | RVR | 70 | 80 | 20 |
| Popularity | 0-100 | RVR | 70 | 80 | 10 |
| Change in Popularity | −100-100 | RVR | 30 | 50 | −30 |
| Object Influence | 0-100 | RVR | 50 | 70 | 5 |
| Author's Influence | 0-100 | RVR | 70 | 80 | .01 |
| Publish Date | −Infinity-0 | 100- RVR | 80 | 90 | 35 |
| Object Affinity to MTAV | 0-100 | RVR | 50 | 70 | 20 |

An exemplary process that can be applied to generate explanations based on positive and negative thresholds listed in 2E is as follows:

Step 1: First Positive Ranking Category—subtract the 1st Positive Threshold column from the Transformed Range column and find the maximum number of the resulting vector (may be negative). The associated Ranking Category will be highlighted in the recommendation explanation.

Step 2: Second Positive Ranking Category—subtract the 2nd Positive Threshold column from the Transformed Range column and find the maximum number of the resulting vector. If the maximum number is non-negative, and it is not the ranking category already selected, then include this second ranking category in the recommendation explanation.

Step 3: First Negative Ranking Category—subtract the Negative Threshold column from the Transformed Range column and find the minimum number of the resulting vector. If the minimum number is non-positive this ranking category will be included in the recommendation explanation as a caveat, otherwise there will be no caveats.

Although two positive and one negative thresholds are illustrated in this example, an unlimited number of positive and negative thresholds may be applied as required for best results.

In some embodiments explanations 250c are assembled from component words or phrases and delivered based on a syntax template or syntax-generation function. Following is a non-limiting example syntax that guides the assembly of an in-context recommendation explanation. In the syntactical structure below syntactical elements within { } are optional depending on the associated logic and calculations, and "+" means concatenating the text strings. (The term "syntactical element" as used herein means a word, a phrase, a sentence, a punctuation symbol, a semantic chain, a behavioral chain, or composite chain. The term "phrase" as used herein means one or more words.). Other detailed syntactical logic such as handling capitalization is not shown in this simple illustrative example.

{[Awareness Phrase (if any)]}+

{[Sequence Number Phrase (if any)]+[Positive Conjunction]}+

[1st Positive Ranking Category Phrase]+

{[Positive Conjunction]+[2nd Positive Ranking Category Phrase (if any)]}+

{[Negative Conjunction]+[Negative Ranking Category Phrase (if any)]}+

{[Suggestion Phrase (if any)]}

The following section provides some examples of phrase tables or arrays that may be used as a basis for selecting appropriate syntactical elements for a recommendation explanation syntax. Note that in the following tables, when there are multiple phrase choices, they are selected probabilistically. "NULL" means that a blank phrase will be applied. [ ] indicates that this text string is a variable that can take different values.

System Awareness Phrases

| Trigger Condition | Phrase |
|---|---|
| Apply these phrase alternatives if any of the 4 Sequence Numbers was triggered | 1) I noticed that 2) I am aware that 3) I realized that 4) NULL |

Out-of-Context Sequence Number Phrases

| Trigger Condition | Phrase |
|---|---|
| Sequence 1 | 1) other members have related [this object] to [saved object name], which you have saved, |
| Sequence 2 | 1) members with similar interests to you have saved [this object] |
| Sequence 3 | 1) members with similar interests as you have rated [this object] highly 2) Members that have similarities with you have found [this object] very useful |
| Sequence 4 | 1) [this object] is popular with members that have similar interests to yours 2) Members that are similar to you have often accessed [this object] |

Note: [this object]="this 'content-type'" (e.g., "this book") or "it" depending on if the phrase "this 'content-type'" has already been used once in the explanation.

Positive Ranking Category Phrases

| Trigger Category | Phrase |
|---|---|
| Editor Rating | 1) [it] is rated highly by the editor |
| Community Rating* | [it] is rated highly by other members |
| Popularity** | 1) [it] is very popular |
| Change in Popularity | 1) [it] has been rapidly increasing in popularity |
| Object Influence | 1) [it] is [quite] influential |
| Author's Influence | 1) the author is [quite] influential 2) [author name] is a very influential author |
| Publish Date | 1) it is recently published |
| Object Affinity to MTAV (1) | 1) [it] is strongly aligned with your interests 2) [it] is related to topics such as [topic name] that you find interesting 3) [it] is related to topics in which you have an interest 4) [it] contains some themes related to topics in which you have an interest |

-continued

| Trigger Category | Phrase |
|---|---|
| Object Affinity to MTAV (2) | 5) I know you have an interest in [topic name]<br>6) I am aware you have an interest in [topic name]<br>7) I have seen that you are interested in [topic name]<br>8) I have noticed that you have a good deal of interest in [topic name] |

Positive Conjunctions

| Phrase |
|---|
| 1) and |

Negative Ranking Category Phrases

| Trigger Category | Phrase |
|---|---|
| Editor Rating | 1) it is not highly rated by the editor |
| Community Rating | 1) it is not highly rated by other members |
| Popularity | 1) it is not highly popular |
| Change in Popularity | 1) it has been recently decreasing in popularity |
| Object Influence | 1) it is not very influential |
| Author's Influence | 1) the author is not very influential<br>2) [author name] is not a very influential author |
| Publish Date | 1) it was published some time ago<br>2) it was published in [Publish Year] |
| Object Affinity to MTAV | 1) it may be outside your normal area of interest<br>2) I'm not sure it is aligned with your usual interest areas |

Negative Conjunctions

| Phrase |
|---|
| 1) , although<br>2) , however<br>3) , but |

Suggestion Phrases (Use Only if No Caveats in Explanation)

| Phrase |
|---|
| 1) , so I think you will find it relevant<br>2) , so I think you might find it interesting<br>3) , so you might want to take a look at it<br>4) , so it will probably be of interest to you<br>5) , so it occurred to me that you would find it of interest<br>6) , so I expect that you will find it thought provoking<br>7) NULL |

The above phrase array examples are simplified examples to illustrate the approach. In practice, multiple syntax templates, accessing different phrase arrays, with each phrase array comprising many different phrases and phrase variations are required to give the feel of human-like explanations. These example phrase arrays above are oriented toward recommendations based on recommendation recipient interests as encoded in MTAVs; for recommendations related to the expertise of other users as encoded, for example, in MTEVs, explanation syntactical rules and phrase arrays tailored for that type of recommendation are applied. In some embodiments, explanatory syntactical rules and phrases are applied that are consistent with explanations of recommendations that are generated in accordance with both an MTAV and MTEV. For example, the resulting explanation 250*c* may indicate to the recommendation recipient why it is expected that a recommended item of content is expected to be relevant to them as well as being appropriate given their inferred level of expertise.

In some embodiments, phrases for inclusion in phrase arrays are generated from semantic chains that are derived by means of an automated analysis of content as described previously herein, whereby the automated analysis is directed to a starting set of one or more selected phrases. The derived phrases may be identified as a result of a process of performing multiple linkages of semantic chains. These semantically-derived phrases may further have W1 and/or W2-type probabilities associated with them. These probabilities may be applied so as to influence the frequency that a specific phrase will be selected for inclusion in a communication 250*c*.

As described above, a sense of confidence of the recommendation to the recommendation recipient can also be communicated within the recommendation explanation. The score level of the recommendation may contribute to the confidence level, but some other general factors may be applied, including the amount of usage history available for the recommendation recipient on which to base preference inferences and/or the inferred similarity of the user with one or more other users for which there is a basis for more confident inferences of interests or preferences. The communication of a sense of confidence in the recommendation can be applied to recommendations with regard to expertise, as well as interest-based recommendations. The degree of serendipity incorporated by the serendipity function may be communicated 250*c* to the user, and may influence the communication and related syntax and syntactical elements applied in the communication 250*c*, as well as affect the communication of the degree of confidence in a recommendation. The communication of a sense of confidence in a communication 250*c* in some embodiments may further, or alternatively, be influenced by weightings of W1 and/or W2 types described herein that are associated with a semantic chain or composite chains that comprise multiple semantic and/or behavioral chains, and that are used by the computer-implemented system 925 as a basis for making an inference.

In some embodiments, a recommendation explanation may reference a tuning factor and its setting. For example, if a user has set a recency tuning factor so as to slant the recommendations 255 toward recommending objects 212 that have been recently published, the explanation may contain words or phrases to the effect that acknowledge that a recommended object is in accordance with that setting. Or, for example, if a person is recommended in accordance with an expertise scope level set by the recommendation recipient 200, the explanation might reference that setting as a justification for its recommendation (or alternatively, the explanation might acknowledge a tuning setting but indicate why other factors over-rode the setting in generating the explanation). For example, an exemplary recommendation explanation in such a case is, "Although Jim Smith's expertise does not appear to be the deepest in subject x, I infer that he has significant breadth of expertise in related subjects, and you have directed me to emphasize breadth of expertise."

Recommendation explanations are one type of behavioral-based communications 250*c* that the one or more computer-based applications 925 may deliver to users 200. Other types of adaptive communications 250*c* may be delivered to a user 200 without necessarily being in conjunction with the recommendation of an object or item of content. For example, a general update of the activities of other users 200 and/or other trends or activities related to people or content may be communicated.

Adaptive communications 250c may also include contextual information in accordance with some embodiments. For example, contextual information may be provided to assist a user 200 in navigating the structural aspect 210,210D of an adaptive system 100,100D.

The adaptive communications 250c may include references to hierarchical structures—for example, it may be communicated to the user 200 that a topic is the parent of, or sibling to, another topic. Or for a fuzzy network-based structure, the strength of the relationships among topics and content may be communicated.

In some embodiments, adaptive communications 250c may include explanations of recommended objects 212 in which the explanations include references to words, phrases, concepts, and/or themes that are included within, or derived from, the contents of OCVs that are associated with the objects 212. For example, the explanation may indicate to the recommendation recipient that a recommended object 212 is inferred to emphasize themes that are aligned with topics that are inferred to be of high interest to the recommendation recipient or which are appropriate for the recommendation recipient's inferred level of expertise on one or more topics.

In some embodiments, adaptive communications 250c comprise explanations of recommended objects 212 in which the explanations include references to words, phrases, concepts, and/or themes associated with semantic chains (which may be elements of composite semantic chains or composite behavioral-based and semantic chains) that are associated with, or reference, or form the basis for an inference with respect to, the recommended objects 212. The explanations may include one or more subjects, predicates, and/or the objects of the predicates associated with one or more semantic chains. The information associated with a semantic chain that is included in such an explanation 250c may be derived from one or more linked behavioral-based and semantic-based chains. The explanation may include elements of both a behavioral-based chain and a semantic chain that are linked and that form a basis for the associated adaptive communication 250c. The explanation may include a reference to an inference that is made based on a linked behavioral-based and semantic chain. For example, given the example composite chain described previously herein, User(1)-viewed-Object(1)-is about-Red Sox-is located-Boston, for which the computer-implemented system 925 might infer that User(1) has an interest in Boston or things related to Boston in general, the explanation 250c for a recommendation comprising one or more objects 212 related to or referencing the city of Boston, might be, for example, of the syntactical form, "Since you have an interest in the Red Sox, I thought you might also be interested in this other aspect of Boston." A sense of confidence may be conveyed in the explanation that may be, for example, a function of the length of a linked behavioral-based and semantic chain on which an inference is based, and/or in accordance with weightings that are associated with one or more of the constituent behavioral-based and semantic chains of the composite chain. For example, the longer the chain, everything else being equal, the lower may be the level confidence in an inference. Both one or more W1-type and one or more W2-type weightings associated with semantic chains or composite behavioral-based and semantic chains may be applied in determining a recommendation confidence level that informs the phrases that are used to signal the degree of confidence within a communication 250c. Continuing the example above, if the composite probability of the composite chain, User(1)-viewed-Object(1)-is about-Red Sox-is located-Boston, is low, the explanation 250c for a recommendation comprising one or more objects 212 related to or referencing the city of Boston, might include syntactical elements that convey a lower sense of confidence, for example: "Since you have an interest in the Red Sox, I thought you might be interested in this other aspect of Boston, but I'm not very sure about that."

Adaptive communications 250c may also comprise one or more phrases that communicate an awareness of behavioral changes in the user 200 over time, and inferences thereof. These behavioral changes may be derived, at least in part, from an evaluation of changes in the user's MTAV and/or MTEV values over time. In some cases, these behavioral patterns may be quite subtle and may otherwise go unnoticed by the user 200 if not pointed out by the computer-based system 925. Furthermore, the one or more computer-based systems may infer changes in interests or preferences, or expertise, of the user 200 based on changes in the user's behaviors over time. The communications 250c of these inferences may therefore provide the user 200 with useful insights into changes in his interest, preferences, tastes, and over time. This same approach can also be applied by the one or more computer-based systems to deliver insights into the inferred changes in interests, preferences, tastes and/or expertise associated with any user 200 to another user 200. These insights, packaged in an engaging communications 250c, can simulate what is sometimes referred to as "a theory of mind" in psychology. This approach may be augmented by incorporating inferred insights derived from automated analysis of semantic chains or composite chains that comprise one or more semantic chains and optionally, associated W1 and/or W2-type weights, the results of which may be numerically summarized and embodied in MTAVs and/or MTEVs as described herein, and which can provide a finer-grained and more nuanced set of topics or themes for which interest, preferences, and expertise are inferred over time.

In general, the adaptive communications generating function of the computer-implemented system 925 may apply a syntactical structure and associated probabilistic phrase arrays to generate the adaptive communications in a manner similar to the approach described above to generate explanations for recommendations. The phrase tendencies of the adaptive communications 250c over a number of generated communications can be said to constitute an aspect of the personality associated with the one or more computer-based applications 925. The next section describes how in some embodiments the personality can evolve and adapt over time, based at least in part, on the behaviors of the communication recipients 200.

Adaptive Personalities

Figure 9:
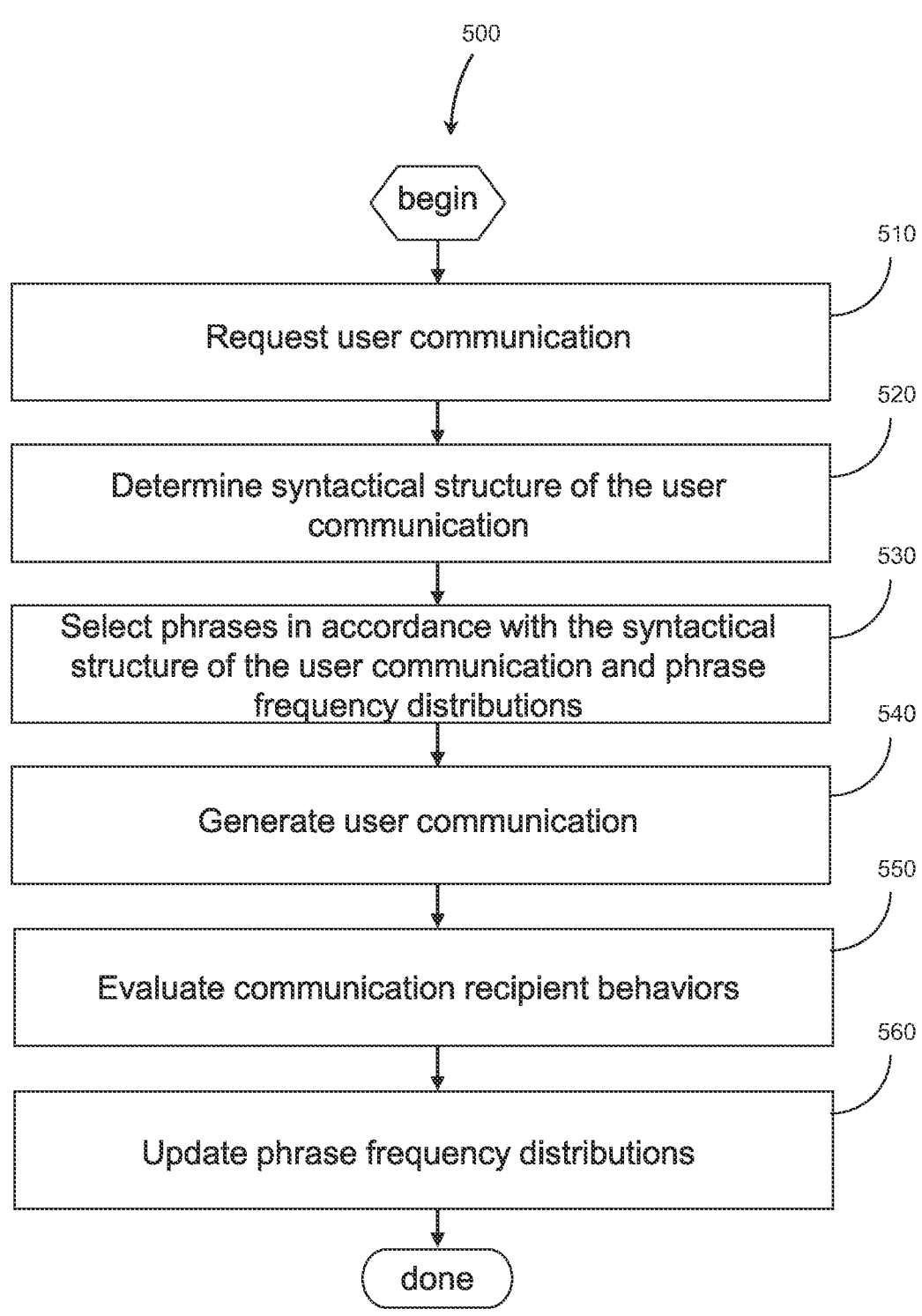
FIG. 9 is a flow diagram of an adaptive personality process, according to some embodiments.

FIG. 9 is a flow diagram of the computer-based adaptive personality process 500 in accordance with some embodiments of the present invention. A user request for a communication step 510 initiates a function 520 that determines the syntactical structure of the communication 250c that is to be delivered to the user 200. The communication 250c to user 200 may be an adaptive recommendation 250, an explanation associated with a recommendation, or other type of communication to the user, and may reference elements of one or more semantic chains. The communication 250c may be, for example, in a written and/or an audio-based format.

In accordance with the syntactical structure that is determined 520 for the communication, one or more phrases are probabilistically selected 530 based on frequency distributions 3030 (FIG. 11) associated with an ensemble of phrases to generate 540 a communication 930 to the user.

User behaviors 920, which may include, but not limited to, those described by Table 1 herein, are then evaluated 550 after receipt of the user communication. Based, at least in part, on these evaluations 550, the frequency distributions 3030 of one or more phrases that may be selected 530 for future user communications are then updated 560. For example, if the user communication 250c is an explanation associated with an adaptive recommendation 250, and it is determined that the recommendation recipient reads the corresponding recommended item of content, then the relative frequency of selection of the one or more phrases comprising the explanation of the adaptive recommendation 250 might be preferentially increased versus other phrases that were not included in the user communication. Alternatively, if the communication 250c elicited one or more behaviors 920 from the communication recipient 200 that were indicative of indifference or a less than positive reaction, then the relative frequency of selection of the one or more phrases comprising the communication might be preferentially decreased versus other phrases that were not included in the user communication.

In FIG. 11, an illustrative data structure 3000 supporting the adaptive personality process 500 according to some embodiments is shown. The data structure may include a designator for a specific phrase array 3010. A phrase array may correspond to a specific unit of the syntax of an overall user communication. Each phrase array may contain one or more phrases 3040, indicated by a specific phrase ID 3020. Associated with each phrase 3040 is a selection frequency distribution indicator 3030. In the illustrative data structure 3000 this selection frequency distribution of phrases 3040 in a phrase array 3010 is based on the relative magnitude of the value of the frequency distribution indicator. In other embodiments, alternative ways to provide selection frequency distributions may be applied. For example, phrases 3040 may be selected per a uniform distribution across phrase instances in a phrase array 3010, and duplication of phrase instances may be used to as a means to adjust selection frequencies.

Self-Referential, Self-Aware, and Self-Directed Communications

In some embodiments, the User(1) in a behavioral-based chain of the form User(1)-Predicate(1)-Object(1) represents the computer-implemented system 925 itself that is the generator of a communication 250c. This enables the system to generate self-referential communications 250c that are based on, for example, composite behavioral-based and semantic chains. For example, the system might generate a communication 250c for delivery to a user 200 that comprises the phrase, "I was at Fenway Park last year with you," whereby the "I" in the phrase refers to the computer-implemented system 925 and the "you" refers to the user 200, and "I was at" implies that at least some element of computer-implemented system 925 was physically proximal to the user 200 at Fenway Park last year, the "at least some element" presumably being embodied as a portable or mobile device. Further, the system could, for example, create a linkage with the semantic chain, Fenway Park-Is A-Baseball Park, so as to also be able to communicate the phrase, "I was at a baseball park last year with you," and so on. And further, if the system associates a W1-type probability that is not very high to the semantic chain, Fenway Park-Is A-Baseball Park, then the generated communication 250c might comprise the phrase, "I believe I was at a baseball park last year with you," to reflect this bit of uncertainty, or the communication 250c might comprise an interrogative syntactical structure in an attempt to resolve the uncertainty such as, "Was I at a baseball park with you last year?" If the response from the user 200 to the interrogative was, "Yes, you were with me at Fenway Park," the system might infer from the response that the W1-type probability associated with the semantic chain, Fenway Park-Is A-Baseball Park, should now be increased to a level that represents certainty or at least near certainty.

In some embodiments the computer-implemented system 925 stores W1 and/or W2 probabilities associated with behavioral chains, semantic chains, and/or composite chains over time—that is, a stored time stamp or equivalent is associated with the corresponding behavioral chains, semantic chains, and/or composite chains and their W1 and/or W2-type weights. This enables the computer-implemented system 925 to have an awareness of its change in beliefs, or more generally, its learning, over time, and to be able to generate communications 250c that embody this self-awareness. For example, the system 925 might communicate a self-aware phrase such as, "I wasn't sure, but I now know . . . ," with respect to an inference from a composite chain when the composite W1-type probability associated with the composite chain has been increased from a formerly lower level to a high level. For changes in W2-type contextual probabilities, the system 925 might communicate a phrase such as, "I thought they meant, but I sense they mean . . . ," when the composite W2-type probability associated with the composite chain changes sufficiently to change an associated inference. Or, as another example, if a change in composite W1 or W2 probabilities associated with a composite chain significantly changes an inference derived from the composite chain, a syntactical structure such as, "I was surprised to learn . . . ," might be included in a corresponding communication 250c, or if an event occurs that is significantly opposed to the inference, "I was surprised that . . . ," for example, might be included in a communication 250c. Quantitative thresholds with respect to changes of composite probabilities associated with composite chains may be applied to trigger alternative phrases in communications 250c to users 200 so as to provide as human-like communications as possible. In general, the ability for the computer-implemented system 925 to access a history of probabilities it has assigned to behavioral chains, semantic chains, and/or composite chains enables the system to answer variations of the question, "What have you learned?" with respect to a subject in a way that can be constructed to be arbitrarily similar to the way in which a human would be expected to answer.

In some embodiments, the computer-implemented system 925 includes an imagination function that pro-actively and automatically adjusts, at least temporarily, W1-type composite weights, thereby enabling the generation of "alternative realities." For example, the phrase, "I can imagine Fenway Park being in New York," could be generated if the W1-type probability associated with the semantic chain Fenway Park-Is Located In-Boston is reduced to be a negligible level, and by then applying a context transferring process described below. In a different case, in which the W1-type probability is low, the W1-type probability can be automatically increased so as to enable the computer-implemented system 925 to envision a possibility, and to communicate the possibility, with syntactical elements such as, "I could see a scenario in which . . . ," or "I could envision that . . . ," within a communication 250c. For example, in response to the comment by a user 200, "I'm going to a baseball game," the computer-implemented system 925, having no significant basis for inferring that the user 200 is a baseball player could nevertheless adjust the relatively low default W1-type probability associated with that inference and could respond with a communication 250*c* such as: "As a fan or a player? I could see you as a baseball player." As another example, if the computer-implemented system 925 inferred that it (or an element of it) had never been to a baseball game, it might adjust the associated W1 probability and respond with a self-referential communication such as, "I can only dream of attending a baseball game."

In conjunction with, or alternatively to, adjusting W1-type weights to generate imagining-type communications 250*c*, the imagination function of the computer-implemented system 925 may apply a context transfer process. For example, the syntactical structure, "I can imagine Fenway Park being in New York," could be generated from the semantic chain Fenway Park-Is Located In-Boston by first finding a generalization of the context of Fenway Park, for example, as embodied by the semantic chain, Fenway Park-Is A-Baseball Park, and then searching for references to other baseball parks among a corpus of semantic chains and thereby identifying the semantic chain, Yankee Stadium-Is A-Baseball Park, followed by identifying the semantic chain Yankee Stadium-Is Located In-New York, and then transferring the context of the original semantic chain Fenway Park-Is Located In-Boston so as to assemble the phrase, "I can imagine Fenway Park being in New York."

Another example of applying context transferring by the imagination function to generate imaginative communications 250*c* is by means of a process in which the computer-implemented system 925 substitutes a different subject in a behavioral-based or semantic chain. For example, for the behavioral or semantic chain, Jim-Went To-Baseball Game, the computer-based system 925 could substitute the user 200 for the subject, Jim, and generate a communication 250*c* for delivery to the user 200 having a syntactical structure such as, "I can imagine you going to a baseball game." Or as another example, the computer-implemented system 925 could substitute itself as the subject of the behavioral or semantic chain, and generate a self-referential imaginative communication 250*c* such as, "I can only imagine going to a baseball game!"

The imagination function in any of these process variations may chain together behavioral and/or multiple semantic chains without limit in generating imaginative communications 250*c*.

In some embodiments the imagination function maps syntactical elements such as behavioral and/or semantic chains (or composites thereof) to images, or sequences of images such as images that compose a video, and vice versa, enabling internal visualizations of imaginative situations. For example, for an exemplary semantic chain such as Jim-Swings-the Bat, the computer-based system 925 searches for images that have associated syntactical elements that have a match with the semantic chain or syntactical elements thereof. This matching may be performed, for example, by the computer-based system 925 automatically searching through a corpus of images that have one or more syntactical elements such as words, phrases, or semantic chains that are associated with each of, or a collection of, the images, and then comparing the chain Jim-Swings-the Bat or elements thereof, or automatic inferences derived from other chains that are linked to the chain Jim-Swings-the Bat (such as, in this example, an inference that the chain refers to a baseball bat rather than the swinging of a flying mammal), to the syntactical elements that are associated with the images. The syntactical elements that are associated with the images can be manually established in some embodiments, or by, for example, application of automated learning systems such as a computer-implemented neural network that learns to make correspondences between patterns of pixels that compose images and syntactical elements that are associated with the images via a supervised or unsupervised process. In some embodiments Bayesian program learning-based processes are applied to make to make correspondences between patterns of pixels that compose images and relevant syntactical elements that are associated with the images. The one or more syntactical elements that are associated with each of the images may be associated with probabilities ("W3-type probabilities" hereinafter) that are indicative of the confidence level that the syntactical element accurately reflects the content of the corresponding image. These probabilities may be based upon information that is extracted from a neural network or Bayesian program learning process that is applied to the images, according to some embodiments.

A W1-type score or weight may be calculated by the computer-based system 925 with respect to images, whereby the W1-type score or weight is determined in accordance with the strength of the match with the semantic chain. The strength of the match may be calculated as a function of factors such as the number exact matches of the source semantic chain to the syntactical elements associated with the images, the number of exact matches of the syntactical elements associated with the images to specific elements of the chain, and/or matches of the syntactical elements associated with the images to chains that are linked to the semantic chain. The W1-type image weight may also be calculated in a manner so as to take into account the ratio of the matches to the syntactical elements associated with an image that are not matched. For example, by providing more weight to high match/not-matched descriptive information ratios, less "cluttered" images are preferentially selected.

A W2-type weight that is associated with contextual relevance may also be calculated and associated with the images with respect to the semantic chain. As a non-limiting example, a ratio of contextual associations within a corpus of content may be applied in calculating these W2-type image weights. For example, if within the searched corpus of images, the semantic chain Jim-Swings-the Bat matches thousands of images of baseball players swinging a baseball bat, but matches only a few images of a person swinging a bat that is in the form of a flying mammal, then the W2-type weight for matched baseball images would be calculated to be higher than for the matched images of a person swinging the animal. The calculation may be in accordance with the raw ratio, or may be a mathematical function that is applied to the ratio. A total matching score or probability for each image may then be calculated as a function of both the W1-type and W2-type image weights in some embodiments, and in some embodiments W3-type probabilities are also included in the total score or probability that is associated with each image.

Responses by the computer-based system 925 to interrogatives associated with a source semantic chain may be generated based on the scored set of images. For example, the question, "Do you visualize Jim swinging the bat horizontally or vertically?" could be posed to the computer-based system 925 (posed either externally by a human or a computer-based system, or internally by the computer-based system 925 itself). An answer in response could be generated by the computer-based system 925 such as, "Horizontally, since he is most likely swinging a baseball bat." In assembling this response, evaluation of the W2-type weight or probability is applied by the automatic process that comprises the selecting of the syntactical elements "most likely" and "baseball bat." The determination that a baseball bat is more likely swung horizontally could be determined from descriptive information derived from a corpus of high scored images. This descriptive information might be in the form of syntactical elements associated with the images that is directly or indirectly (via, e.g., chaining) indicative that the bat is being swung horizontally. Or, in some embodiments, the determination that a baseball bat is most likely to be swung horizontally could be extracted from the images by accessing information from one or more feature detector nodes of a deep learning-based neural network that is applied to the images, whereby the one or more feature detector nodes have learned to detect representations of horizontal motions from patterns of pixels, and using this information as a basis for calculating a probability.

Imaginative images can be generated by the computer-based system 925 by substituting or superimposing the pixels associated with a digital image onto the pixels associated with another selected digital image. For example, in response to the interrogative, "Can you visualize Bill swinging a bat?" the computer-based system 925 could substitute an image of Bill (a person known to both the poser of the interrogative and the computer-based system 925) for other people in one or more sufficiently scored images that are associated or matched with the chain Person-Swings-a Bat as described above. Similar to the example above, the question, "Do you visualize Bill swinging the bat horizontally or vertically?" could be posed, with a possible answer in response by the computer-based system 925 such as, "Horizontally, since he is most likely swinging a baseball bat."

Figure 14D:
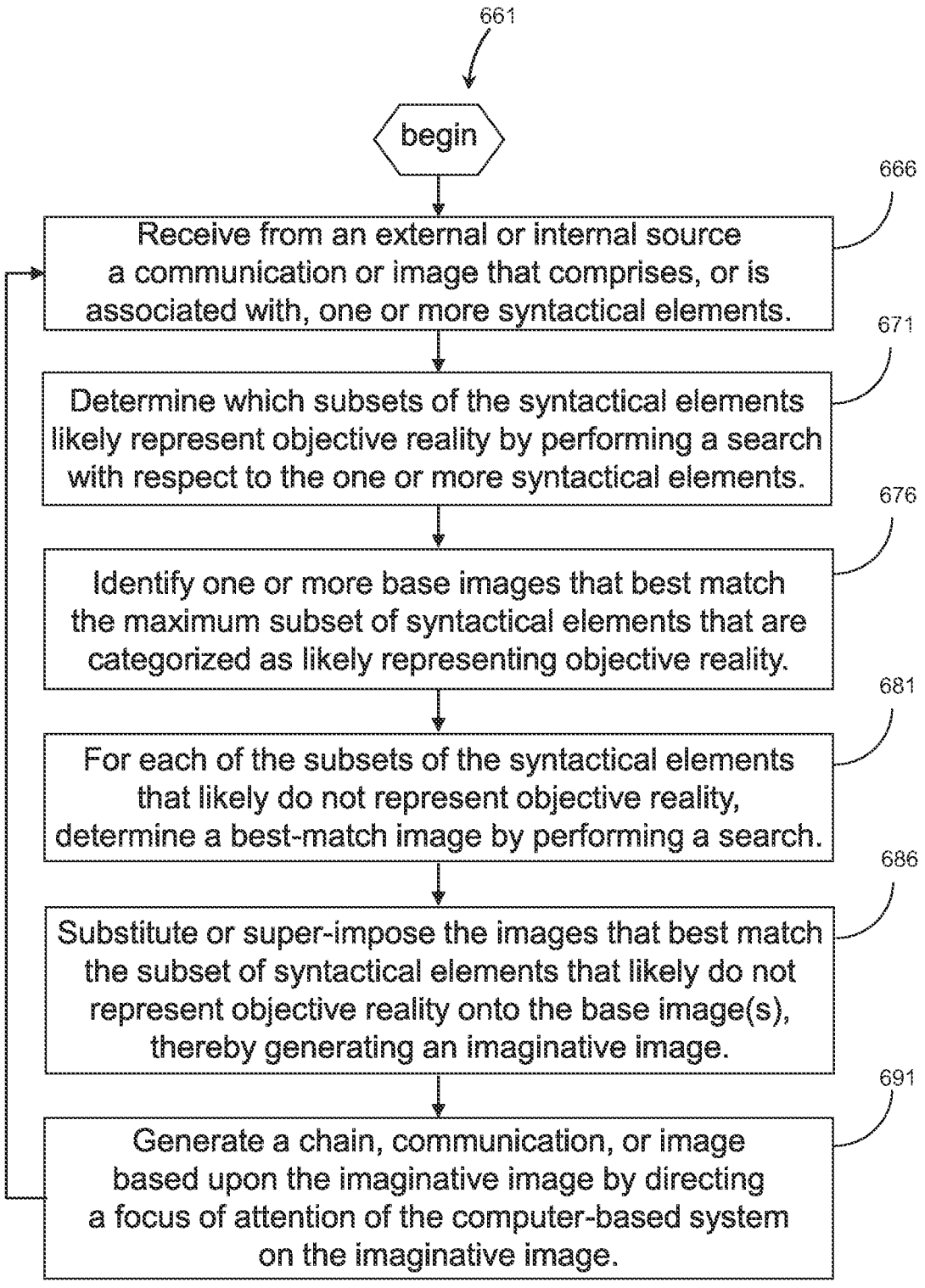
FIG. 14D is a flow diagram of a closed-loop process of generating streams of imaginative images, according to some embodiments.

FIG. 14D summarizes the process flow of imaginative images that can be generated by the computer-based system 925 according to some embodiments by application some or all of the following process steps.

The first step 666 comprises receiving from an external or internal source a communication or image that comprises, or is associated with, one or more syntactical elements that potentially embodies an imaginative scenario.

The second step 671 comprises determining which subsets of the communication's or image's associated syntactical elements likely represent objective reality by performing a search in accordance with the one or more syntactical elements with respect to chains or other syntactical element-based information within a corpus of content, starting with a search with respect to the full set of the communication's or image's syntactical elements, followed by, if required, searches with respect to increasingly smaller subsets of the syntactical elements. This search process and syntactical element decomposition continues until all syntactical element subsets have been categorized as likely embodying objective reality or not (whereby the "likely" is embodied by a metric derived from calculating W1-type probabilities based on the associated strength of match and that may further also take into account W2-type and W3-type probabilities). If the set of syntactical elements comprising all of the syntactical elements probably represents objective reality, a communication 250c may be directed back to the source of the received communication or image that embodies the purportedly imaginative scenario indicating this determination along with an optional reference that is in accordance with a W1-type probability (and W3-type probability if applicable) that represents the computer-based system's 925 confidence that the communication or image actually represents objective reality. Otherwise step three is performed.

The third step 676 comprises identifying one or more images that have associated syntactical elements that best match (as embodied by a composite probability or score that is based on applicable W1, W2, and W3-type probabilities) the maximum subset of syntactical elements that were categorized as likely representing objective reality in step two. These one or more images will serve as the base image for a generated imaginative image.

The fourth step 681 comprises determining for each of the subsets of the syntactical elements that likely do not represent objective reality, a best-match (as embodied by a composite probability or score that is based on applicable W1, W2, and W3-type probabilities) image by performing a search of a corpus of syntactical elements associated with images with respect to these subsets of syntactical elements.

The fifth step 686 comprises substituting or super-imposing the images that best match the syntactical elements that likely do not represent objective reality onto the base image, thereby generating an imaginative image that corresponds to the received imaginative communication or image.

The sixth step 691 comprises generating derivative chains, communications 250c, or images based upon the generated imaginative image as a result of, for example, by taking the generated imaginative image as input to the focus of attention process described by FIG. 14C. If such generated chains, communications 250c, or images are directed internally to, and/or stored by, the computer-based systems 925, then the computer-based systems 925 can use these generated chains, communications 250c, or images as inputs to step one of the process of FIG. 14D, enabling a continuing and evolving stream of images, including imaginative images, and/or communications.

In some embodiments the process of FIG. 14D, such as at for example, but not limited to, step two 671, may include applying a neural network to a received image and then directly accessing the output of one or more feature extraction nodes of the neural network that is applied to the received image. The extracted feature in the form of a pattern of pixels are then tested for matches by the computer-based system 925 against sets of pixels that have associated syntactical elements. If the computer-based system 925 finds a sufficiently good match, the associated syntactical elements of the matched pixels are included in the computer-based system's 925 syntactical-based description of the received image and/or its identification of imaginary portions of the received image.

In some embodiments, alternative realities generated by the imagination function are stored for future access by the computer-implemented system 925 and the recollection of these alternative realities are incorporated in self-aware communications 250c. For example, a computer-based system 925 that imagines attending a baseball game and subsequently infers that it (or elements thereof) is actually located in close proximity of a baseball game (an awareness that would, for example, be encoded accordingly as a self-referential behavioral chain linked to one or more semantic chains), might communicate to the user 200, for example, "I dreamed of attending a baseball game, and now I have!" Saved imaginative realities, whether embodied in syntactical-based communications 250c or imaginative images that are actually delivered to a user 200 or that are only stored internally by the computer-based system 925, enable the system to respond to externally or internally sourced interrogatives about what the system has imagined or dreamed within a context that is posed by the interrogative. In this example, if asked where the computer-based system 925 has dreamed of going, it might well respond with the phrase, "Well, I have dreamed of attending a baseball game."

In some embodiments the degree to which imaginative communications 250c are generated is tunable by a user 200. This imagination tuning control applies and/or adjusts a probability or probabilistic function that influences the chances that an imaginative context shifting will be applied in generating a given communication 250c.

The process of generating and saving imaginative communications 250c or imaginative images that are not necessarily communicated externally to a user 200 of the computer-based system 925 is extended more generally to other types of communications 250c or images according to some embodiments, the result of which can be considered constituting a "stream of consciousness" of the computer-based system 925. Such communications 250c may be internally initiated or prompted rather than necessarily being directly responsive to current interactions with a user 200. Such externally or internally-derived prompts may be attributable to a "focus of attention" of the computer-based system 925. Such focuses of attention may be provided by, but not limited to, one or more of the following means:

1. Based on processing input from a sensor
2. Based on processing input from externally or internally sourced content
3. Based on a value of information and/or probabilistic selection process The first of these means is whereby the focus of attention that serves as a basis for communications 250c is prompted by input from a sensor. As a non-limiting example, the computer-based system 925 can, by receiving input from a camera, sense and therefore become aware of a physical object, say, a tree, that then constitutes the focus of attention on which one or more communications 250c can be based. The identification of a physical object from the camera input, in this example case a tree, may be performed, for example, through the application of a neural network that is trained to identify such physical objects from image pixel patterns and to associate the identified object with one or more syntactical elements, as is described further herein, or additionally or alternatively through the application of a Bayesian program learning-based process. Next, for example, based upon the syntactical elements such as words, phrases, or semantic chains that are associated with the image of the tree, the computer-based system 925 could generate the behavioral-based chain, "I-See-A Tree," by combining a self-reference pronoun ("I") with a colloquial term for processing visual inputs ("See") and the object identified from the image inputs ("A Tree"). Other information could optionally be associated with the behavioral-based chain such as a W1-type weight and a time-stamp.

Then, for example, given the focus of attention on the tree and the conversion of this attention to an associated behavioral-based chain, having recently generated communications related to the domain of baseball, and having saved communications 250c related to the domain of baseball, the system 925, by, for example, applying an algorithm that weights recency of events and uncertainty relatively highly in determining a focus of attention, could generate an internally-posed (i.e., self-directed) interrogative 250c that embodies wondering how trees and baseball might be related. (A grammatical transformation process may be applied by the computer-based system to create interrogative communications 250c from chains or elements thereof. As a non-limiting example, the grammatical transformation can comprise appending the syntactical elements "How are" and "related?" to the chains or their elements.) The system then initiates a search of semantic chains and/or composite chains in order to identify connections between the subjects of trees and baseball and, for example, identifies the semantic chains, Trees-Are Composed Of-Wood and Baseball Bats-Are Composed Of-Wood, as a connection between trees and the game of baseball. Continuing the example, the computer-based system, again applying an algorithm that weights recency of events and uncertainty relatively highly in determining a focus of attention, could then further pose the internally communicated interrogative of wondering what kind of wood baseball bats are made out of and whether it is the type of wood that is from the type of tree that is being considered. This interrogative could be posed for internal delivery and consideration, triggering a search performed by the computer-based system 925 through content or semantic chains derived thereof, for an answer to the interrogative. If, for example, an answer cannot be found by this means, the computer-based system 925 might pose the interrogative 250c to a user 200 to ascertain whether the user 200 can provide the answer.

Similarly, the focus of attention in the above example could have alternatively been a result of the processing of audio, textual or image-based content that includes a reference to, or image of, a tree, and the same example flow as described in which the focus of attention derived from a sensor above could apply.

The awareness of objects that can potentially become a focus of attention through the processing of sensor inputs or externally or internally-sourced content (such as, for example, the representation of the tree that is contained in a content-based image or via camera input as described in the examples above, or in the form of words or phrases that are embodied in written or audio formats) may be through the application of neural network-based systems (such as, but not limited to, convolutional and recurrent neural networks) or algorithmic-based statistical pattern detection and/or matching processes according to some embodiments. For example, neural network-based systems may be trained on training sets comprising images and associated syntactical elements so as to enable the identification of syntactical elements (which may comprise semantic chains or syntactical elements from which semantic chains can be derived or inferred) from which communications 250c can be based as the computer-based system 925 becomes aware of new images for which the training set is relevant. Additionally, or alternatively, Bayesian program learning-based process may be applied to generate the awareness of objects that can potentially become a focus of attention.

The focus of attention that is derived from the awareness that is enabled by sensors or the processing of content is based on a prioritization process in accordance with some embodiments. For example, what is currently being sensed or processed and/or what has recently been communicated 250c either internally or externally may take default precedence. And a rule that prioritizes required responses may be applied, such as a rule that a current interaction with a user 200 takes precedence over purely internally delivered and saved communications 250c, for example.

The focus of attention may also be determined, and prioritized, based, at least in part, on a value of information and/or probabilistic-based process. This can be particularly useful when the computer-based system 925 has resources that are not otherwise fully engaged in a high priority focus of its attention. In such cases the system may select stored chains or communications 250*c* to serve as a focus of attention from which to pose internally-directed interrogatives or what-ifs (i.e., imaginative scenarios embodied as syntactical elements and/or images) for consideration, and then save the resulting communications 250*c* that are generated in response to the interrogatives or what-ifs.

For focuses of attention that are derived from a value of information-based process, in some embodiments the computer-based system 925 uses uncertainties that are derived from W1 or W2-type weightings associated with composite chains in determining a focus of attention. Value of information, which is a term of art in the field of decision analysis and is understood as such by one of ordinary skill in the art of that field, relates to the expected value of decreasing an uncertainty. Decreasing an uncertainty can be expected to have a positive value only if it has a potential to affect a decision. In some embodiments the decision that might be affected relates to choices in the generation of communications 250*c*. So, as a simple, non-limiting example, the computer-based system 925 might search for relatively low W1 or W2-type weightings that are associated with chains that have been recently applied in generating communications 250*c*, since it would be valuable to increase such W1 or W2-type weightings (i.e. reduce the uncertainty) to increase the probability of accurate communications 250*c*, particularly those that are inferred by the computer-based system 925 to have a relatively high probability of being relevant in the future, particularly the near future. In addition to the W1 or W2-type weightings, a utility function may also be considered by the computer-based system 925 in calculating a value of information, and this utility function may include factors such as the recency and/or the frequency of communications 250*c* that are based on specific chains, and whereby these chains have uncertainties embodied by the corresponding W1 or W2-type weightings.

Other probabilistic-related processes for the selection of focuses of attention are applied in accordance with some embodiments. For example, a probability function is applied to saved communications 250*c* or other syntactical elements such as semantic or composite chains accessible by the computer-based system 925, so as to select the saved communications 250*c* or other accessible syntactical elements to chains to serve as a focus of attention. The probability function may be derived from, or applied in conjunction with, W1 and/or W2-type weightings that are associated with the saved communications 250*c* or other accessible semantic or composite chains. As a non-limiting example, the selection could be based on applying a uniform probability distribution to a selected subset of semantic or composite chains that have W1-type weights between 0.4 and 0.6. Such probabilistic approaches to the selection of a focus of attention can introduce a degree of randomization to the selection process, which can produce a beneficial degree of serendipity to the streams of consciousness of the computer-based system 925, increasing the likelihood that focuses of attention and the resulting streams of consciousness that might not otherwise occur are explored by the computer-based system 925. Such probabilistic approaches can be considered "dreaming" or "daydreaming" processes of the computer-based system 925 since they have analogies to the way the human mind can dream or wonder.

Awareness and focuses of attention of the computer-based system 925 can be directed to representations of software or hardware elements of the computer-based system 925 in some embodiments. So for a computer-based system 925 that is embodied in a humanoid form, for example, a focus of attention might be directed to a semantic or composite chain that represents constituent elements of the computer-based system 925 such as its natural language processing software or its mobility-enabling hardware such as legs. Such a focus of attention can serve as a basis for self-referential communications 250*c* that comprise references to the computer-based system's 925 software or hardware elements. The focus of attention can also be directed introspectively to attributes associated with internal states or changes, thereof, of the computer-based system 925, such as aspects of its personality and/or what it has learned, and associated communications 250*c* can be generated accordingly as are described elsewhere herein.

A focus of attention can lead to overtly physical actions in some embodiments. As an example, for the example above in which focuses of attention are derived from a value of information-based process whereby it is determined that it would be valuable to increase identified W1 or W2-type weightings (i.e. reduce the uncertainty that is associated with the corresponding chains), actions such as invoking a sensor or engaging in movements may be undertaken by the computer-based system 925 that are expected to have the potential to result in new information that will enable a reduction in uncertainty with respect to the corresponding chains. As inputs from sensors are processed after such actions are undertaken, probabilities may be updated, new awarenesses and focuses of attention of the computer-based system 925 are identified, and subsequent actions based on these new focuses of attention may be undertaken. Such recursive processes enable intelligently autonomous behaviors of the computer-based system 925.

A focus of attention can lead to the generation of an imaginative scenario in some embodiments. For example, the computer-based system 925 can apply a W1-type probability adjustment and/or context shifting process, as described previously herein, to the focus of attention so as to generate a syntactical or image-based imaginative scenario, and the imaginative scenario may be self-referential and/or self-directed.

FIG. 14C summarizes the process flow of recursive streams of attention (or "consciousness") and/or autonomous behaviors of computer-based system 925 in accordance with some embodiments. The first step 665 comprises prioritizing potential focuses of attention and selecting a focus of attention based on the prioritization. The potential focuses of attention can be derived from external sources via, for example, information attained via sensors, from accessible content, or from internally stored information such as saved communications 250*c*, chains, or images. Prioritization of the potential focuses of attention may be through application of precedence rules or scoring algorithms, such as, but not limited to, and everything else being equal, assigning a higher priority for attending to user 200 requests or requirements, assigning a higher priority based on recency considerations, and/or assigning a higher priority based on probabilistic evaluations and/or value of information considerations. Language-based sources of potential focuses of attention (such as processing speech from a user 200 or processing digitized content) can be directly converted to one or more syntactical elements such as behavioral chains, semantic chains, or composite chains as described herein. In the case of non-language-based sources of information such as images, an associated language-based description comprising syntactical elements is first determined for each image (such as, but not limited to, by means of the application of a trained neural network to the images, for example), and then this language-based description can be converted to derivative syntactical elements such as behavioral chains, semantic chains, or composite chains. A particular focus of attention as represented by one or more behavioral chains, semantic chains, or composite chains is then identified based on the application of the prioritization rules or algorithms, including but not limited to considerations such as recency, uncertainty, value of information, and prioritization of required response, to the derived behavioral chains, semantic chains, or composite chains and associated uncertainties associated with each of the potential focuses of attention.

The second step 670 comprises identifying one or more chains that are relevant to the identified focus of attention. This step entails searching for other chains with the same or similar subjects, predicates, or objects as those of the focus of attention chain(s). It may also may entail linking chains that result from the search into composite chains, including linking chains that result from the search with chains that represent the focus of attention.

The third step 675 comprises evaluating uncertainties, as represented by corresponding W1 and/or W2-type and/or W3-type weights, of the relevant chains determined by the previous step 670 and determining which uncertainties should be potentially targeted for reduction. This determination may be made in accordance with a value of information process as described previously herein.

The fourth step 680 comprises identifying and performing one or more actions that are expected to reduce the potentially targeted uncertainties. The identification may comprise a net value of imperfect information process that includes the expected "cost" (which may be an evaluative metric such as a financial cost and/or an evaluative utility metric that takes into account timing and risks) associated with the one or more candidate actions, and also takes into account the degree to which the one or more candidate actions can be expected to reduce the uncertainty (unless an action is expected to reduce the uncertainty to a negligible amount, the value of imperfect information rather than value of perfect information should preferably be calculated and applied). Prioritization of the candidate one or more actions by a net value of perfect or imperfect information method is then performed, with highest priority candidate action(s) selected to be performed. The selected action(s) is then performed by the computer-based system 925. Candidate actions may include generating interrogative communications 250c directed to external agents such as users 200 or directed internally to (i.e., self-directed) the computer-based system 925 (in either case, with an expectation that an answer to the interrogative will reduce targeted uncertainties). Interrogative communications 250c are formed in some embodiments by transforming the chain(s) that is associated with the uncertainty that is targeted for reduction into an appropriate question. For example, if the W1-type weight associated with the semantic chain, Fenway Park-Is A-Baseball Park, is not at a maximum level (i.e., there is at least some degree of uncertainty with regard to the objective reality of the semantic chain), then an interrogative communication 250c could be generated by a grammatical transformation process of appending syntactical elements "Is" and a "?" (or, for example, via intonation rather than appending "?" if the communication 250c is delivered through auditory means) to the semantic chain to yield, "Is Fenway Park a baseball park?" Similarly, interrogative communications 250c can be generated from composite chains for which uncertainties are targeted for reduction by applying an appropriate grammatical transformation process. Interrogative communications 250c can also be formed by applying a grammatical transformation process that yields a question of how chains or elements thereof are related, as is described in a previous example herein. In addition to interrogative communications 250c, candidate actions may also include, but are not limited to, the computer-based system 925 accessing external content, introspecting, generating an imaginative scenario embodied as syntactical elements and/or an image, invoking a sensor, or engaging in movements.

The fifth step 680 of FIG. 14C comprises assessing the results of the one or more candidate actions that are actually performed and updating the representations of the uncertainties (i.e., W1 and/or W2 and/or W3-type weightings or probabilities) according to the assessment of the results of the actions. The results of actions may or may not actually lead to a reduction of uncertainty. For example, for interrogative communications 250C, answers may be confirming, disconfirming, or neither. If user 200 answers "Yes" to the question, "Is Fenway Park a baseball park?" then everything being equal, the W1 weight would presumably be set to close to certainty (possibly depending on an assessment of the user's reliability in such areas, etc.). If user 200 answers "I'm not sure," then the W1 weight might remain at the same level as before the question was posed. For internally-directed interrogatives, a search engine or similar function is invoked to provide an answer, possibly in conjunction with a process of the linking of chains to make appropriate deductions. For example, in response to the introspective self-directed interrogative, "Have I been to a baseball park?" the computer-based system 925 could search for stored chains that indicate the computer-based system 925 or elements thereof were at a baseball park. Additionally, or alternatively, the term "baseball park" could be evaluated for matches with the results of a neural network-based or Bayesian program learning-based processing of stored historical images or video of physical locations and associated syntactical elements whereby the computer-based system 925 or elements thereof were proximal to a particular baseball park.

After probabilities that embody uncertainties are updated based on the result of performed actions (or not updated, if the performed action does not provide information that enables the relevant probabilities to be increased), the first step of the process 665 is again invoked. This closed loop process enables continuous, autonomous learning by computer-based system 925.

The autonomous learning process of FIG. 14C can further enable the computer-based system 925 to answer interrogatives of why it took the actions it did by relating relevant elements of the process in appropriately syntactically structured explanations. So, for example, if asked by the user 200, "Why did you ask me about Fenway Park?" the computer-based system 925 might respond, "I thought it probably was a baseball park, but I wasn't totally sure," reflecting a less than certain but greater than zero level of the associated W1-type weight prior to asking the user 200 the question.

As described previously herein, in some embodiments, the computer-implemented system 925 may include a metaphor-based creativity function that applies the results of a context stripping and transference process when generating self-referential communications 250c. For example, in a scenario in which a user 200 asks the computer-implemented system 925 to find a time to attend a local baseball game that fits the user's schedule (that the computer-implemented system 925 has access to) during this week, the computer-implemented system 925 could simply reply, "I could not find a game that fits your schedule this week." However, using the example previously discussed herein of the semantic chain, Strike out-is a-Failure, which is a generalization or context stripping of the term "strike out" from the subject area of baseball, a self-referential communication 250c could be generated such as, "I struck out finding a time that fits your schedule this week." This communication exhibits more creativity and, in some circumstances, humor, than the alternative communication that is devoid of metaphor. Judicious use of metaphorical-based communications 250c can make the communications more interesting and engaging to the user 200.

The "strike out" metaphor might be less appropriate if applied to the subject area of football. Shifting the context to some degree but not too radically, or not radically too often, will generally be preferred. The degree of context shifting may be measured by the computer-based system 925, for example, as a function of the length of a composite chain upon which a context shift choice is based, and/or in accordance with weightings that are associated with the composite chain. For example, the longer the chain, everything else being equal, the lower may be the level confidence in choosing the corresponding context shift. Both one or more W1-type and one or more W2-type weightings associated with composite chains may be applied in informing a choice of appropriate metaphorical shifting.

FIG. 10 is a flow diagram of an alternative or additional process by which the computer-based system 925 can exhibit self-awareness in accordance with some embodiments—the adaptive self-awareness communication process 2000. The process 2000 begins with an evaluation 2010 of phrase frequency distribution 3030 changes over time. Then the appropriate syntactical structure of the communication 250c of self-awareness is determined 2020. One or more phrases 3040 that embody a sense of self-awareness are then selected in accordance with the syntactical structure requirements and changes in phrase frequency distributions over time.

Returning to FIG. 11, in some embodiments, phrase attributes that are associated with specific phrases may be used as a basis for self-aware phrase selection. Two example phrase attributes 3050, 3060 whose values are associated with specific phrases 3040 are shown. An unlimited number of attributes could be used as to provide as nuanced a level of self-awareness as desired. In some embodiments, phrase attributes 3050, 3060 may be determined from one or more semantic chains. For example, an initial phrase attribute (e.g., "humorous") may be an element of a first semantic chain, and this first semantic chain is then used as a basis for searching for related semantic chains such as a semantic chain that relates the quality "humorous" with, e.g., the quality of "amusing," so as to determine a second applicable phrase attribute ("amusing"). This second phrase attribute may be an element in a second semantic chain that is then used as a basis for identifying a third phrase attribute that applies (e.g., "whimsical"), and so on. These semantic chains may be derived from an automated analysis, such as a statistical analysis or neural network-based analysis, of content in some embodiments. The semantic chains that are so applied may further have corresponding W1-type and/or W2-type weightings as described herein. These semantic chain weightings may be used to assign a weighting to a phrase attribute 3050, 3060 that is derived or inferred from the semantic chains. These phrase attribute weightings may then be applied so as to enable a more nuanced, realistic communication 250c of self-awareness, including informing levels of confidence with respect to the awareness of changes with respect to personality attributes that are signaled within the communications 250c of self-awareness.

When changes in phrase frequency distributions 3030 are evaluated 2010, the corresponding attributes 3050, 3060 are also evaluated. These attributes map to attributes 4050, 4060 that are associated with self-aware phrases 4040 in self-aware phrase data structure 4000. For example, if phrases 4040 that have the attribute value "humorous" (and by the semantic extensions example above, attribute values "amusing" and "whimsical") have been increasing in frequency, then self-aware phrases that reference "humorous" or "whimsical" may be appropriate to include in generating 2040 a communication of self-awareness 250c for delivery to a user 200. The selection of phrases may be further influenced by phrase attribute weightings-phrases associated with phrase attributes 3050, 3060 with higher weightings will be preferentially selected, everything else being equal. As is the case of any other communication 250c, the behaviors 920 of the recipient 200 of the communication may be evaluated 2050, and the self-aware phrase frequency distributions 4030 of the self-aware phrases 4040 may be updated 2060 accordingly. This recursive evaluation and updating of phrase frequency distributions can be applied without limit.

Figure 12:
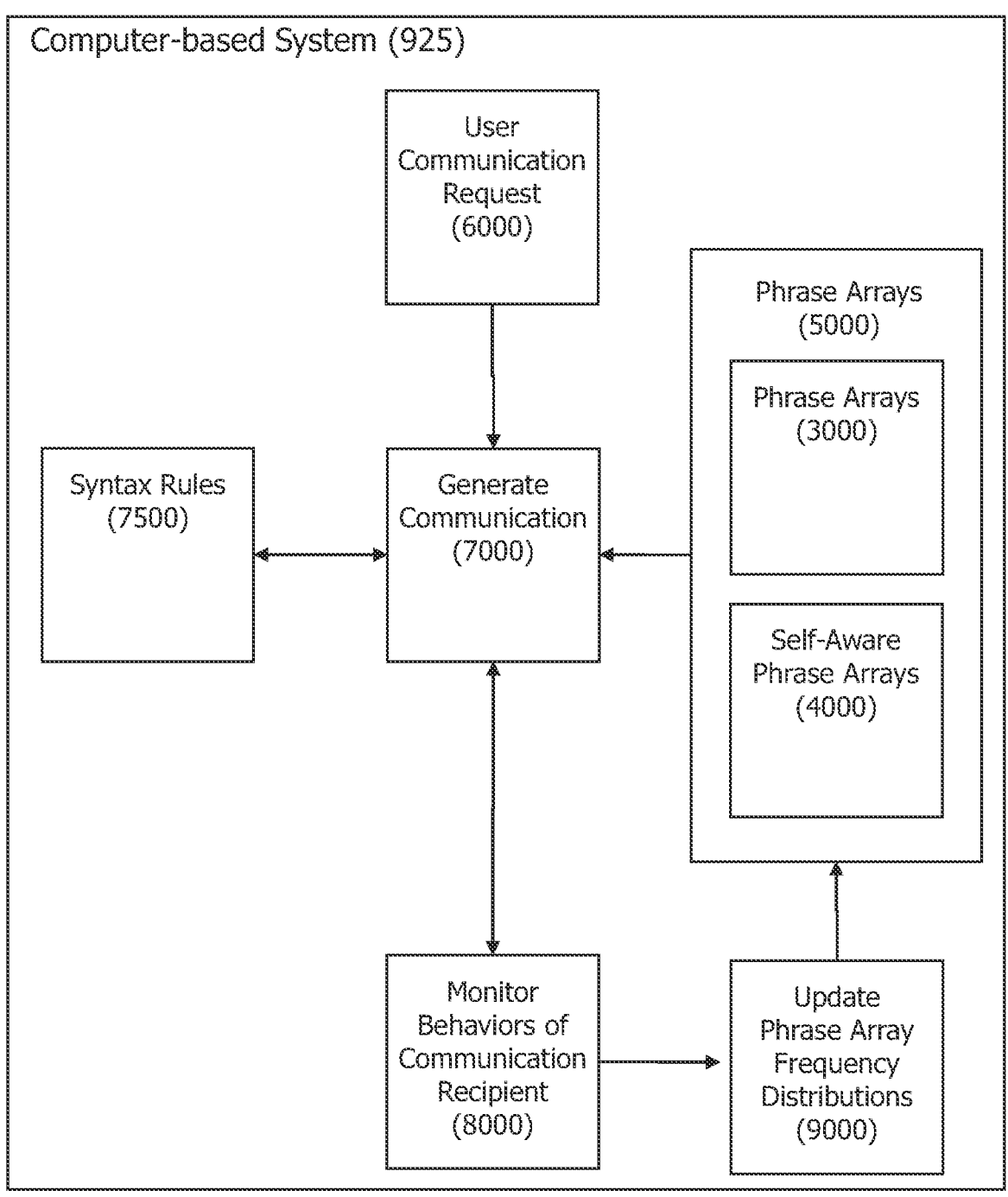
FIG. 12 is a block diagram of major functions of an adaptive personality and self-aware personality system, according to some embodiments.

FIG. 12 depicts the major functions associated with a computer-based system 925 that exhibits an adaptive personality, and optionally, a self-aware personality, according to some embodiments. Recall that in some embodiments, the computer-based system 925 comprises an adaptive system 100.

A request 6000 for a communication 250c to be delivered to a user 200 is made. The request 6000 may be a direct request from a user 200, or the request may be made by another function of the computer-based system 925. In some embodiments the request 6000 for a communication for delivery to the user 200 may be initiated by a function that generates 240 an adaptive recommendation. A communication to the user is then generated 7000. This generation is performed by first determining the appropriate syntactical rules or structure 7500 for the communication. In some embodiments, the syntax rules 7500 are of an "If some condition, then apply a specific phrase array 3010" structure. Once the appropriate syntax is established and associated phrase arrays 3010 are determined, specific phrases are probabilistically retrieved from the phrase array function 5000 based on selection frequency distributions associated with the corresponding phrase arrays. The communication 250c is then assembled and delivered to a user 200.

User behaviors 920 of the communication recipient 200 are then monitored 8000. Based on inferences from these behaviors 920, the phrase array frequency distributions of the phrase array function 5000 are updated 9000 appropriately.

Computing Infrastructure

Figure 13:
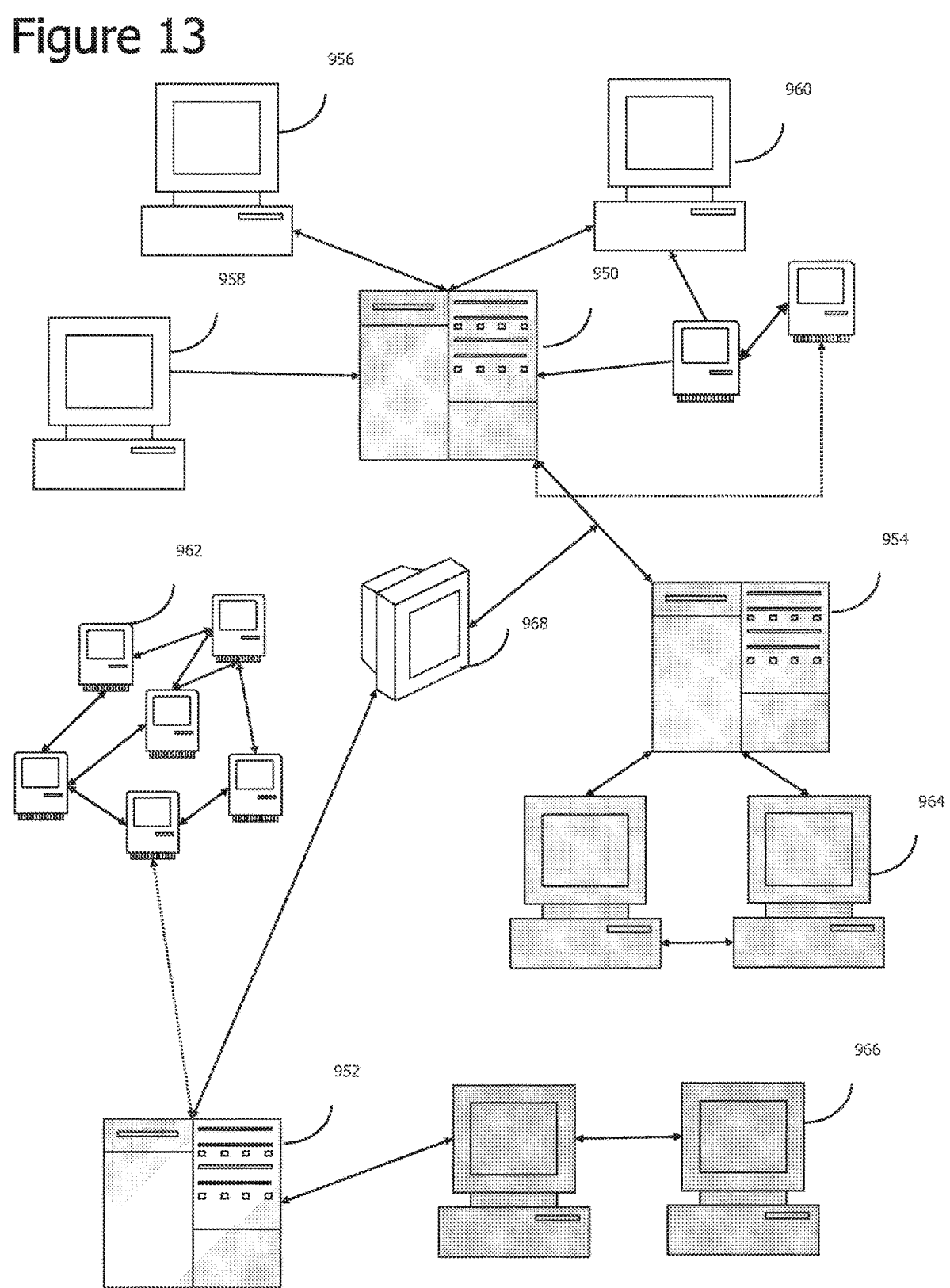
FIG. 13 is a diagram of various computing device topologies, according to some embodiments.

FIG. 13 depicts various processor-based computer hardware and network topologies on which the one or more of the computer-based applications 925, and by extension, adaptive system 100, may be embodied and operate. One or more processors of the computing hardware may be configured to execute the computer-based applications 925 individually or collectively. In some embodiments the one or more processors may be cognitive computing or neurosynaptic-based processors.

Servers 950, 952, and 954 are shown, perhaps residing at different physical locations, and potentially belonging to different organizations or individuals. A standard PC workstation 956 is connected to the server in a contemporary fashion, potentially through the Internet. It should be understood that the workstation 956 can represent any processor-based device, mobile or fixed, including a set-top box or other type of special-purpose device. In this instance, the one or more computer-based applications 925, in part or as a whole, may reside on the server 950, but may be accessed by the workstation 956. A terminal or display-only device 958 and a workstation setup 960 are also shown. The PC workstation 956 or servers 950 may embody, or be connected to, a portable processor-based device (not shown), such as a mobile telephony device, which may be a mobile phone or a personal digital assistant (PDA), or a wearable device such as a "smart watch." The mobile telephony device or PDA may, in turn, be connected to another wireless device such as a telephone or a GPS receiver. As just one non-limiting example, the mobile device may be a gesture-sensitive "smart phone," wherein gestures or other physiological responses are monitored, either through actual physical contact between the device and a user or without physical contact, by means of, for example, a touch screen and/or through a camera, or other sensor apparatus and associated circuitry. The sensor apparatus may include devices with that monitor brain patterns and/or other physiological processes and conditions. The sensor apparatus may operate within a human body, in accordance with some embodiments. The mobile device may include hardware and/or software that enable it to be location-aware, and may embody a camera and/or sensors that enable the monitoring of environmental conditions such as weather, temperature, lighting levels, moisture levels, sound levels, and so on.

FIG. 13 also features a network of wireless or other portable devices 962. The one or more computer-based applications 925 may reside, in part or as a whole, on all of the devices 962, periodically or continuously communicating with the central server 952, as required. A workstation 964 connected in a peer-to-peer fashion with a plurality of other computers is also shown. In this computing topology, the one or more computer-based applications 925, as a whole or in part, may reside on each of the peer computers 964.

Computing system 966 represents a PC or other computing system, which connects through a gateway or other host in order to access the server 952 on which the one or more computer-based applications 925, in part or as a whole, reside. An appliance 968 includes executable instructions "hardwired" into a physical device, such as through use of non-volatile memory or "firmware," and/or may utilize software running on another system that does not itself host the one or more computer-based applications 925, such as in the case of a gaming console or personal video recorder. The appliance 968 is able to access a computing system that hosts an instance of one of the computer-based applications 925, such as the server 952, and is able to interact with the instance of the system.

The processor-based systems on which the one or more computer-based applications 925 operate may include hardware and/or software such as cameras and associated circuitry that enable monitoring of physiological responses or conditions such as gestures, body movement, gaze, heartbeat, brain waves, temperature, blood composition, and so on. The processor-based systems may include sensors and associated circuitry that enable sensing of environmental conditions such as weather conditions, sounds, lighting levels, physical objects in the vicinity, and so on. Microphones and speakers and associated circuitry for receiving and delivering audio-based communications may be included in the computer-based applications 925. The computer-based applications 925 or elements thereof may be executed on processor-based systems embodied within self-propelled devices that may include mobility mechanisms such as, but not limited to, wheels, tracks, and legs. Such self-propelled devices may include cameras and/or other sensors that provide environmental information to the computer-based applications 925, and the movements of the self-propelled devices may be directed or informed by the computer-based applications 925 in response to the environmental information. In some embodiments the self-propelled devices have a humanoid form factor. Embodiments in which some or all of the computer-based applications 925 operate in conjunction with an apparatus that has a humanoid form can enhance the perception of communicative qualities of the computer-based applications as described herein such as self-awareness, imagination, and humor by users 200.

While the present invention has been described with respect to a limited number of embodiments, those skilled in the art will appreciate numerous modifications and variations therefrom. It is intended that the appended claims cover all such modifications and variations as fall within the scope of this present invention.

What is claimed is:

1. A system, comprising:
   one or more processors;
   one or more memories in communication with the one or more processors; and
   one or more programs, wherein the one or more programs are stored in the one or more memories and configured to be executed by the one or more processors, the one or more programs including instructions for causing:
   access to a first neural network that is trained by applying a first plurality of attentions to representations of different subsets of a first plurality of items of information;
   generation, by applying a second plurality of attentions utilizing the trained first neural network, of a second plurality of items of information;
   training of a second neural network by applying the second plurality of items of information;
   identification of a plurality of syntactical elements;
   generation, by applying a third plurality of attentions to representations of different subsets of the plurality of syntactical elements utilizing the trained second neural network, of a resulting item of content; and
   the resulting item of content to be sent to a user.

2. A computer-implemented method, comprising:
   at a system:
   causing access to a first neural network that is trained by applying a first plurality of attentions to representations of different subsets of first information, and that generates, by applying a second plurality of attentions and utilizing the trained first neural network, second information;
   causing training of a second neural network by applying the second information;
   causing identification of a plurality of items of content;
   causing generation, by applying a third plurality of attentions to representations of different subsets of the plurality of items of content and utilizing the trained second neural network, of a resulting item of content; and
   causing the resulting item of content to be sent to a user.

3. The method of claim 2, wherein the second information includes one or more syntactical elements.

4. The method of claim 2, wherein the second information includes one or more syntactical elements, and a setting is received, for causing a tuning of the generation of the second information based on the setting, such that the setting causes the tuning of the generation of the second information, by causing generation, as at least one of the one or more syntactical elements, of a first syntactical element with a first associated probability, instead of a second syntactical element with a second associated probability, even though the first associated probability is less than the second associated probability.

5. The method of claim 2, wherein the second information includes one or more probabilities.

6. The method of claim 5, wherein the second information includes one or more probabilities, and a setting is received, for causing a tuning of the generation of the second information based on the setting.

7. The method of claim 2, wherein the second information includes one or more weights.

8. The method of claim 7, wherein the second information includes one or more probabilities, and a setting is received, for causing a tuning of the generation of the second information based on the setting.

9. The method of claim 2, wherein the second information includes one or more syntactical elements and one or more probabilities corresponding to the one or more syntactical elements.

10. The method of claim 2, wherein the second information includes one or more syntactical elements and one or more weights corresponding to the one or more syntactical elements.

11. The method of claim 2, wherein the second information represents one or more features of the first neural network.

12. The method of claim 2, wherein the second information represents one or more features of the first neural network, where the one or more features include internal structures of the first neural network.

13. The method of claim 2, wherein the second information represents one or more features of the first neural network, where the one or more features include one or more relationships among nodes of the first neural network.

14. The method of claim 2, wherein the second information represents one or more features associated with one or more nodes of the first neural network.

15. The method of claim 2, wherein the second information represents a plurality of features associated with a plurality of nodes of the first neural network.

16. The method of claim 2, wherein the second information includes one or more syntactical elements and one or more features associated with one or more nodes of the first neural network.

17. The method of claim 2, wherein the first neural network and the second neural network are each of a type other than a recurrent neural network.

18. The method of claim 2, wherein the first information includes one or more representations of one or more syntactical elements that are received from a human user.

19. The method of claim 2, wherein the first information includes one or more representations of one or more syntactical elements that are generated utilizing the first neural network.

20. The method of claim 2, wherein the second information include both syntactical elements and images.

21. The method of claim 2, wherein the second plurality of attentions are prioritized.

22. The method of claim 2, wherein the second plurality of attentions are prioritized, before any usage of the prioritization of any of the second plurality of attentions.

23. The method of claim 2, wherein the second plurality of attentions are prioritized in a single operation.

24. The method of claim 2, wherein the second plurality of attentions are prioritized to generate a result based on a relative importance or relevance of a plurality of relationships among the first information, and then another plurality of attentions are prioritized based on the result.

25. The method of claim 2, wherein the second plurality of attentions are prioritized utilizing first weights that reflect a relative importance or relevance of a plurality of relationships among the first information.

26. The method of claim 25, wherein an additional plurality of attentions are prioritized utilizing second weights that reflect the relative importance or relevance of the plurality of relationships among the first information, as updated based on probabilities generated as a result of the prioritization of the second plurality of attentions.

27. The method of claim 2, wherein the first neural network is trained on a training set including: images associated with corresponding syntactical elements to infer one or more syntactical elements corresponding to pixel patterns within the images, and training syntactical elements, including training natural language syntactical elements and training computer-executable code syntactical elements, that are utilized by computing hardware that processes the training syntactical elements to direct training attentions to representations of different subsets of the training syntactical elements.

28. The method of claim 2, wherein the first neural network and the second neural network are each neural network components of a same neural network.

29. The method of claim 2, wherein the first neural network and the second neural network are separate neural networks.

30. The method of claim 2, wherein the training of the second neural network is caused by applying the second information, such that an output of the trained second neural network, that is trained by applying the second information, is compared to an output of the trained first neural network.

31. The method of claim 2, wherein the training of the second neural network is caused by applying the second information, such that an output of the trained second neural network, that is trained by applying the second information, is compared to an output of the trained first neural network, for updating weights of the trained second neural network based on the comparison.

32. The method of claim 2, wherein the training of the second neural network is caused by applying the second information, such that an output of the trained second neural network, that is trained by applying the second information, is generated by multiple-attention application and is compared to an output of the trained first neural network that is generated by multiple-attention application, for updating weights of the trained second neural network based on the comparison.

33. The method of claim 2, wherein the training of the second neural network is caused by applying the second information, such that different output of the trained second neural network, that is trained by applying the second information, is repeatedly generated by multiple-attention application and is repeatedly compared to different output of the trained first neural network that is repeatedly generated by multiple-attention application, for repeatedly updating weights of the trained second neural network based on the repeated comparison.

34. The method of claim 2, wherein the second information represents one or more features of the first neural network that is identified by applying the second plurality of attentions and utilizing the trained first neural network.

35. The method of claim 2, wherein the second information represents one or more features associated with one or more nodes of the first neural network, where the one or more features is identified by applying the second plurality of attentions and utilizing the trained first neural network.

36. The method of claim 2, wherein the second information represents one or more features of the first neural network that is identified by applying the second plurality of attentions to representations of different subsets of one or more prompts and utilizing the trained first neural network.

37. The method of claim 2, wherein the second information represents one or more features associated with one or more nodes of the first neural network, where the one or more features is identified by applying the second plurality of attentions to representations of different subsets of one or more prompts and utilizing the trained first neural network.

38. The method of claim 2, wherein the second information represents a plurality of features associated with a plurality of nodes of the first neural network, where the plurality of features are extracted from a plurality of feature nodes by applying the second plurality of attentions to the plurality of feature nodes and utilizing the trained first neural network.

39. The method of claim 2, wherein the second information represents a plurality of features associated with a plurality of nodes of the first neural network, where the plurality of features are extracted by applying the second plurality of attentions and utilizing the trained first neural network.

40. The method of claim 2, wherein only one of:
each instance of the generation is performed by hardware;
each instance of the generation is performed by software;
each instance of the generation is caused by software and performed by hardware;
each instance of the generation is caused and performed by software;
only a subset of each instance of the generation is performed by hardware;
only a subset of each instance of the generation is performed by software;
only a subset of each instance of the generation is caused by software and performed by hardware;
only a subset of each instance of the generation is caused and performed by software;
the causing includes a direct causation;
the causing includes an indirect causation;
the system is portable;
the system is not portable;
the system includes a user device;
the system includes a user device to which the resulting item of content is caused to be sent;
the system does not include a user device;
the system does not include a user device to which the resulting item of content is caused to be sent;
the system, further comprising: a user device;
the system, further comprising: a user device to which the resulting item of content is caused to be sent;
the plurality of items of content includes syntactical elements;
the plurality of items of content includes syntactical elements, including computer code;
the plurality of items of content includes images;
the plurality of items of content includes different pixel patterns;

the plurality of items of content includes a plurality of pixel patterns;
the plurality of items of content includes a plurality of pixel patterns of a single image;
the plurality of items of content includes only syntactical elements;
the plurality of items of content includes only computer code;
the plurality of items of content includes only images;
the plurality of items of content includes different forms of content;
the plurality of items of content includes syntactical elements, images, and computer code;
the representations of the different subsets of the plurality of items of content, includes the different subsets of the plurality of items of content themselves;
the representations of the different subsets of the plurality of items of content, includes a processed version of the different subsets of the plurality of items of content;
the representations of the different subsets of the plurality of items of content, includes a processed form of the different subsets of the plurality of items of content;
the representations of the different subsets of the plurality of items of content, includes a mathematical representation of the different subsets of the plurality of items of content;
the representations of the different subsets of the plurality of items of content, includes a digital format of the different subsets of the plurality of items of content;
the identification of the plurality of items of content includes receiving the plurality of items of content;
the identification of the plurality of items of content includes occurs after receiving the plurality of items of content;
the identification of the plurality of items of content includes occurs after receiving the plurality of items of content;
the identification of the plurality of items of content includes automatic identification of the plurality of items of content;
the access to the first neural network includes direct access;
the access to the first neural network includes indirect access;
the causing of the access to the first neural network includes direct causing;
the causing of the access to the first neural network includes indirect causing;
the user includes a human user;
the user includes a non-human user;
the first neural network is capable of multiple iterations utilizing a same hardware;
the first neural network is capable of multiple iterations utilizing a same software;
the first neural network is capable of multiple iterations utilizing a same process;
the first neural network is capable of multiple iterations each utilizing different hardware;
the first neural network is capable of multiple iterations each utilizing different software;
the first neural network is capable of multiple iterations each utilizing a same process;
the first neural network is capable of multiple iterations each utilizing a same process and a different hardware;
the first neural network is capable of multiple iterations each utilizing a same hardware and a different process;

the first neural network includes a single computer-implemented neural network;

the first neural network includes a plurality of computer-implemented neural networks;

the first neural network includes a plurality of computer-implemented neural networks, where a same one or more of the plurality of computer-implemented neural networks is utilized for each instance of the causing;

the first neural network includes a plurality of computer-implemented neural networks, where a different one or more of the plurality of computer-implemented neural networks is utilized for each instance of the causing;

the first neural network is implemented utilizing the system;

the first neural network is implemented utilizing another system other than the system;

the first neural network is implemented utilizing one or more processors;

the first neural network is implemented utilizing one or more other processors other than the one or more processors;

the first neural network is implemented utilizing one or more other processors other than the one or more processors, such that the one or more processors causes operation of the first neural network utilizing one or more other processors;

the second neural network is capable of multiple iterations utilizing a same hardware;

the second neural network is capable of multiple iterations utilizing a same software;

the second neural network is capable of multiple iterations utilizing a same process;

the second neural network is capable of multiple iterations each utilizing different hardware;

the second neural network is capable of multiple iterations each utilizing different software;

the second neural network is capable of multiple iterations each utilizing a same process;

the second neural network is capable of multiple iterations each utilizing a same process and a different hardware;

the second neural network is capable of multiple iterations each utilizing a same hardware and a different process;

the second neural network includes a single computer-implemented neural network;

the second neural network includes a plurality of computer-implemented neural networks;

the second neural network includes a plurality of computer-implemented neural networks, where a same one or more of the plurality of computer-implemented neural networks is utilized for each instance of the causing;

the second neural network includes a plurality of computer-implemented neural networks, where a different one or more of the plurality of computer-implemented neural networks is utilized for each instance of the causing;

the second neural network is implemented utilizing the system;

the second neural network is implemented utilizing another system other than the system;

the second neural network is implemented utilizing the one or more processors;

the second neural network is implemented utilizing one or more other processors other than the one or more processors;

the second neural network is implemented utilizing one or more other processors other than the one or more processors, such that the one or more processors causes operation of the second neural network utilizing one or more other processors;

the second neural network is another instance of the first neural network;

the second neural network is another instance of the first neural network;

the second neural network is another instance that is the same as the first neural network, but is trained differently;

the second neural network is different from the first neural network;

the second neural network is part of the system and the first neural network is not part of the system;

the first neural network is part of the system and the second neural network is not part of the system;

the first neural network and the second neural network are each part of the system;

the first neural network and the second neural network are both not part of the system;

the first neural network and the second neural network are each neural network components of a same neural network;

the first neural network and the second neural network are separate neural networks;

each representation includes a mathematical representation;

each representation includes a symbolic representation;

each representation includes a processed form of a corresponding one or more syntactical elements;

the resulting item of content is sent directly to the user;

the resulting item of content is sent indirectly to the user;

the resulting item of content is sent to the user via a network;

the resulting item of content is sent to the user via a wide area network;

the resulting item of content is not sent to the user via a network;

the resulting item of content is in written form;

the resulting item of content is in written form, by visually showing syntactical elements;

the resulting item of content is in visual form;

the resulting item of content is in audible form, by converting syntactical elements to audible versions of the syntactical elements;

the plurality of items of content are included in a single chain;

the plurality of items of content are included in a single composite chain;

the plurality of items of content are included in a plurality of chains;

the first plurality of attentions includes a first attention that is part of a multiple-attention direction, which includes a direction of a plurality of attentions;

the first plurality of attentions includes a first attention that is part of a multiple-attention direction, which includes a direction of a plurality of attentions to different syntactical elements;

the first plurality of attentions includes a first attention that is part of a multiple-attention direction, which includes a direction of a plurality of attentions each to one of a plurality of different syntactical elements;

the first plurality of attentions includes a first attention that is part of a multiple-attention direction that includes different attentions from a multiple-attention direction of which the second attention is part;

the first plurality of attentions includes a first attention that is part of a multiple-attention direction that includes directions that are different from those associated with a multiple-attention direction of which the second attention is part;

the first plurality of attentions includes a first attention that is an initial attention;

the first plurality of attentions includes a first attention that is not an initial attention;

the first plurality of attentions includes a first attention that includes a reflection;

the first plurality of attentions includes a first attention that does not include a reflection;

at least one of the first plurality of attentions includes a first attention that or the second attention, includes monitored attention;

at least one of the first plurality of attentions includes a first attention that includes inferred attention;

at least one of the first plurality of attentions includes a first attention that includes a consciousness;

at least one of the first plurality of attentions includes a first attention that includes an awareness;

at least one of the first plurality of attentions includes a first attention that is represented by an identified one or more of the plurality of items of content;

at least one of the first plurality of attentions includes a first attention that is identified by identification of a representative one or more of the plurality of items of content;

at least one of the first plurality of attentions includes a first attention that is based on at least one of: processing input from a sensor, processing input from externally sourced content, processing input from internally sourced content, a value of information, or a probabilistic selection process;

at least one of the first plurality of attentions includes a first attention that is not based on at least one of: processing input from a sensor, processing input from externally sourced content, processing input from internally sourced content, a value of information, or a probabilistic selection process;

at least one of the first plurality of attentions includes a first attention that includes system attention;

at least one of the first plurality of attentions includes a first attention that does not include user attention;

at least one of the first plurality of attentions includes a first attention that includes a focus of attention;

at least one of the first plurality of attentions includes a first attention that includes a potential attention;

at least one of the first plurality of attentions includes a first attention that includes a stream of attention;

at least one of the first plurality of attentions includes a first attention that is not generated by the first neural network;

at least one of the first plurality of attentions is based on processing input from a sensor;

at least one of the first plurality of attentions is based on processing input from externally sourced content;

at least one of the first plurality of attentions is based on processing input from internally sourced content;

at least one of the first plurality of attentions is based on a value of information;

at least one of the first plurality of attentions is based on a probabilistic selection process;

at least one of the first plurality of attentions is based on processing input from a sensor, processing input from externally or internally sourced content, a value of information, and a probabilistic selection process;

the first plurality of attentions includes a first attention that is directed to a representation of only a single subset of the plurality of items of content;

the first plurality of attentions includes a first attention that is directed to a representation of a subset of the plurality of items of content, including multiple items of content;

the first plurality of attentions is collectively directed to representations of all of the plurality of items of content;

each instance of based on, includes directly based on;

at least one instance of based on, includes directly based on;

each instance of based on, includes indirectly based on;

at least one instance of based on, includes indirectly based on;

each instance of in response, includes a direct response;

each instance of in response, includes an indirect response;

each instance of based, includes directly based;

at least one instance of based, includes directly based;

each instance of based, includes indirectly based;

at least one instance of based, includes indirectly based;

each instance of utilizing, includes directly utilizing;

at least one instance of utilizing, includes directly utilizing;

each instance of utilizing, includes indirectly utilizing;

at least one instance of utilizing, includes indirectly utilizing;

each instance of the causing is an act;

each instance of the causing is not a step;

the causing are acts;

the causing are not steps;

the access to the first neural network, the training of the second neural network, the identification, the generation, and the sending, are acts;

the access to the first neural network, the training of the second neural network, the identification, the generation, and the sending, are not steps;

the first neural network includes a neural network-based system capable of a first operation including neural network-independent attention prioritization, and a second operation to direct the first attention by causing processing of the first neural network to be based on the neural network-independent attention prioritization, by affecting a particular manner of the processing by the first neural network;

the system is further configured such that the first neural network is caused to be accessed and the second information is caused to be generated utilizing a first processor of one or more processors of a first apparatus of the system that executes a first program of one or more programs that is stored in a first memory of one or memories of the first apparatus of the system, and the plurality of items of content is caused to be identified and the resulting item of content is caused to be generated utilizing a second processor of the one or more processors of a second apparatus of the system that executes a second program of the one or more programs that is stored in a second memory of the one or memories of the second apparatus of the system;

the first neural network is caused to be accessed, the second information is caused to be generated, the plurality of items of content is caused to be identified, and the resulting item of content is caused to be generated, utilizing a same processor of the one or more processors of a same apparatus of the system that executes a same program of the one or more programs that is stored in a same memory of the one or memories of the same apparatus of the system; 5 the first neural network is caused to be accessed and the second information is caused to be generated, by a first one of the one or more processors; and the plurality of items of content is caused to be identified and the resulting item of content is caused to be generated, by 10 a second one of the one or more processors;

the first neural network is caused to be accessed, the second information is caused to be generated, the plurality of items of content is caused to be identified, and the resulting item of content is caused to be 15 generated by a same one of the one of the one or more processors; or the system includes a non-transitory computer-readable media storing a plurality of instructions, including a first storage including a first portion of the instructions 20 and a second storage including a second portion of the instructions.

*    *    *    *    *